(12) United States Patent
Koep et al.

(10) Patent No.: US 9,975,813 B2
(45) Date of Patent: May 22, 2018

(54) PROPPANTS AND METHODS OF MAKING THE SAME

(71) Applicant: Halliburton Energy Services, Inc., Houston, TX (US)

(72) Inventors: Erik Koep, Houston, TX (US); Chadra Khadilkar, Houston, TX (US); Christopher Y. Fang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 14/903,457

(22) PCT Filed: Aug. 6, 2014

(86) PCT No.: PCT/US2014/049840
§ 371 (c)(1),
(2) Date: Jan. 7, 2016

(87) PCT Pub. No.: WO2015/021083
PCT Pub. Date: Feb. 12, 2015

(65) Prior Publication Data
US 2016/0376199 A1     Dec. 29, 2016

Related U.S. Application Data

(60) Provisional application No. 61/863,251, filed on Aug. 7, 2013, provisional application No. 61/885,122, filed on Oct. 1, 2013.

(51) Int. Cl.
*C04B 35/52* (2006.01)
*C09K 8/80* (2006.01)
(Continued)

(52) U.S. Cl.
CPC .............. *C04B 35/52* (2013.01); *C04B 35/18* (2013.01); *C04B 35/195* (2013.01); *C04B 35/62813* (2013.01); *C04B 35/62839* (2013.01); *C04B 35/64* (2013.01); *C04B 35/78* (2013.01); *C04B 38/009* (2013.01); *C09K 8/80* (2013.01); *C04B 2235/3481* (2013.01); *C04B 2235/422* (2013.01); *C04B 2235/528* (2013.01); *C04B 2235/5427* (2013.01); *C04B 2235/5472* (2013.01); *C04B 2235/608* (2013.01); *C04B 2235/6028* (2013.01); *C04B 2235/77* (2013.01);
(Continued)

(58) Field of Classification Search
None
See application file for complete search history.

(56) References Cited

U.S. PATENT DOCUMENTS 7,459,209 B2   12/2008   Smith et al.
7,491,444 B2   2/2009    Smith et al.
(Continued)

OTHER PUBLICATIONS

International Search Report and Written Opinion for Application No. PCT/US2014/049840 dated Jan. 14, 2015.
(Continued)

*Primary Examiner* — Jeffrey Washville
(74) *Attorney, Agent, or Firm* — Craig W. Roddy; Tumey L.L.P.

(57) ABSTRACT

Synthetic ceramic proppants are described. Methods to make these proppants and methods of using these proppants are also described.

20 Claims, 15 Drawing Sheets

(51) Int. Cl.
  *C04B 35/195* (2006.01)
  *C04B 35/78* (2006.01)
  *C04B 35/18* (2006.01)
  *C04B 38/00* (2006.01)
  *C04B 35/628* (2006.01)
  *C04B 35/64* (2006.01)

(52) U.S. Cl.
  CPC .... *C04B 2235/775* (2013.01); *C04B 2235/94* (2013.01); *C04B 2235/96* (2013.01); *C04B 2235/9607* (2013.01)

(56) References Cited

U.S. PATENT DOCUMENTS

| | | | |
|---|---|---|---|
| 7,569,199 B1 | 8/2009 | Barron et al. | |
| 7,867,613 B2 | 1/2011 | Smith et al. | |
| 7,883,773 B2 | 2/2011 | Smith et al. | |
| 7,887,918 B2 | 2/2011 | Smith et al. | |
| 7,914,892 B2 | 3/2011 | Smith et al. | |
| 8,003,212 B2 | 8/2011 | Smith et al. | |
| 8,012,533 B2 | 9/2011 | Smith et al. | |
| 8,047,288 B2* | 11/2011 | Skala | C09K 8/80 166/279 |
| 8,075,997 B2 | 12/2011 | Smith et al. | |
| 8,168,570 B2 | 5/2012 | Barron et al. | |
| 8,178,476 B2 | 5/2012 | Xie et al. | |
| 8,178,477 B2 | 5/2012 | Skala et al. | |
| 8,298,667 B2 | 10/2012 | Smith et al. | |
| 8,603,578 B2 | 12/2013 | Smith et al. | |
| 8,728,991 B2 | 5/2014 | Wu et al. | |
| 8,916,505 B2 | 12/2014 | Skala et al. | |
| 2008/0070774 A1 | 4/2008 | Shimotev et al. | |
| 2008/0135245 A1 | 6/2008 | Smith et al. | |
| 2009/0032253 A1 | 2/2009 | Smith et al. | |
| 2009/0032254 A1 | 2/2009 | Smith et al. | |
| 2009/0038797 A1 | 2/2009 | Skala et al. | |
| 2009/0038798 A1 | 2/2009 | Smith et al. | |
| 2009/0065208 A1 | 3/2009 | Smith et al. | |
| 2009/0137433 A1 | 5/2009 | Smith et al. | |
| 2009/0288820 A1 | 11/2009 | Barron et al. | |
| 2011/0077176 A1 | 3/2011 | Smith et al. | |
| 2011/0143969 A1 | 6/2011 | Skala et al. | |
| 2011/0146985 A1* | 6/2011 | Xie | C03C 10/0045 166/280.2 |
| 2011/0160104 A1 | 6/2011 | Wu et al. | |
| 2012/0003136 A1 | 1/2012 | Skala et al. | |
| 2012/0157358 A1 | 6/2012 | Fang et al. | |
| 2012/0181020 A1 | 7/2012 | Barron et al. | |
| 2012/0190597 A1 | 7/2012 | Chaterjee et al. | |
| 2013/0014945 A1 | 1/2013 | Fang et al. | |
| 2013/0022816 A1 | 1/2013 | Smith et al. | |
| 2013/0206408 A1 | 8/2013 | Chatterjee et al. | |
| 2013/0244914 A1 | 9/2013 | Wu et al. | |
| 2014/0011034 A1* | 1/2014 | Majumder | C01B 31/043 428/406 |
| 2014/0038859 A1 | 2/2014 | Skala et al. | |
| 2014/0038860 A1 | 2/2014 | Skala et al. | |
| 2014/0249058 A1 | 9/2014 | Wu et al. | |
| 2014/0290349 A1 | 10/2014 | Florio et al. | |
| 2014/0318778 A1 | 10/2014 | Skala et al. | |
| 2015/0284626 A1 | 10/2015 | Barron et al. | |

OTHER PUBLICATIONS

"Perry's Chemical Engineers' Handbook" McGraw-Hill 1999; pp. 2-7 to 2-27.

* cited by examiner

PROPPANTS AND METHODS OF MAKING THE SAME

This application claims the benefit under 35 U.S.C. § 371 of PCT Appl. No. US2014/049840, filed Aug. 6, 2014, which claimed the benefit under 35 U.S.C. § 119(e) of prior U.S. Provisional Patent Application No. 61/863,251, filed Aug. 7, 2013, and prior U.S. Provisional Patent Application No. 61/885,122 filed Oct. 1, 2013, which are incorporated in their entirety by reference herein.

BACKGROUND OF THE INVENTION

The present invention relates to proppants and methods of making proppants. The present invention further relates to the use of proppants for hydrocarbon recovery. The present invention further relates to the method of fracking a well using the proppants of the present invention.

Proppants are materials pumped into oil or gas wells at extreme pressure in a carrier solution (typically brine) during the hydrofracturing process. Once the pumping-induced pressure is removed, proppants "prop" open fractures in the rock formation and thus preclude the fracture from closing. As a result, the amount of formation surface area exposed to the well bore is increased, enhancing recovery rates.

Ceramic proppants are widely used as propping agents to maintain permeability in oil and gas formations. High strength ceramic proppants have been used in the hydrofracture of subterranean earth in order to improve production of natural gas and/or oil. For wells that are drilled 10,000 feet or deeper into the earth, the proppant beads need to withstand 10 kpsi or higher pressure to be effective to prop the fracture generated by the hydrofracture process. Currently only proppants formed from high strength materials, such as sintered bauxite and alumina have sufficient compressive and flexural strength for use in deep wells. These conventional high strength materials are expensive, however, because of a limited supply of raw materials, a high requirement for purity, and the complex nature of the manufacturing process. In addition, such high strength materials have high specific gravity, in excess of 3.0, which is highly undesirable for proppant applications. Producing high strength proppants with low specific gravity is also a challenge. In field applications, the transportability of proppants in wells is hindered by the difference of specific gravities of proppant and carrying fluid. While light weight oxide materials, such as cordierite, have low specific gravity, they have a relatively weak flexural strength and stiffness.

SUMMARY OF THE PRESENT INVENTION

A feature of the present invention is to provide new methods to make ceramic core/shell proppants where the core can include a hollow portion that is created during sintering of a solid green body core and a solid green body shell.

Further, a feature of the present invention is to provide proppants having a balance of strength properties from the shell and the core.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a green body proppant that can include a green body core comprising glassy material; and a green body shell surrounding the green body core and comprising coarse particles. A proppant is provided by the present invention that can include a porous core, and a shell surrounding the transition region, the shell including a transition region surrounded by an outer shell, wherein an average transition region density is greater than an average outer shell density, the average outer shell density is greater than an average core density, and the transition region has a glassy phase content of at least 1 vol % based on the total volume of the transition region, such as at least 15 vol %.

The present invention further relates to a method of making a sintered ceramic proppant. In the present invention, a substantially spherical green body core can be formed that contains one or more ceramic particulate materials including at least one glassy material. At the same time or afterwards, a green body shell can be formed around the green body core, wherein the green body shell contains at least one ceramic particulate material that results in a green core/shell body. The green core/shell body can be sintered and, during sintering, at least a portion of said green body core can be diffused or otherwise enter into the green body shell to form a sintered ceramic proppant comprising a porous core, a transition region surrounding the core, and an outer shell surrounding the transition region, wherein an average transition region density is greater than an average outer shell density, the average outer shell density is greater than an average core density, and the transition region has a glassy phase content of at least 5 vol % based on the total volume of the transition region.

Further, the present invention relates to a green body proppant that includes a core and/or shell, wherein the green body proppant includes a chemical gradient having a plurality of stages across the core, the shell, or both.

The present invention also relates to a method of forming a sintered proppant that can include forming a green body proppant containing a core, a shell, or both; creating a chemical gradient in the green body proppant during the formation; and sintering the green body to form a sintered proppant.

A method of forming a sintered proppant is further provided that can include forming a green body proppant containing a core, a shell, or both; and adjusting the coefficient of thermal expansion (CTE) to strengthen the compressive strength of the resulting sintered proppant sufficient to partially or completely cancel out tensile strength of an external load applied to the resulting proppant. Sintered proppants formed from such methods and/or green body proppants are also provided.

The present invention also relates to a green body proppant that contains a carbide or any combination of carbides in the form of rods, whiskers, platelets, or any combination thereof in an amount effective to strengthen a sintered proppant formed from the green body proppant, wherein the green body proppant comprises a core, a shell, or any combination thereof. A green body proppant is also provided that includes alumina and additionally silicon carbide, potassium titanate, hydrotalcite, partially stabilized zirconia, or any combination thereof.

The present invention further provides a method of forming a silicon carbide-toughened ceramic composite proppant. A green body can be formed containing silicon carbide particles, the green body comprising a core, a shell, or both. The green body can be heated under controlled heating conditions. The heated green body can be sintered at an elevated temperature to form a silicon carbide-toughened ceramic composite proppant. Sintered proppants formed from the green bodies and/or using the methods of the present invention are also provided.

Furthermore, the present invention relates to proppants that contain graphene and methods of producing the same. Graphene-toughened ceramic proppants and methods of forming a graphene-toughened ceramic proppant are provided in which, for example, a green body containing graphene is formed, the green body including a core, a shell, or both; heating the green body under controlled heating conditions; and sintering the heated green body at an elevated temperature to form a graphene-toughened ceramic proppant. Conductive proppants and methods of forming a conductive ceramic proppant are provided in which, for example, a green body containing graphene is formed, the green body including a core, a shell, or both; heating the green body under controlled heating conditions; and sintering the heated green body at an elevated temperature to form a conductive ceramic proppant. Conductive ceramic proppants can be thermally conductive, electrically conductive, or both.

The present invention further relates to a method to prop open subterranean formation fractures by utilizing the proppants of the present invention. The proppant population of the present invention can be combined with one or more fluids to form a suspension, which can then be pumped into the subterranean producing zone. Further details are provided herein.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

BRIEF DESCRIPTION OF DRAWINGS

FIG. 1 shows that the diffusion or migration of the core material forms a type of gradient and, therefore, a higher concentration of core material is present closer to the core than the outer surface of the proppant, with migration or diffusion of the core material occurring in an outward radial direction. FIG. 1 also comprises three graphs that show the degree of porosity, core material concentration, and mullite whisker formation/concentration based on location within the proppant. The three graphs are in alignment with the location shown in the proppant sphere diagram or drawing.

DETAILED DESCRIPTION OF THE PRESENT INVENTION

Figure 1:
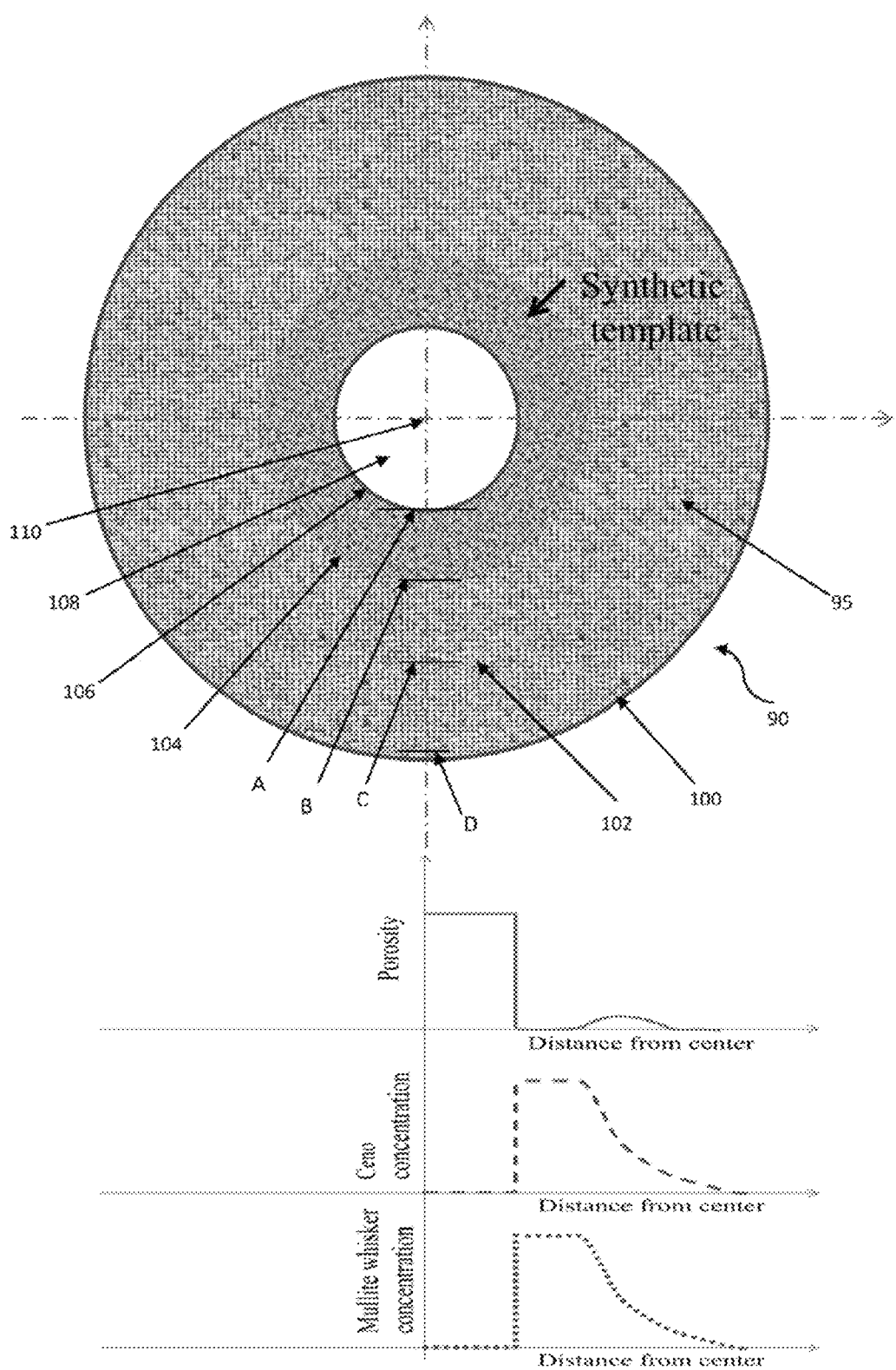
FIG. 1 is a diagram of a proppant (enlarged) that shows the schematics of void formation in the center of the proppant in the core region due to the partial or complete diffusion or migration of the core material from the green body and further shows the diffusion or migration of the core material into the shell regions.

The present invention relates to a proppant, populations of proppants, methods of making the proppants, and uses for the proppants, including using the proppants in hydrocarbon recovery.

For purposes of the present invention, a ceramic proppant is a proppant that contains at least 90% by weight ceramic materials based on the entire weight of the ceramic proppant. For example, the ceramic proppant can contain at least 92% by weight ceramic materials, at least 95% by weight ceramic materials, at least 96% by weight ceramic materials, at least 97% by weight ceramic materials, at least 98% by weight ceramic materials, at least 99% by weight ceramic materials, at least 99.5% by weight ceramic materials, at least 99.9% by weight ceramic materials, or can be 100% by weight ceramic materials. The ceramic materials, for purposes of the present invention, can be one or more metal oxides, and/or one or more non-oxides that are considered ceramics, such as carbides, borides, nitrides, and/or silicides. For purposes of the present invention, the term "ceramic" includes glass material, ceramic material, and/or glass-ceramic material and/or can comprise one or more glass, ceramic, and/or glass-ceramic phases. The "ceramic" material can be non-crystalline, crystalline, and/or partially crystalline.

For purposes of the present invention, the ceramic proppant can have less than 5 wt % polymeric and/or cellulosic (e.g., plant material or tree material). More preferably, the proppants of the present invention have less than 1 wt %, less than 0.5 wt %, less than 0.1 wt %, or 0 wt % of polymeric material or cellulosic material or both in the sintered proppants of the present invention.

The ceramic in the ceramic proppants of the present invention can be an oxide, such as aluminum oxides (alumina) and/or mixed metal aluminum oxides, such as metal aluminates containing calcium, yttrium, titanium, lanthanum, barium, and/or silicon in addition to aluminum. The ceramic can be an oxide, such as aluminum oxide called alumina, or a mixed metal oxide of aluminum called an aluminate, a silicate, or an aluminosilicate, such as mullite or cordierite. The aluminate or the ceramic in general may contain magnesium, calcium, yttrium, titanium, lanthanum, barium, and/or silicon. The ceramic may be formed from a nanoparticle precursor such as an alumoxane. Alumoxanes can be chemically functionalized aluminum oxide nanoparticles with surface groups including those derived from carboxylic acids such as acetate, methoxyacetate, methoxyethoxyacetate, methoxyethoxyethoxyacetate, lysine, and stearate, and the like. The ceramic can include, but is not limited to, boehmite, alumina, spinel, alumnosilicate clays (e.g., kaolin, montmorillonite, bentonite, and the like), calcium carbonate, calcium oxide, magnesium oxide, magnesium carbonate, cordierite, spinel, spodumene, steatite, a silicate, a substituted alumino silicate clay or any combination thereof (e.g. kyanite) and the like.

The ceramic can be or contain cordierite, mullite, bauxite, silica, spodumene, clay, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide or a non-oxide ceramic or any mixtures thereof. The proppant can include or be one or more sedimentary and/or synthetically produced materials.

Glass-ceramic, as used herein, refers to any glass-ceramic that is formed when glass or a substantially glassy material is annealed at elevated temperature to produce a substantially crystalline material, such as with limited crystallinity or controlled crystallite size. As used herein, limited crystallinity should be understood as crystallinity of from about 5% to about 100%, by volume (e.g., 10% to 90%; 20% to 80%; 30% to 70%; 40% to 60% by volume). The crystallite size can be from about 0.01 micrometers to 20 micrometers, such as 0.1 to 5 micrometers. Preferably the crystallite size is less than 1 micrometer. The glass-ceramic can be composed of aluminum oxide, silicon oxide, boron oxide, potassium oxide, zirconium oxide, magnesium oxide, calcium oxide, lithium oxide, phosphorous oxide, and/or titanium oxide or any combination thereof.

The glass-ceramic can comprise from about 35% to about 55% by weight $SiO_2$; from about 18% to about 28% by weight $Al_2O_3$; from about 1% to about 15% by weight (e.g., 1 to 5 wt %) CaO; from about 7% to about 14% by weight MgO; from about 0.5% to about 15% by weight $TiO_2$ (e.g., 0.5 to 5 wt %); from about 0.4% to about 3% by weight $B_2O_3$, and/or greater than 0% by weight and up to about 1% by weight $P_2O_5$, all based on the total weight of the glass-ceramic. The glass-ceramic can comprise from about 3% to about 5% by weight $Li_2O$; from about 0% to about 15% by weight $Al_2O_3$; from about 10% to about 45% by weight $SiO_2$; from about 20% to about 50% by weight MgO; from about 0.5% to about 5% by weight $TiO_2$; from about 15% to about 30% by weight $B_2O_3$, and/or from about 6% to about 20% by weight ZnO, all based on the total weight of the glass-ceramic.

The proppant can comprise aluminum oxide, silicon oxide, titanium oxide, iron oxide, magnesium oxide, calcium oxide, potassium oxide and/or sodium oxide, and/or any combination thereof. The sintered proppant can be or include at least in part cordierite, mullite, bauxite, silica, spodumene, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide, a non-oxide ceramic or any combination thereof.

The glass-ceramic proppant can be fully or nearly fully crystalline or can contain a glass component (e.g., phase(s)) and a crystalline component (e.g., phase(s)) comprising crystallites. The glass-ceramic Can have a degree of crystallinity of from about 5% to about 100%, or from about 15% to about 80%. For example, the glass-ceramic can have from about 50% to 80% crystallinity, from about 60% to 78% crystallinity or from about 70% to 75% crystallinity by volume. The crystallites can have a random and/or directed orientation. With respect to the orientation of the crystals that are present in the glass-ceramic, the crystal orientation of the crystals in the glass-ceramic can be primarily random or can be primarily directed in a particular orientation(s) (e.g., non-random). For instance, the crystal orientation of the glass-ceramic can be primarily random such that at least 50% or higher of the orientations are random orientations based on the overall orientation of the crystals present. For instance, the random orientation can be at least 60%, at least 70%, at least 80%, at least 90%, such as from about 51% to 99%, from 60% to 90%, from 70% to 95% or higher with respect to the percent of the crystals that are random based on the crystals measured. X-ray diffraction ("XRD") can be used to determine the randomness of the crystallites. As the glass-ceramic can have both crystal and glass components, the glass-ceramic can have certain properties that are the same as glass and/or crystalline ceramics. Thus, the glass-ceramic can provide an ideal gradient interface between the template sphere and the ceramic shell, if present. The glass-ceramic can be impervious to thermal shock. Furthermore, the proportion of the glass and crystalline component of the glass-ceramic can be adjusted to match (e.g., within 10%, within 5%, within 1%, within 0.5%, within 0.1%) the coefficient of thermal expansion (CTE) of the shell (if present) or other material to which it will be bonded or attached or otherwise in contact with, in order to prevent premature fracture(s) resulting from cyclic stresses due to temperature changes, or thermal fatigue. For example, when the glass-ceramic has from 70% to 78% crystallinity, the two coefficients balance such that the glass-ceramic as a whole has a thermal expansion coefficient mismatch that is very close to zero.

Glass (which can be considered a ceramic type of material), as used herein, can be any inorganic, non-metallic solid non-crystalline material, such as prepared by the action of heat and subsequent cooling. The glass can be any conventional glass such as, for example, soda-lime glass, lead glass, or borosilicate glass. Crystalline ceramic materials, as used herein, can be any inorganic, non-metallic solid crystalline material prepared by the action of heat and subsequent cooling. For example, the crystalline ceramic materials can include, but are not limited to, alumina, zirconia, stabilized zirconia, mullite, zirconia toughened alumina, spinel, aluminosilicates (e.g., mullite, cordierite), perovskite, perchlorate, silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or any combination thereof.

The proppant can have a crystalline phase and a glass (or glassy) phase, or amorphous phase. The matrix or amorphous phase can include a silicon-containing oxide (e.g., silica) and/or an aluminum-containing oxide (e.g., alumina), and optionally at least one iron oxide; optionally at least one potassium oxide; optionally at least one calcium oxide; optionally at least one sodium oxide; optionally at least one titanium oxide; and/or optionally at least one magnesium oxide, or any combinations thereof. The matrix or amorphous phase can contain one or more, or all of these optional oxides in various amounts where, preferably, the silicon-containing oxide is the major component by weight in the matrix and/or the amorphous phase, such as where the silicon-containing oxide is present in an amount of at least 50.1% by weight, at least 75% by weight, at least 85% by weight, at least 90% by weight, at least 95% by weight, at least 97% by weight, at least 98% by weight, at least 99% by weight (such as from 75% by weight to 99% by weight, from 90% by weight to 95% by weight, from 90% by weight to 97% by weight) based on the weight of the matrix or based on the weight of the amorphous phase alone. Exemplary oxides that can be present in the amorphous phase include, but are not limited to, $SiO_2$, $Al_2O_3$, $Fe_2O_3$, $Fe_3O_4$, $K_2O$, $CaO$, $Na_2O$, $TiO_2$, and/or $MgO$. It is to be understood that, for purposes of the present invention, other metals and/or metal oxides can be present in the matrix or amorphous phase.

The amorphous phase can include or be ceramic, and for instance can include alumina and/or silica. The amorphous phase can further include unreacted material (e.g., particles), such as alumina, alumina precursor, and/or siliceous material or any combination thereof.

The proppant can include one or more minerals and/or ores, one or more clays, and/or one or more silicates, and/or one or more solid solutions. The minerals or ores can be aluminum-containing minerals or ores and/or silicon-containing minerals or ores. These minerals, ores, clays, silicates, and/or solid solutions can be present as particulates. These component(s) can be present as at least one crystalline particulate phase that can be a non-continuous phase or continuous phase in the material. More specific examples include, but are not limited to, alumina, aluminum hydroxide, bauxite, gibbsite, boehmite or diaspore, ground cenospheres, fly ash, unreacted silica, silicate materials, quartz, feldspar, zeolites, bauxite and/or calcined clays. These components in a combined amount can be present in the material in an amount, for instance, of from 0.001 wt % to 85 wt % or more, such as from 1 wt % to 80 wt %, 5 wt % to 75 wt %, 10 wt % to 70 wt %, 15 wt % to 65 wt %, 20 wt % to 60 wt %, 30 wt % to 70 wt %, 40 wt % to 70 wt %, 45 wt % to 75 wt %, 50 wt % to 70 wt %, 0.01 wt % to 10 wt %, 0.1 wt % to 8 wt %, 0.5 wt % to 5 wt %, 0.75 wt % to 5 wt %, 0.5 wt % to 3 wt %, 0.5 wt % to 2 wt % based on the weight of the material. These amounts and ranges can alternatively apply to one crystalline particulate phase, such as alumina or an aluminum-containing material. These additional components can be uniformly dispersed throughout the matrix or amorphous phase (like filler is present in a matrix as discrete particulates).

The proppant can have any particle size. For instance, the proppant can have a particle diameter size of from about 75 microns to 1 cm or a diameter in the range of from about 100 microns to about 2 mm, or a diameter of from about 100 microns to about 3,000 microns, or a diameter of from about 100 microns to about 1,000 microns. Other particle sizes can be used. Further, the particle sizes as measured by their diameter can be above the numerical ranges provided herein or below the numerical ranges provided herein.

The proppant can have any median particle size, such as a median particle size, $d_{p50}$, of from about 90 μm to about 2000 μm (e.g., from 90 μm to 2000 μm, from 100 μm to 2000 μm, from 200 μm to 2000 μm, from 300 μm to 2000 μm, from 500 μm to 2000 μm, from 750 μm to 2000 μm, from 100 μm to 1000 μm, from 100 μm to 750 μm, from 100 μm to 500 μm, from 100 μm to 250 μm, from 250 μm to 2000 μm, from 250 μm to 1000 μm), wherein $d_{p50}$ is a median particle size where 50% of the particles of the distribution have a smaller particle size.

The proppants of the present application can, for instance, have a specific gravity of from about 0.6 g/cc to about 4 g/cc. The specific gravity can be from about 1.0 g/cc to about 3 g/cc or can be from about 0.9 &cc to about 2.5 g/cc, or can be from 1.0 g/cc to 2.5 g/cc, or from 1.0 glee to 2.4 g/cc, or from 1.0 g/cc to 2.3 g/cc, or from 1.0 g/cc to 2.2 g/cc, or from 1.0 g/cc to 2.1 g/cc, or 1.0 g/cc to 2.0 g/cc. Other specific gravities above and below these ranges can be obtained. The term "specific gravity" as used herein is the weight in grams per cubic centimeter (g/cc) of volume, excluding open porosity in determining the volume. The specific gravity value can be determined by any suitable method known in the art, such as by liquid (e.g., water or alcohol) displacement or with a gas pycnometer.

The proppant (green body and/or sintered proppant) can be spherical and have a Krumbein sphericity of at least about 0.5, at least 0.6 or at least 0.7, at least 0.8, or at least 0.9, and/or a roundness of at least 0.4, at least 0.5, at least 0.6, at least 0.7, or at least 0.9. The term "spherical" can refer to roundness and sphericity on the Krumbein and Sloss Chart by visually grading 10 to 20 randomly selected particles. As an option, in the present invention, the proppants of the present invention can have a very high degree of sphericity. In particular, the Krumbein sphericity can be at least 0.92, or at least 0.94, such as from 0.92 to 0.99, or from 0.94 to 0.99, or from 0.97 to 0.99, or from 0.95 to 0.99. This is especially made possible by the methods of the present invention, including forming synthetic templates on cores and using a spray dryer or similar device.

With regard to the proppant (either in the green body state or as a sintered proppant or both), the proppant can have a change in sphericity of 5% or less. This change in sphericity parameter is with respect to the proppant (either in the green body state or sintered proppant state) in the shape of a sphere and this change in sphericity parameter refers to the uniformity of the sphere around the entire surface area of the exterior of the sphere. Put another way, the curvature that defines the sphere is very uniform around the entire sphere such that the change in sphericity compared to other points of measurement on the same sphere does not change by more than 5%. More preferably, the change in sphericity is 4% or less or 3% or less, such as from about 0.5% to 5% or from about 1% to about 5%.

The proppants of the present invention can have a crush strength of 1,000 psi to 20,000 psi or higher (e.g., from 1,500 psi to 10,000 psi, from 3,000 psi to 10,000 psi, from 5,000 psi to 10,000 psi, from 9,000 psi to 12,000 psi). Other crush strengths below or above these ranges are possible. Crush strength can be measured, for example, according to American Petroleum Institute Recommended Practice 60 (RP-60) or according to ISO 13503-2.

The proppant can have a flexural strength in a range of from about 1 MPa to about 800 MPa, or more, such as 1 MPa to 700 MPa, 5 MPa to 600 MPa, 10 MPa to 500 MPa, 25 MPa to 400 MPa, 50 MPa to 200 MPa, and the like.

The proppant or part thereof can have a coefficient of thermal expansion (CTE at from 25° C. to 300° C.) of from about $0.1 \times 10^{-6}$/K to about $13 \times 10^{-6}$/K, such as from $0.1 \times 10^{-6}$/K to $2 \times 10^{-6}$/K or $1.2 \times 10^{-6}$/K to $1.7 \times 10^{-6}$/K. The proppant can have a MOR of from about 1 to about 800 MPa, such as 100 to 500 MPa.

The proppant can have a core and at least one shell surrounding or encapsulating the core. The core can comprise, consist essentially of or consist of one or more ceramic materials and/or oxides. The shell can comprise, consist essentially of or consist of at least one ceramic material and/or oxide. The examples of various ceramic materials or oxides thereof provided above can be used here in this proppant. The sintered proppant can have a core strength to shell strength ratio of from 0.8 to 1. As an option, the proppant can have an overall proppant strength to core strength ratio of 2 to 3. The reference to core strength is based on the strength measurement of the core alone without any shell, for instance, as tested in a crush strength measurement, for instance, according to API Recommended Practice 60 (RP-60). The shell strength is determined by diameteral splitting tensile strength test method based on ASTM C1144, Modulus of Rupture test based on ASTM C78, or Modulus of Rupture test based on ASTM C1609. Similarly, the overall proppant strength is based on the proppant with the core and shell tested for crush strength compared to the core strength alone. In the present invention, as an option, the core strength is equal to the shell strength, and can be below (lower than) the shell strength, and can be significantly below. The shell can be formed by a plurality of particles which are formed as a ceramic coating around or encapsulating the core and sintered to form a sintered continuous shell.

For purposes of the present invention, the plurality of green and/or sintered ceramic proppants can have a monodispersed size and this means that the production of the proppants from a process produces monodispersed proppants without the need for any classification. Also, a plurality of green and/or sintered ceramic proppants having a monodispersed distribution that is at least a 3-sigma distribution means that the plurality of green and/or sintered ceramic proppants is not achievable by standard air classification or sieving classification techniques. The "plurality," for purposes of the present invention, can refer to at least 1 kilogram of proppant, such as at least 5 kilograms, at least 10 kilograms, at least 50 kilograms, or at least 100 kilograms of proppant or other amounts, which would have this monodispersity of the present invention.

With regard to the plurality of sintered ceramic proppants, it is understood that the sintered ceramic proppants are preferably synthetically prepared. In other words, all components of the proppants are formed by processing into a desired green body shape that is ultimately sintered. Put another way, the sintered proppants of the present invention preferably do not have any naturally preformed spheres present (e.g., no preformed cenospheres), unless it is ground to particle sizes for use in forming the green body, or a part thereof. Thus, the sintered ceramic proppants of the present invention can be considered to be synthetically formed.

With the ceramic proppants of the present invention, various property improvements can be achieved. For instance, the crush strength/weight relationship or ratio is significantly improved. With the present invention, for the same size proppant, the proppants can achieve a higher crush strength (PSI) and, at the same time, permit more porosity in the proppant, which can be beneficial to lowering the specific gravity or density of the proppant. Porosity in a proppant is considered a flaw by those in the proppant industry and ceramic industry. However, the existence of pores or voids is important because even though these pores or voids are considered flaws, they permit the proppant to have a desirable lower specific gravity or density. However, there is a trade-off in that with porosity in the proppant, this leads to proppant failure due to affecting the overall crush strength of the proppant. Thus, there is a desired balance between crush strength and porosity. In previous proppants, this balance meant that the crush strength of a conventional proppant was lower than desired and, in fact, the desired porosity was lower than desired, since any increase in porosity would lead to a lower crush strength and a proppant that would be considered not desirable due to low crush strength. With the present invention, high crush strength in combination with high porosity can be achieved and this can be achieved by managing the flaw (pore or void) size, the flaw population, and/or flaw tolerance. One way to better understand the property balance achieved with the present invention is to provide several examples. For instance, for a ceramic proppant of the present invention having a $d_{50}$ size of 321±24 microns, the crush strength (as determined by API RP-60) was 3.73% fines at 20,000 psi, and this proppant had a total porosity (by volume based on the overall volume of proppant) of 7.98%. Another example is for a ceramic proppant of the present invention having a $d_{50}$ size of 482±30 microns, the crush strength (as determined by API RP-60) was 5.08% fines at 20,000 psi, and this proppant had a total porosity (by volume based on the overall volume of proppant) of 5.79%. A further way to understand the present invention is with respect to the strength/porosity relationship. The strength of a proppant (according to API RP-60) is given by the percentage of fines generated at a given load, say 20,000 psi. The relationship may be understood by taking the ratio of crush fines to the porosity, i.e. % fines/% porosity to give a dimensionless number which represents the strength/porosity relationship. By doing so with the present invention, a strength/porosity descriptor can be established which, in the present invention can be from 0.4 to 0.9, or from 0.46 to 0.88, or from 0.467 to 0.877, such as from 0.5 to 0.8, or from 0.5 to 0.85, or from 0.6 to 0.75, or from 0.55 to 0.7, or from 0.55 to 0.8 and the like.

The present invention further relates to obtaining synthetic templates (or cores), which can serve as a template to receive one or more shell layers or can be used by itself. In the present invention, the synthetic templates of the present invention can achieve very low fines when crushed at 20,000 psi. For instance, the 20,000 psi crush fines can average 5.5% (by weight of total templates) or less (e.g., 5% or less, 4% or less, 3% or less, 0.5% to 5.5%, 1% to 5%, and the like). The % can be considered weight % based on the total weight of material subjected to the crush test under API RP-60 or similar test. This 5.5% or less crush fines is especially applicable when the sintered $d_{50}$ size of the synthetic template is 500 microns or less, such as from 500 microns to 100 microns, or 475 microns to 200 microns, or 475 microns to 300 microns. This is also especially applicable when the specific gravity of the sintered synthetic template is 3 sg or lower, such as 2.9 sg to 2 sg, or 2.9 sg to 2.5 sg. The reference to "template" can be considered a "core" here and throughout the present application.

In the present invention, a proppant is provided by the present invention that contains a porous core, and a shell surrounding the core, the shell including a transition region and an outer shell surrounding the transition region, wherein an average transition region density is greater than an average outer shell density and the average shell density is greater than an average core density. An average transition region density can be from about 2.9 g/cm to about 4.0 g/cm³, an average outer shell density can be from about 2.7 g/cm³ to about 3.8 g/cm³, and an average core density can be less than about 2.0 g/cm³. The core can be porous, hollow or substantially hollow. A proppant is also provided by the present invention that contains a porous core, a transition region surrounding the core, and an outer shell surrounding the transition region, wherein an average transition region porosity can be less than an average outer shell porosity and the average outer shell porosity can be less than an average core porosity. The average transition region porosity can be from about 0 vol % to about 5 vol % based on the total volume of the transition region, the average outer shell porosity can be from about 5 vol % to about 10 vol % based on the total volume of the outer shell, and the average core porosity can be greater than about 40 vol % based on the total volume of the core. The core can be porous, hollow or substantially hollow. The average core porosity can be about 100 vol % based on the total volume of the core.

A proppant is provided by the present invention that contains a porous or hollow core, and a shell surrounding the core, the shell including a transition region and an outer shell surrounding the transition region, wherein an average transition region density (or percent solid phase) is greater than an average outer shell density (or percent solid phase) (e.g., by at least 5% greater, at least 10% greater, or at least 15% greater, such as from 5% to 100% greater, or 10% to 100% greater) and the average shell density (or percent solid phase) is greater than an average core density (or percent solid phase) (e.g., by at least 5% greater, at least 10% greater, or at least 15% greater, such as from 5% to 100% greater, or 10% to 100% greater). The core can be hollow, substantially hollow, or can be porous (e.g., at least 1% porous by vol, at least 5% porous by vol, at least 15% porous by vol, at least 25% porous by vol, such as from 1% to 85%, from 1% to 75% porous, from 1% to 60% porous, from 1% to 50% porous, from 1% to 40% porous, and the like).

A proppant is also provided by the present invention that contains a porous or hollow core, a transition region surrounding the core, and an outer shell surrounding the transition region, wherein an average transition region porosity can be less than an average outer shell porosity and the average outer shell porosity can be less than an average core porosity. The average transition region porosity can be from about 1% to 50% less (based on volume of pores in the region) (e.g., at least 1% less, at least 5% less, at least 10% less, at least 25% less, such as 1% to 40% less, from 1% to 30% less) than the average outer shell porosity. The core can be porous, hollow or substantially hollow. The average core porosity can be from about 70 to 100 vol % based on the total volume of the core.

The present invention also relates to a proppant comprising a porous core (or hollow core), a transition region surrounding the core, and an outer shell surrounding the transition region. The transition region has a glassy phase, wherein the average amount (by weight or by volume) of glassy phase in the transition region is more (e.g., by at least 5% greater, at least 10% greater, or at least 15% greater, such as from 5% to 100% greater, or 10% to 100% greater) than an average amount in the outer shell, and the average amount (by weight or by volume) of the glassy phase in the outer shell is less (e.g., by at least 5% less, at least 10% less, or at least 15% less, such as from 5% to 100% less, or 10% to 100% less) than an average amount of glassy phase in the porous core.

The present invention also relates to a proppant comprising a porous core (or hollow core), a transition region surrounding the core, and an outer shell surrounding the transition region. The transition region has a crystalline phase, wherein the average amount (by weight or by volume) of crystalline phase in the transition region is more (e.g., by at least 5% greater, at least 10% greater, or at least 15% greater, such as from 5% to 100% greater, or 10% to 100% greater) than an average amount in the outer shell, and the average amount (by weight or by volume) of the crystalline phase in the outer shell is more (e.g., by at least 5% more, at least 10% more, or at least 15% more, such as from 5% to 100% more, or 10% to 100% more) than an average amount of crystalline phase in the porous core.

A green body proppant is provided by the present invention that can contain a core having a weight ratio of $SiO_2$ to $Al_2O_3$ of 2.3 or higher and a combined weight percentage of $Na_2O$ and $K_2O$ of 5.0 or higher based on the total dry weight of the core. The green body proppant can further include a shell surrounding the core. Both the core and shell can be green bodies. The core can include at least 3% or at least 5.0 wt % of components having a melting point of less than 1200° C., and less than 97 wt % or less than 95 wt % of components having a melting point (or flow temperature or fusing temperature) greater than 1200° C. (or greater than 950° C.) based on the total dry weight of the core. The core can contain at least 3 wt % or at least 5.0 wt % of components having a melting point (or flow temperature or fusing temperature) of less than 1200° C., less than 7.0 wt % of components having a melting point (or flow temperature or fusing temperature) greater than 1200° C. and less than 1500° C., and less than 88 wt % of components having a melting point (or flow temperature or fusing temperature) greater than 1500° C.' based on the total dry weight of the core. The core can contain at least 5.0 wt % of components having a melting point (or flow temperature or fusing temperature) of less than 1200° C., less than 92 wt % of components having a melting point (or flow temperature, or fusing temperature) greater than 1200° C. and less than 2100° C., and less than 3.0 wt % of components having a melting point (or flow temperature or fusing temperature) greater than 2100° C. based on the total dry weight of the core.

Also in the present invention, a green body proppant is provided that comprises a core comprising at least 3 wt % (such as at least 5 wt %, from 3 wt % to 97 wt %, 3 wt % to 90 wt %, 3 wt % to 80 wt %, 3 wt % to 70 wt %, 3 wt % to 60 wt %, 3 wt % to 50 wt %, 3 wt % to 40 wt %, 5 wt % to 90 wt %, 10 wt % to 90 wt %, 15 wt % to 90 wt %, 20 wt % to 90 wt %) of components having a melting point (or flow temperature or fusing temperature) of less than 1200° C. and less than 97 wt % (such as less than 95 wt %, less than 90 wt %, less than 80 wt %, less than 70 wt %, less than 60 wt %, less than 50 wt %, less than 40 wt %, less than 30 wt %, from 96 wt % to 3 wt %, from 90 wt % to 5 wt %, from 80 wt % to 5 wt %, from 70 wt % to 5 wt %, from 60 wt % to 5 wt %) of components having a melting point (or flow temperature or fusing temperature) greater than 950° C. or greater than 1200° C. based on the total dry weight of the core.

A green body proppant is provided that comprises a core comprising at least 3 wt % (such as at least 5 wt %, from 3 wt % to 97 wt %, 3 wt % to 90 wt %, 3 wt % to 80 wt %, 3 wt % to 70 wt %, 3 wt % to 60 wt %, 3 wt % to 50 wt %, 3 wt % to 40 wt %, 5 wt % to 90 wt %, 10 wt % to 90 wt %, 15 wt % to 90 wt %, 20 wt % to 90 wt %) of components having a melting point (or flow temperature or fusing temperature) of less than 1200° C., less than 7.0 wt % (such as 0.1 wt % to 6.9 wt %, 0 wt % to 6.9 wt %, 0.5 wt % to 6 wt %, 1 wt % to 5 wt %, 0.5 wt % to 3 wt %) of components having a melting point (or flow temperature or fusing temperature) greater than 1200° C. and less than 1500° C., and less than 88 wt % (such as less than 80 wt %, less than 70 wt %, less than 50 wt %, less than 40 wt %, less than 30 wt %, less than 20 wt %, less than 10 wt %, from 0.1 wt % to 87.9 wt %, 0.5 wt % to 80 wt %, 1 wt % to 70 wt %, 5 wt % to 60 wt %, 5 wt % to 50 wt %, 10 wt % to 50 wt %, 10 wt % to 40 wt %) of components having a melting point greater than 1500° C. based on the total dry weight of the core.

A green body proppant is provided comprising a core comprising at least 3 wt % (such as at least 5 wt %, from 3 wt % to 97 wt %, 3 wt % to 90 wt %, 3 wt % to 80 wt %, 3 wt % to 70 wt %, 3 wt % to 60 wt %, 3 wt % to 50 wt %, 3 wt % to 40 wt %, 5 wt % to 90 wt %, 10 wt % to 90 wt %, 15 wt % to 90 wt %, 20 wt % to 90 wt %) of components having a melting point (or flow temperature or fusing temperature) of less than 1200° C., less than 92 wt % (such as less than 90 wt %, less than 80 wt %, less than 70 wt %, less than 60 wt %, less than 50 wt %, less than 40 wt %, less than 30 wt %, from 91 wt % to 3 wt %, from 90 wt % to 5 wt %, from 80 wt % to 5 wt %, from 70 wt % to 5 wt %, from 60 wt % to 5 wt %) of components having a melting point (or flow temperature or fusing temperature) greater than 1200° C. and less than 2100° C., and less than 3.0 wt % (such as 0 wt % to 2.9 wt %, 0.1 wt % to 2.9 wt %, 0.5 wt % to 2.5 wt %, 0.5 wt % to 2 wt %) of components having a melting point (or flow temperature or fusing temperature) greater than 2100° C. based on the total dry weight of the core.

A green body proppant is also provided by the present invention that includes a core, the core containing one or more fluxing agents and one or more non-fluxing ceramic materials, wherein the melting points of the fluxing agents are less than the melting points than the non-fluxing ceramic materials. The green body proppant can further include a shell surrounding the core configured to accept migration of the non-fluxing ceramic materials from the core during sintering. The chemical fluxing agent can include a metal salt, a metal oxide, or both. The metal oxide can include $Na_2O$, $K_2O$, or both. Other oxides, nitrides, carbides, or any combination thereof can be used as fluxing agents. The fluxing agent can be supplied by nepheline syenite, beta-spoduminene, or both. The non-fluxing, ceramic material includes $Al_2O_3$, $SiO_2$, or both.

The present invention provides a method of making a sintered ceramic proppant. The method can include forming a substantially spherical green body core comprising one or more ceramic particulate materials. At the same time or afterwards, a green body shell can be formed around the green body core, wherein the green body shell comprises at least one ceramic particulate material that results in a green core/shell body. The green core/shell body can be sintered, and, during sintering, at least a portion of the green body core can be diffused (or otherwise enter) into the green body shell to form a sintered ceramic proppant comprising a porous core, a transition region surrounding the core, and an outer shell surrounding the transition region, wherein an average transition region density is greater than an outer average shell density and the average outer shell density is greater than an average core density. The sintering can include heating the green/core shell body to any suitable temperature, for example, to at least 500° C., less than 1500° C., to at least 1200° C., less than 2000° C., or any combination thereof.

The green body core can have a weight ratio of $SiO_2$ to $Al_2O_3$ of 2.3 or higher and a combined weight percentage of $Na_2O$ and $K_2O$ of 5.0 or higher based on the total dry weight of the core. The green body core can contain at least 5.0 wt % of components having a melting point of less than 1200° C. and less than 95 wt % of components having a melting point greater than 1200° C. based on the total dry weight of the core.

The green body core can contain at least 5.0 wt % of components having a melting point of less than 1200° C., less than 7.0% wt % of components having a melting point greater than 1200° C. and less than 1500° C., and less than 88 wt % of components having a melting point greater than 1500° C. based on the total dry weight of the core.

The green body core can comprise at least 5.0 wt % of components having a melting point of less than 1200° C., less than 92 wt % of components having a melting point greater than 1200° C. and less than 2100° C., and less than 3.0 wt % of components having a melting point greater than 2100° C. based on the total dry weight of the core.

Suitable metal oxides and their melting temperatures are provided in Schneider, Compilation of the Melting Points of the Metal Oxides, National Bureau of Standards Monograph 68, 1963, which is incorporated by reference herein in its entirety.

The green body core can contain one or more fluxing agents and one or more non-fluxing ceramic materials, wherein the melting points of the fluxing agents are less than the melting points than the non-fluxing ceramic materials. The sintered ceramic proppant can have a hollow or substantially hollow core.

High quality ceramic aggregate or proppant can be optimized via a number of approaches including compositional, structural, and process design in accordance with the present invention. The core can be formed by any process, such as spray drying, granulation, or the like, or any combination thereof. The shell can be formed by any process that can result in a uniform coating, such as spray coating, dip coating, or the like, or any combination thereof. Both the core and the shell can be either dense or porous depending on the desired structure and the properties of the final product. By changing the chemical composition and thus the melting temperature of the core, the kinetics of diffusion from the core to the shell can be adjusted under given sintering conditions. Through precise control of composition and process, the specific gravity (SG), mechanical properties, and chemical durability of the proppant can be improved. For example, using chemical or mineral fluxes or a high-silica formulation in the aluminosilicate system can lower the viscosity of the viscous phase during sintering. Chemical fluxes can include materials such as metal oxides or metal salts; mineral fluxes would include materials like Nepheline syenite and β-spodumene.

The addition of low melting point fluxing agents such as Nepheline syenite or β-spodumene can promote diffusion (or migration) of the core material resulting in a hollow core and a highly dense region surrounding the core. The thickness of the highly dense region can be controlled by the chemical addition, the firing profile and the material choice of the flux. Alternatively, the diffusion (or migration) of the core can be retarded by the addition of matrix materials, such as alumina. Alumina additions to the core material can slow diffusion (or migration) yielding a porous core instead of a hollow one. The resulting scaffold structure in the core can reinforce the shell resulting in higher strength. By adjusting the coefficient of thermal expansion (CTE) of the shell and the core, the shell or the core can be made in such a way that the surface layer is in compressive stress, similar to tempered glass, to strengthen the whole structure. The pre-existing compressive stress in the surface layer can partially or completely cancel out the tensile stress induced by the external load on the proppant/aggregate. By converting the core or inner shell of the proppant into glass-ceramics to improve the fracture toughness of the core, thus the mechanical behavior of the whole proppant.

The glass to crystalline weight ratio (referred to here as a G/C ratio) can be controlled in the composition (formulation) used to form the core of the proppant and/or the shell of the proppant. The 'glass' is a reference to glassy components or primarily glassy components (e.g. amorphous materials) such as silica based materials like silicon oxides. The 'crystalline' is a reference to crystalline components or primarily crystalline components, such as alumina based materials, like alumina oxides. The 'glass' components generally will flow or melt before the crystalline components during sintering or high temperatures, and therefore can diffuse (or migrate) more readily into a surrounding region, such as a shell that surrounds or encapsulates the core material. Since the 'glass' can be silica oxide and can be the majority of the 'glass' components, and since the 'crystalline' can be alumina oxide and can be the majority of the 'crystalline' components, the glass to crystalline weight ratio can be measured based on the $SiO_2$ to $Al_2O_3$ weight ratio (referred to here as a S/A ratio) in the formulation used to form the green body of the core. To be clear, a mixed metal oxide, like alumina silicate, can be used to provide 'glass' and 'crystalline' components, and the weight ratios for 'glass' to 'crystalline' can be easily calculated from using mixed metal oxides.

For instance, by controlling the glass to crystalline weight ratio, the amount of diffusion (or migration) of the core material into the shell region can be controlled during sintering of the green body to form the sintered proppant.

To achieve no diffusion or slight diffusion (or low diffusion) of the material of the core into the shell regions, a low G/C ratio is used. The amount of material that is diffused from the core to the shell region is less than 5 wt or less than 3 wt %, or less than 1 wt %, or less than 0.5 wt % or zero. For instance, the G/C ratio can be below 0.5, below 0.75, or below 1, such as from 0 to 0.9, or from 0.1 to 0.74, or from 0.1 to 0.4.

To achieve diffusion (or migration) of the material of the core into the shell regions so as to achieve diffusion (or migration) that causes porous formation (or medium diffusion) in the core, or to achieve scaffolding in the core with hollow regions, or achieve diffusion (or migration) of the core that is irregular, the amount of material that diffuses is generally below 70 wt % of the core material, or below 50 wt % of the core material, or below 30 wt % of the core material (such as from 2 wt % to 69 wt % or 5 wt % to 49 wt %, or 10 wt % to 29 wt %), a medium G/C ratio is used. For instance, the G/C ratio can be from about 0.5 to about 2.3, or from about 0.75 to about 2.4, or from about 1 to about 2.4 and the like.

To achieve diffusion (or migration) of the material of the core into the shell regions so as to achieve high diffusion (or migration), which causes an irregular or regular hollow core formation, this is generally a diffusion (or migration) of the core material in an amount of 60 wt % or higher, or 70 wt % or higher, or 80 wt % or higher, or 90 wt % or higher or 95 wt % or higher of the core material into the shell regions. For instance, the G/C ratio can be above about 2.4, or from about 2.4 to about 3, or from about 2.5 to about 3, or about 2.5 to about 4 or higher.

The above G/C ratio numbers and ranges, can for purposes of the present invention, also apply to the S/A ratio numbers and ranges as well.

In addition to, or in the alternative, to the G/C ratios (or S/A ratios), the amount of low melting components (referred to here as LM amount and is a wt % amount based on total weight of the core composition) can assist in controlling the amount of diffusion (or migration) of the core material into the shell region. The low melting components can be for instance, $Na_2O$ and/or $K_2O$ and the like. Low melting can be a material that has a melting temperature of from about 350° C. to about 1200° C. or from about 500° C. to about 1200° C., or from about 900° C. to about 1200° C., or from about 800° C. to about 1100° C.

For instance, to achieve or contribute to no diffusion or slight diffusion of the material of the core into the shell regions, a low LM amount can be used. For instance, the LM amount can be below 2.85 wt %, such as below 2.7 wt %, or below 2.5 wt %, or below 2 wt %, or below 1.7 wt %, or below 1.5 wt %, or below 1 wt %, or below 0.75 wt %, or below 0.5 wt %, or below 0.2 wt %, such as from 0 to 2.84 wt % or from 0.1 wt % to 2.7 wt % and the like.

For instance, to achieve or contribute to diffusion (or migration) of the material of the core into the shell regions so as to achieve diffusion (or migration) that causes porous formation in the core, or scaffolding, or diffusion of the core that is irregular and diffusion (or migration) that is generally below 70 wt % of the core material, or below 50 wt % of the core material, or below 30 wt % of the core material (such as from 2 wt % to 69 wt % or 5 wt % to 49 wt %, or 10 wt % to 29 wt %), a medium G/C ratio is used. For instance, the LM amount can be from about 2.85 to about 3.7 wt %, from about 3 to about 3.7 wt %, from about 3 to about 4 wt %, or from about 3 to about 5 wt %, and the like.

For instance, to achieve or contribute to diffusion (or migration) of the material of the core into the shell regions so as to achieve high diffusion (or migration), which causes an irregular or regular hollow core formation, this is generally a diffusion (or migration) of the core material in an amount of 60 wt % or higher, or 70 wt % or higher of the core material, or 80 wt % or higher, or 90 wt % or higher or 95 wt % or higher of the core material into the shell regions. For instance, the LM amount can be above 5 wt %, such as from about 5.1 wt % to about 8 wt %, from about 5.2 wt % to about 8 wt %, from about 5.2 wt % to about 9 wt %, and the like.

Preferably, the G/C (or S/A) ratio for each respective diffusion goal (low, medium, or high) is combined with the appropriate LM amount for each respective diffusion goal (low, medium, or high). As an example, the G/C ratio for low diffusion can be used in combination with the LM amount for low diffusion, and so on.

Examples of the three levels of diffusion (low, medium and high) are shown below. As can be seen, in Example 1. Formula 1 would be an example of a low (or no) diffusion of the core into the shell. Formulas 2 and 3 would be examples of medium diffusion of the core into the shell. Formulas 4 and 5 would be examples of high diffusion of the core into the shell. This is further shown in the Figures that show fracture cross sections for each formula, 1 through 5. As can be seen in the Table below (and the Figures that correspond to the Table) for the Formulations for the core, a high S/A weight ratio, resulted in high diffusion and a much lower S/A weight ratio resulted in very low diffusion of the core material into the shell.

For purposes of the present invention, the term "diffusion" is used to describe, at times, the movement of a component or region of the particle or proppant and it is to be understood that in lieu of diffusion, the component or region of the particle or proppant, can enter another area or migrate to another area of the particle or proppant by diffusing, by infiltrating, by intrusion, by penetration, and the like.

Another way to achieve improved particle size distribution (PSD) and obtain and/or improve monodispersity of individual components used to form the green body or parts thereof (core and/or shell(s) and/or layers), the mixture of components used to form the green body or parts thereof (core and/or shell(s) and/or layers), or the green body itself, or the formed proppant (e.g., sintered proppant) is to use elbow-jet classification. This form of classification can apply the "Coanda Effect" which is the phenomena in which a jet flow attaches itself to a nearby surface and remains attached even when the surface curves away from the initial jet direction. In free surroundings, a jet of fluid (air or liquid) entrains and mixes with its surroundings as it flows away from a nozzle. When a surface is brought close to the jet, this restricts the entrainment in that region. As flow accelerates to try balance the momentum transfer, a pressure difference across the jet results and the jet is deflected closer to the surface eventually attaching to it. Even if the surface is curved away from the initial direction, the jet tends to remain attached. This effect can be used to change the jet direction. In doing so, the rate at which the jet mixes is often significantly increased compared with that of an equivalent free jet. This enhanced mixing, along with the controllable flow along the curved surface allows for a tuned separation of particles as a function of the particle size. This can be used alternatively or in addition or in connection with the methods set forth in U.S. Patent Application Publication No. 2014/0038859.

The present invention provides a green body proppant that can include a green body core comprising glassy material; and a green body shell surrounding the green body core and comprising coarse particles. The green body proppant can further include a glassy phase formation agent in the green body core, the green body shell, or both. The glassy phase formation agent can contain at least one silicate. The green body shell can have a porosity greater than the green body core. The green body shell can have a porosity of from about 1 vol % to about 80 vol % based on the total volume of the green body shell and the green body core can have a porosity of from about 1 vol % to about 80 vol % based on the total volume of the green body core. The green body shell can have an average glass transition temperature (Tg) greater than an average glass transition temperature of the green body core. The green body shell can have an average glass transition temperature (Tg) less than an average glass transition temperature (Tg) of the green body core.

A proppant is provided by the present invention that can include a porous or hollow core and a shell surrounding the core, the shell containing a transition region surrounded by an outer shell, wherein an average transition region density is greater than an average outer shell density, and/or the average outer shell density is greater than an average core density.

The present invention provides a method of making a sintered ceramic proppant. A substantially spherical green body core can be formed that contains one or more ceramic particulate materials including at least one glassy material. At the same time or afterwards, a green body shell is formed around the green body core, wherein the green body shell contains at least one ceramic particulate material that results in a green core/shell body. The green core/shell body can be sintered and, during sintering, at least a portion of said green body core can be diffused (or otherwise enter or migrate) into the green body shell to form a sintered ceramic proppant comprising a porous core, a transition region surrounding the core, and an outer shell surrounding the transition region, wherein an average transition region density is greater than an average shell density, the average outer shell density is greater than an average core density, and the transition region has a glassy phase content of at least 5 vol % based on the total volume of the transition region. A glassy phase formation agent can be present in the green body core, the green body shell, or both. Also, or in the alternative, a glassy phase retardation agent can be present in the green body core, the green body shell, or both. The green body shell can have a porosity greater than the green body core. The diffusing (or migration in general) can include diffusing the glassy material from the green body core to the green body shell to form the transition region. The sintering can include heating at a temperature greater than an average glass transition temperature of the green body core and less than an average glass transition temperature of the green body shell. The diffusing of the glass material occurs in accordance with one or more the following formulae:

$$\frac{Rf}{b} = \sqrt[3]{\frac{(1 + \sigma c \phi c - \phi s)}{1 - \phi s}}$$

wherein $\sigma_c$=fraction of core volume utilized, $\phi_c$=solid packing fraction for core $\phi_s$=solid packing fraction for shell, b=core radius, and $R_f$=Infiltrated zone radius;

$$\Delta P = P_1 - P_2 = \gamma \, \text{Cos}(\theta)\left(\frac{1}{b} - \frac{1}{rh}\right)$$

wherein $P_1$=Pressure at shell capillary, $P_2$=Pressure at the core, $\Delta P$=pressure difference, $\gamma$=Surface tension of liquid glass, $r_h$=average pore radius of the shell, b=core radius, and $\theta$=wetting angle glass on shell material;

$$\Delta P \cdot t = \frac{\eta}{Kw}\left[3\left(\frac{R}{b}\right)^2 - 2\left(\frac{R}{b}\right)^3 - 1\right]$$

wherein $$\Delta P = P_1 - P_2 = \gamma \cos(\theta)\left(\frac{1}{b} - \frac{1}{rh}\right),$$

η=liquid/glass viscosity, Kw=shell permeability, b=Core radius, R=infiltrated radius at time t, ΔP=pressure difference, γ=Surface tension of liquid glass, $r_h$=average pore radius of the shell, b=core radius, θ=wetting angle glass on shell material, and to=incubation time, time to form glass.

A proppant formed using any such method is also provided by the present invention.

By controlling the chemical composition of both the core and shell materials, a chemical or structural gradient can be formed thereby altering the direction and kinetics of diffusion under sintering conditions. Through precise control of composition and process, the specific gravity (SG), mechanical properties, and/or chemical durability of the proppant can be improved. Chemical fluxes can include materials such as metal oxides or metal salts. Mineral fluxes would include materials like nepheline syenite, β-spodumene, or the like.

By altering the chemical composition of the core, the surrounding shell, or both the shell and the core simultaneously, a chemical gradient can be developed through the green body. During sintering this chemical gradient can provide a thermodynamic driving force for diffusion. The chemical gradient can promote and/or retard diffusion (or migration in general) of particular species thereby altering the final microstructure of the body. For example, the addition of low melting point fluxing agents, such as Nepheline syenite or β-spodumene can promote diffusion (or migration) of the core material resulting in a hollow core and a highly dense region surrounding the core. The thickness of the highly dense region can be controlled by the chemical gradient, the firing temperature and the material choice of the flux. Alternatively, mutual diffusion (or migration) of the core and the shell can be retarded by decreasing the chemical gradient of matrix materials, such as alumina. Alumina additions to the core material can slow diffusion yielding a porous core instead of a hollow one. The resulting scaffold structure in the core can reinforce the shell resulting in higher strength. For example, a ceramic body of identical core and shell composition would have negligible long-distance material diffusion at sintering temperature.

By varying the composition of the spray slurry, a chemical gradient can be introduced directly within the coating. During sintering, this gradient can serve to reinforce or counteract the chemical gradient created by a difference in chemical composition between the core and the shell. Controlling the slurry composition gradient can reinforce diffusion (or migration) towards the outer shell of the aggregate or serve to limit diffusion (or migration) to a specified region. A slurry composition with a chemical gradient opposed to that of the core can serve to limit diffusion (or migration) to a small intermediate region between the core and the outer shell. In this way, a microstructure with controlled layers of varying density can be introduced. This layering can be introduced by varying the composition of layers deposited sequentially during the coating process. The diffusion (or migration) distance can also, or in the alternative, be controlled by changing the green packing of the core or the shell. By varying the particle size distribution of the slurry during the coating process, a shell with a green structural gradient can be formed. The green packing of the core can be changed, for a given solids loading, through the addition of flocculating agents such as fumed silica (for example, CABOSIL, available from Cabot Corporation of Boston Mass.) or polyethylene oxide. Higher flocculation in the template formation process can lead to a lower green density of the template. During sintering, diffusion rates for higher viscosity liquids can vary for loosely packed and tightly packed regions.

The coefficient of thermal expansion (CTE) of the shell and the core can be adjusted. Thus, the shell or the core can be made in such a way that the surface layer is in compressive stress, similar to tempered glass, to strengthen the whole structure. The pre-existing compressive stress can partially or completely cancel out the tensile stress induced by the external load on the proppant/aggregate.

Accordingly, a green body proppant is provided by the present invention that includes a core and/or shell, wherein the green body proppant includes a chemical gradient having a plurality of stages across the core, the shell, or both. The gradient can include a variation in ceramic material, glass material, or both with respect to an average melting point of the material at consecutive stages. The average melting point of consecutive stages can increase, decrease, or both in a direction outward from the core toward the shell. An amount of disodium oxide, dipotassium oxide, or both can vary along the chemical gradient, for example, the amount can decrease, increase, or both in a direction outward from the core toward the shell. An amount of silicon dioxide, alumina, or both can vary along the chemical gradient, for example, the amount can decrease, increase, or both in a direction outward from the core toward the shell. A sintered proppant formed from any such green proppant is also provided.

A method of forming a sintered proppant is provided by the present invention that can include forming a green body proppant containing a core, a shell, or both; creating a chemical gradient in the green body proppant during the formation; and sintering the green body to form a sintered proppant. A method of forming a sintered proppant is also provided that can include forming a green body proppant containing a core, a shell, or both; and adjusting the coefficient of thermal expansion (CTE) to strengthen the compressive strength of the resulting sintered proppant sufficient to partially or completely cancel out tensile strength of an external load applied to the resulting proppant. Sintered proppants formed from such methods are also provided.

As described in U.S. patent application Ser. No. 13/952,090 filed Jul. 26, 2013 and incorporated in its entirety by reference here, the crystalline aggregate or proppant can be optimized via a number of approaches including compositional, structural, and process designs. The core of the proppant onto which the crystalline shell is formed can be formed by any process, such as spray drying, granulation, and the like. The shell itself can be formed by any process that can result in a uniform coating, such as spray coating, dip coating, and the like. Both the core and the shell can be either dense or porous depending on the desired structure and the properties of the final product.

Elbow-jet classification can be used in the manufacture of crystalline proppant, such as in two general ways as follows.

First, the raw materials that may be utilized in the manufacture of the core template or coating slurry may be size classified using elbow jet classification techniques/equipment. The ability to tightly control PSD in these materials allows for a number of potential advantages to accrue, including the ability to make a compositionally or morphologically more uniform template or shell. For example, SiC or carbon black of a very tightly defined PSD such as can be achieved using an elbow jet classifier might be included in the shell material. During sintering of the template/shell proppant structure, the SiC/carbon black may decompose in a very uniform way to generate porosity that is very uniform in terms of size and distribution of pores. Alternatively, non-reactive moieties such as tabular alumina plates may be classified to a very tight PSD and included as additives to the shell in such a way as to add strength to the finished sintered proppant.

Second, after the proppant has been fully sintered, elbow-jet classification techniques/equipment can be utilized to separate the proppant into very tightly defined fractions (such as at a high production rate) at a tighter PSD than can typically be achieved via commercial methods like screening, where typical Coefficient of Variances for current commercial methods can be 20% or more.

Elbow-jet classification techniques, that can be used here, include those methods/techniques described in U.S. Pat. Nos. 4,153,541, 4,802,977, 4,844,349, 5,712,075, 6,015,048, and 6,015,648, each incorporated in their entirety by reference herein.

As an example, a continuous flow of proppant or parts of a proppant (e.g. green body or one or more components used to form the green body) can be separated in a continuous centrifugal classifying method into at least one fraction of coarse material and at least one fraction of fine material using a deflected flow with the stream of material introduced in a thin layer into a classifying flow which is deflected in a classifying region, the classifying flow being internally adjacent a curved inner deflection wall having an inner deflection angle greater than approximately 45 DEG and, the classifying flow also extending externally along a smaller outer deflection angle which is not defined by a wall but along which an outer flow for discharging the fraction of coarse material is established flowing substantially parallel to the inner deflection wall with the ratio between the radii of the outer and inner curvature being less than approximately 5 to 1, with the material to be classified introduced in the neighborhood of the beginning of the curvature of the inner deflection wall with a speed component in the direction of classifying flow which is at least half the speed of the classifying flow and which is in a direction which does not deviate by more than 45 DEG from the direction of the classifying flow with the fine material being primarily discharged with the outflowing classifying flow after being fanned out and the coarse material discharged with the external flow.

As a further example, a process for classifying proppant particles can be achieved by supplying through a supply nozzle into at least three fractions in a classifying chamber divided into at least three sections and placed under a reduced pressure under the action of the inertia force of the material or particles supplied together with a gas stream and the centrifugal force of the curved gas stream due to a Coanda effect. A first gas introduction pipe and a second gas introduction pipe are disposed above the classifying chamber so as to provide a first inlet and a second inlet opening with the first inlet being disposed closer to the supply nozzle than the second inlet. The absolute values of the static pressures P1 and P2 in the first and second gas introduction pipes are controlled so as to satisfy the relations of: $|P1|>/=150$ mm.aq., $|P2|>/=40$ mm.aq. and $|P1|-|P2|>/=100$ mm.aq. As just an example, the process can involve generating a reduced pressure in a classifying chamber which is divided into at least three sections including a coarse powder section having a first outlet for withdrawing a coarse powder, a medium powder section having a second outlet for withdrawing a medium powder, and a fine powder section having a third outlet for withdrawing a fine powder, by sucking the classifying chamber through at least one of the first to third outlets; supplying to the classifying chamber a feed material comprising particles of 20 μm or less in particle size in a proportion of 50% or more by number through a supply pipe having a supply nozzle opening into the classifying chamber at a velocity of 50 m/sec to 300 m/sec along with a gas stream flowing through the pipe; controlling the absolute value of a static pressure $P_1$ to 150 mm.aq. or above in a first gas introduction pipe having a first gas inlet opening into the classifying chamber at a position upstream of the first gas inlet by a first gas introduction control means; controlling the absolute value of a static pressure $P_2$ to 40 mm.aq. or above in a second gas introduction pipe having a second gas inlet opening into the classifying chamber at a position just upstream of the second gas inlet by a second gas introduction control means, the second gas inlet being disposed farther than the first gas inlet with respect to the supply nozzle; and distributing the feed material supplied to the classifying chamber into at least the coarse powder section, the medium powder section and the fine powder section utilizing inertia force of the feed material or particles in the gas stream and centrifugal force of the curved gas stream imparted by a Coanda effect, wherein the absolute value $|P_1|$ of the static pressure $P_1$ and the absolute value $|P_2|$ of the static pressure $P_2$ satisfying the relation of $|P_1|-|P_2|>=100$ (mm.aq.).

A gas current classifier can have a material feed nozzle, a Coanda block, a classifying wedge and a classifying wedge block having the classifying wedge. The Coanda block and the classifying wedge define a classification zone, and the classifying wedge block can be set up in the manner that its location is changeable so that the form of the classification zone can be changed. As just an example, in a process for classifying proppant or parts thereof, the following can be done: feeding to a gas current classifier a plurality of proppant or green bodies, or one or more components that form the green body having a true density from 0.3 to 3.5 g/cm$^3$ (such as 0.7 to 2.7 g/cm$^3$) (hereinafter referred to as 'material'), wherein the gas current classifier comprises a material feed nozzle, a Coanda block, classifier side walls and a plurality of classifying wedge blocks each having a classifying wedge; transporting the material on an air stream passing inside the material feed nozzle; introducing the material into a classification zone defined between the Coanda block and the classifier side walls; classifying the material by utilizing the Coanda effect, to separate it into two or more particle size groups, such as but not limited to, at least a coarse powder group, a median powder group and a fine powder group by means of the plurality of classifying wedges. The method can employ classifying wedge blocks shiftable across the classification zone to selectively change distances $L_1$, $L_2$ and $L_3$ in said classification zone; and/or selectively shifting the classifying wedge blocks prior to the feeding step to satisfy the following conditions: $L_0>0$, $L_1>0$, $L_2>0$, $L_3>0$; $L_0<L_1+L_2<NL_3$, where $L_0$ represents a height-direction diameter (mm) of the discharge orifice of the material feed nozzle; $L_1$ represents a distance (mm) between the sides facing each other, of a first classifying wedge for dividing the powder into the median powder group and the fine powder group and the Coanda block provided oppositingly thereto; $L_2$ represents a distance (mm) between the sides facing each other, of the first classifying wedge and a second classifying wedge for dividing the powder into the coarse powder group and the median powder group; $L_3$ represents a distance (mm) between the sides facing each other, of the second classifying wedge and a side wall standing opposingly thereto; and n represents a real number of 1 or more.

As a further example, a gas current classifier can be used, which comprises a classifying chamber, a material feed nozzle for introducing a material powder into the classification zone of the classifying chamber, and a Coanda block for classifying the material powder thus introduced by the Coanda effect to separate the powder into at least a fraction of fine powder and a fraction of coarse powder, wherein the material feed nozzle has a material receiving opening for introducing the material powder into the material feed nozzle the material powder is introduced into the classification zone from an orifice of the material feed nozzle while its flow is accelerated by the gas stream within the material feed nozzle and the Coanda block is provided at a position higher than the orifice of the material feed nozzle. The gas current classifier can comprise a classifying chamber, a material feed nozzle for introducing a material powder in a gas stream into the classification zone of the classifying chamber, a Coanda block for classifying the material powder thus introduced by the Coanda effect to separate the powder into at least a fraction of fine powder, a fraction of medium powder and a fraction of coarse powder, and a low block at the lower part of the classifying chamber, wherein said classification zone is defined by at least the Coanda block and a classifying edge, a location of said classifying edge is changeable, said low block has a knife edge-shaped gas-intake edge and gas-intake pipes opening to the classifying chamber for introducing a rising current of air into the classification zone, a location of said gas-intake edge is changeable, said material feed nozzle has a material receiving opening at the upper part of the material feed nozzle for introducing the material powder into the material feed nozzle and an injection nozzle at the rear end of the material feed nozzle, such that said material powder is accelerated by the gas stream fed through the injection nozzle within the material feed nozzle, a fraction of fine powder in the material powder forms an upper stream within the material feed nozzle and a fraction of coarse powder in the material powder forms a lower stream within the material feed nozzle; and said Coanda block is provided at a position higher than the orifice of the material feed nozzle for classifying the powder as the rising current of air from the gas-intake pipes lifts the powder into the classifying zone, whereby the flows of the upper stream and the lower stream are not disturbed, the flow of coarse powder is classified in an outer circumference of the classifying zone and the flow of fine powder is classified in an inner circumference of the classifying zone, by the Coanda effect.

As a further example, a gas stream classifier can be used that has a gas stream classifying means for classifying a feed powder supplied from a feed supply nozzle, into at least a coarse powder fraction, a median powder fraction and a fine powder fraction by an inertia force acting on particles and a centrifugal force acting on a curved gas stream due to a Coanda effect in a classification zone, wherein the classification zone is defined by at least a Coanda block and a plurality of classifying edges, the feed supply nozzle is attached at the top of the gas stream classifier, the Coanda block is attached on one side of the feed supply nozzle, and the feed supply nozzle has at its rear end a feed powder intake portion for supplying the feed powder, and a high-pressure air intake portion.

The proppants of the present invention can be made as follows. A slurry containing green particles (e.g., milled particles) can be prepared, which ultimately is fed into a spray dryer. The materials that form the green body can be considered the green body material that is a mixture and is formed into a slurry of green body material. The spray dryer, based on the nozzle design, creates green bodies having desired shapes. For instance, the green bodies can have a highly spherical shape and roundness. The diameter of the green bodies can typically be from about 10 microns to about 1,000 microns, such as from about 20 microns to about 250 microns. In making the slurry containing the green particles, the particles are generally a mixture of two or more ceramic and/or ceramic precursor materials. The green particles that are in the slurry can have a particle size of from about 0.3 micron to about 50 microns, such as from about 0.5 micron to about 5 microns. The green particles that are present in the slurry that ultimately form the green body can be initially prepared by taking the raw materials that form the green body, namely ceramic and/or ceramic precursors, and reducing the size of the material to the desired diameter, such as by attrition milling or other milling techniques.

As an option, in the present invention, the green body, for instance, that can form a template or core, can be solid throughout the green body. In other words, as an option, there is no void, including no center void. Put another way, the green body is not a hollow green body. With the present invention, even though the green body can be a solid throughout the green body, the resulting proppant which is a sintered proppant, can result in having a void in the center of the sintered proppant or can result in two or more hollow regions, or porous regions. In other words, the sintered proppant can be hollow in the center, or can have two or more hollow regions or pores or cells or hollow portions in the center region of the sintered proppant. This can occur when the green body is comprised of a solid core and at least one shell-forming material forms a shell around the core. The green body that comprises the green body core and green body shell can be sintered, and, during sintering, part or all of the core diffuses (or otherwise enters) to or within the shell, such as in a very systematic way or in a random way. This diffusion (or migration in general) can be in an outward radial direction from the center of the core to the outer surface of the proppant. This results in forming a hollow portion(s) or void(s) in the proppant generally in the location of the core (e.g., geometrical center of proppant sphere). This hollow void(s) or hollow region(s) or cell(s) generally can be the shape and size of the original green body or a portion thereof that formed the core (e.g., from 0.01% to 100%, 0.1% to 100%, 0.5% to 100%, 1% to 90%, 2% to 90%, 5% to 90%, 7% to 80%, or 10% to 100% by volume of the green core, or 20% to 80%, or 30% to 70%, or 40% to 60% by volume of the green core). From 0.01% to 100%, 0.1% to 100%, 0.5% to 100%, 1% to 90%, 2% to 90%, 5% to 90%, 7% to 80%, or 10% to 100% by weight of the green core, or 20% to 80%, or 30% to 70%, or 40% to 60% by weight of the green core can diffuse (or otherwise migrate) from the core to the shell, to form one or more hollow regions or areas in the core. As stated, at least some of the material that formed the core of the green body diffused (or migrate) into the shell which surrounds this hollow space. This diffusion (or migration) provides a mechanism for strengthening the shell, as well as the overall proppant. With the present invention, any amount (by weight) or volume of the core can diffuse (or migrate) to the shell. This diffusion (or migration) can leave hollow pockets or voids or hollow regions or pores. The hollow pockets or voids or hollow regions or pores can be random in location in the core area. The size of each of the hollow pockets or voids or hollow regions or pores can be the same, substantially the same or different from other hollow pockets or voids or hollow regions or pores in the core formed by diffusion (or migration). The hollow pockets or voids or hollow regions or pores can be irregularly shaped and/or can be different in shape, and/or size, and/or other parameters from other hollow pockets or voids or hollow regions or pores formed in the same core. The hollow pockets or voids or hollow regions or pores can have a size of from 0.5 nm to 100 nm or more, from 1 nm to about 100 nm. The hollow pockets or voids or hollow regions or pores that form can create an appearance of a network of pores or cells (e.g., opened and/or closed cells) within the core. The areas diffused (or other migrated from) can be considered hollow regions or form a scaffolding appearance. The hollow pockets or voids or hollow regions or pores can be isolated from each other, meaning not interconnected. As an option, some or all of the hollow pockets or voids or hollow regions or pores can be interconnected. Some or all of the hollow pockets or voids or hollow regions or pores can have an appearance of air cells that form in air blown polyurethane. The hollow pockets or voids or hollow regions or pores that form can have any population in the core, such as from 1 to 1.000 or more, such as 2 to 1,000, 10 to 1,000, 50 to 1,000, 100 to 1,000, 200 to 1,000, 300 to 1,000 and the like.

As indicated, the core may partially diffuse (or migrate) into the shell structure thereby leaving a porous or partially hollow core. Any amount of material may diffuse (or migrate) from the core, for example from 1 wt % to 95 wt % or more, based on the weight of the green core. The element or elements or material to diffuse (or migrate) from the core typically have lower melting temperatures than do the surrounding materials. Glassy materials and/or regions can generally diffuse (or migrate), such as ones with a melting temperature or glass transition temperature lower than the shell or one or more components that form the shell. Generally crystalline materials and/or regions do not diffuse (or migrate) or easily diffuse (or migrate) or are resistant to diffusing (or migration). The depth and degree of diffusion (or migration) can be altered by changing the chemical composition of the green body material that forms the core. Additionally, the viscosity and material properties of the core material may be altered through the addition of select dopants.

Thermally assisted diffusion (or migration) can be due to chemical gradients within the ceramic body. At high temperatures, select material species may diffuse (or migrate) from areas of high concentration to areas of lower concentration. Capillary forces can also contribute to diffusion (or migration), pulling liquid components into the shell matrix. Additionally, an electric or magnetic field may be used to provide assist diffusion (or migration) through the formation of an electrochemical gradient.

Figure 2:
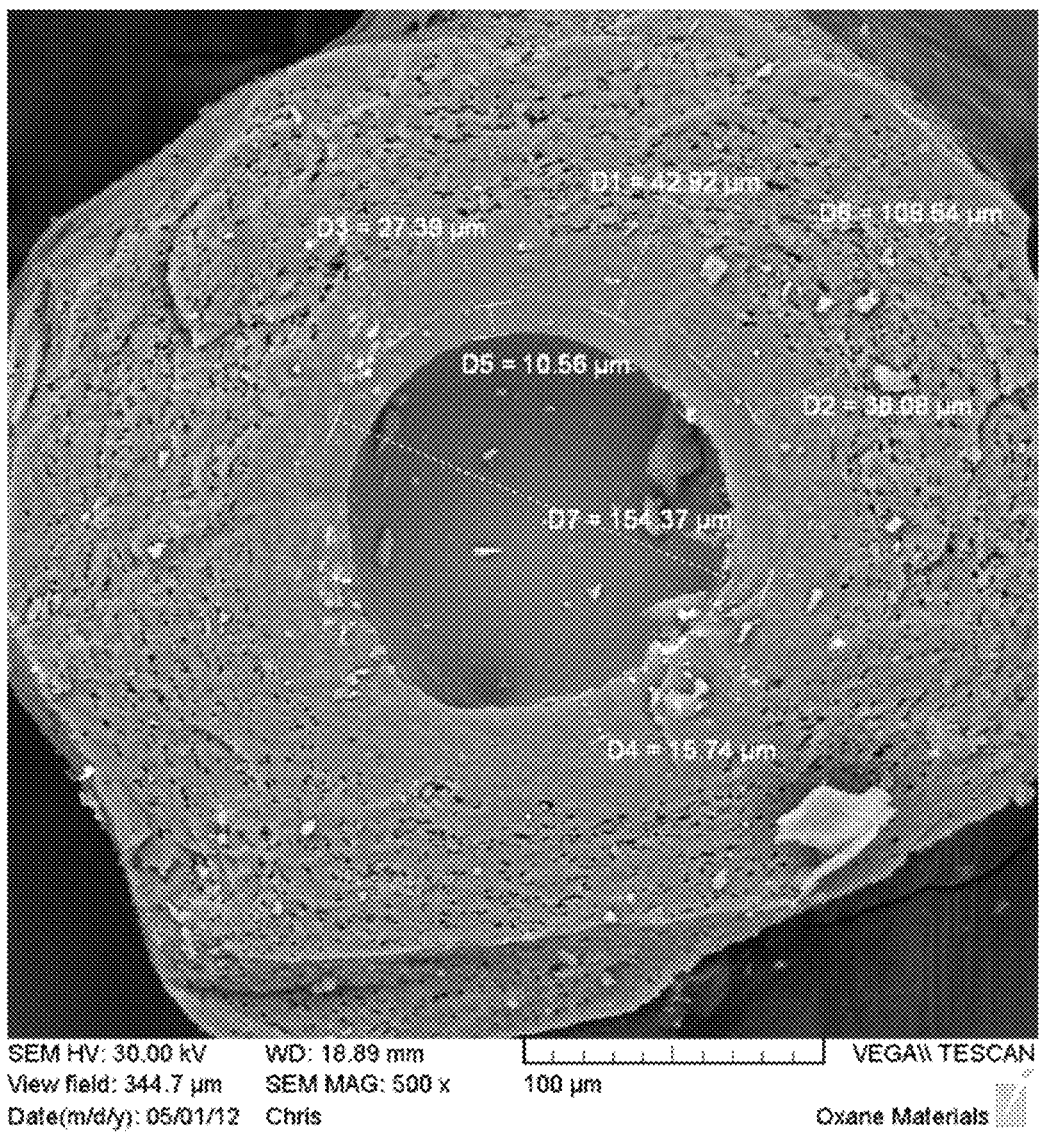
FIG. 2 is a SEM image of the cross-section of an example of a ceramic synthetic proppant of the present invention, showing the fractured surface with a hollow core formed by outward radial diffusion (or migration) of at least a portion of the core during sintering.
Figure 3:
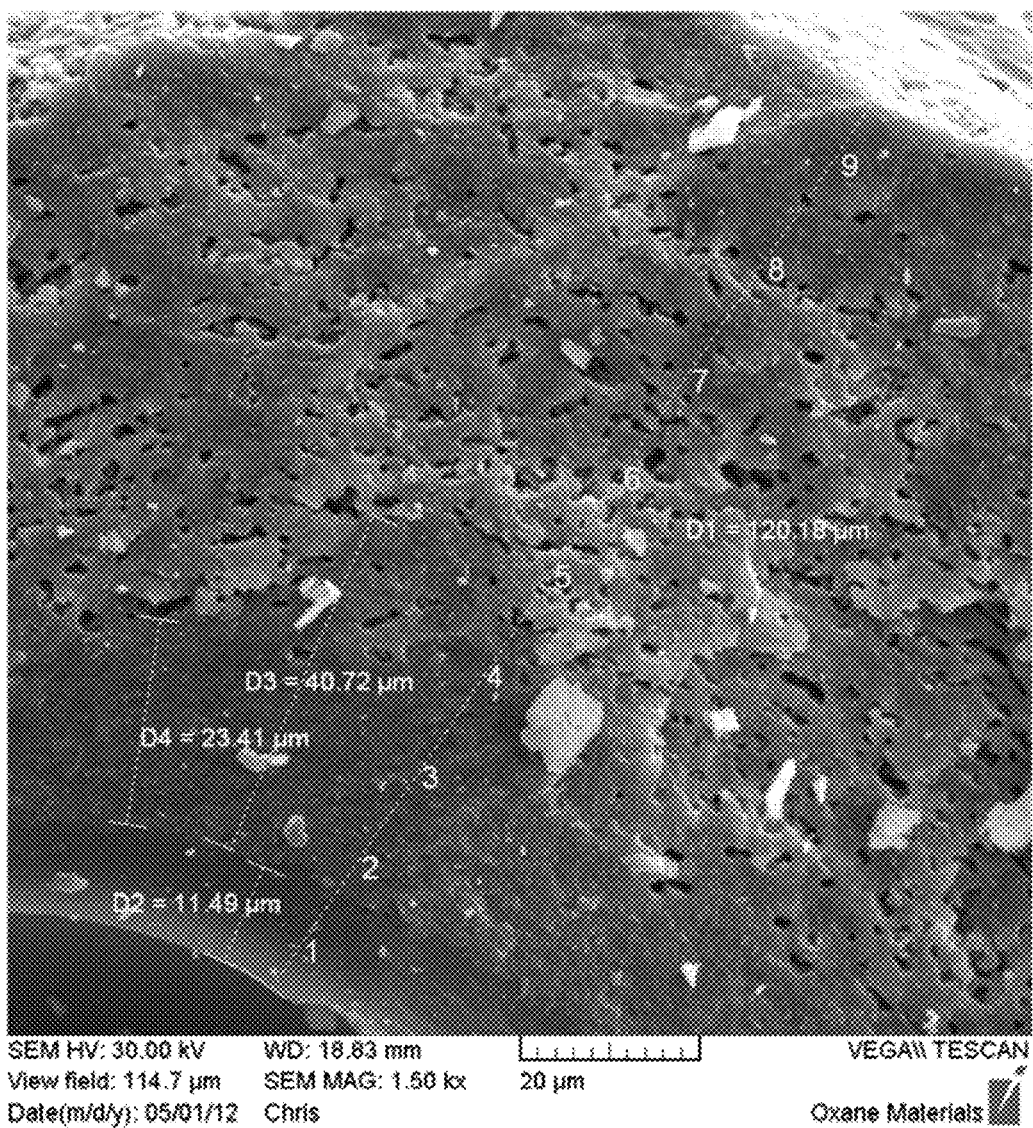
FIG. 3 is a SEM image at a higher magnification of FIG. 2 of the cross-section of the ceramic synthetic proppant of the present invention, showing the fractured surface with a hollow core formed by outward radial diffusion (or migration) of at least a portion of the core during sintering.

FIG. 2 is an SEM showing the fracture surface of a proppant with a hollow core formed by outward radial diffusion (or migration) of the melted template during sintering. A dense diffusion region can be seen immediately surrounding the hollow core where the template once existed. This is in direct contrast with the microporous region on the outer edges of the proppant. FIG. 3 shows the same proppant at a higher magnification.

Figure 4:
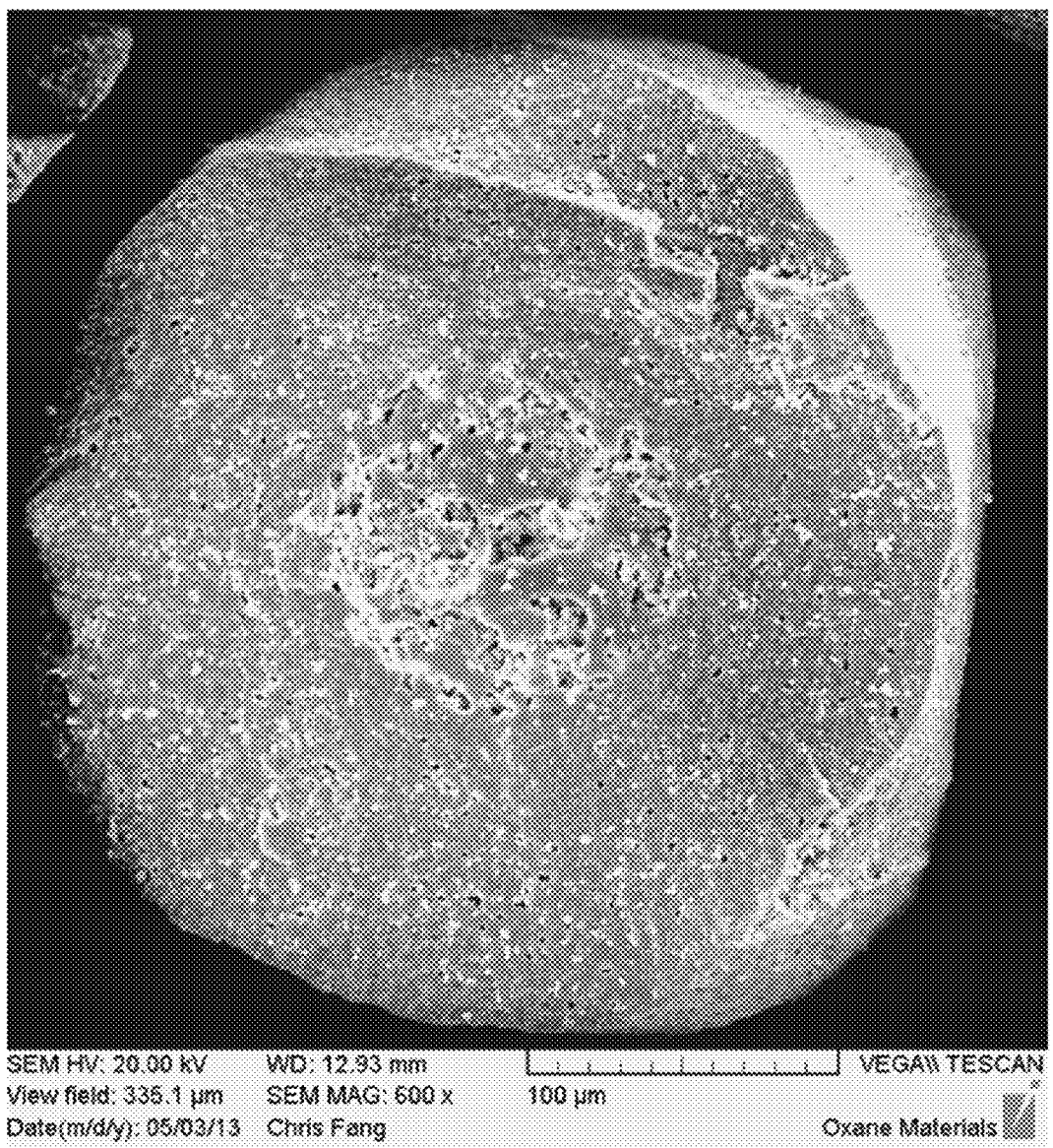
FIG. 4 is a SEM image of the cross-section of an example of a ceramic synthetic proppant of the present invention, showing the fractured surface with a porous core or hollow regions formed by outward radial diffusion (or migration) of a small portion of the core during sintering. The diffusion (or migration) here was less than in FIG. 2, thus no hollow core resulted, but instead a plurality of hollow regions or porous areas.
Figure 5:
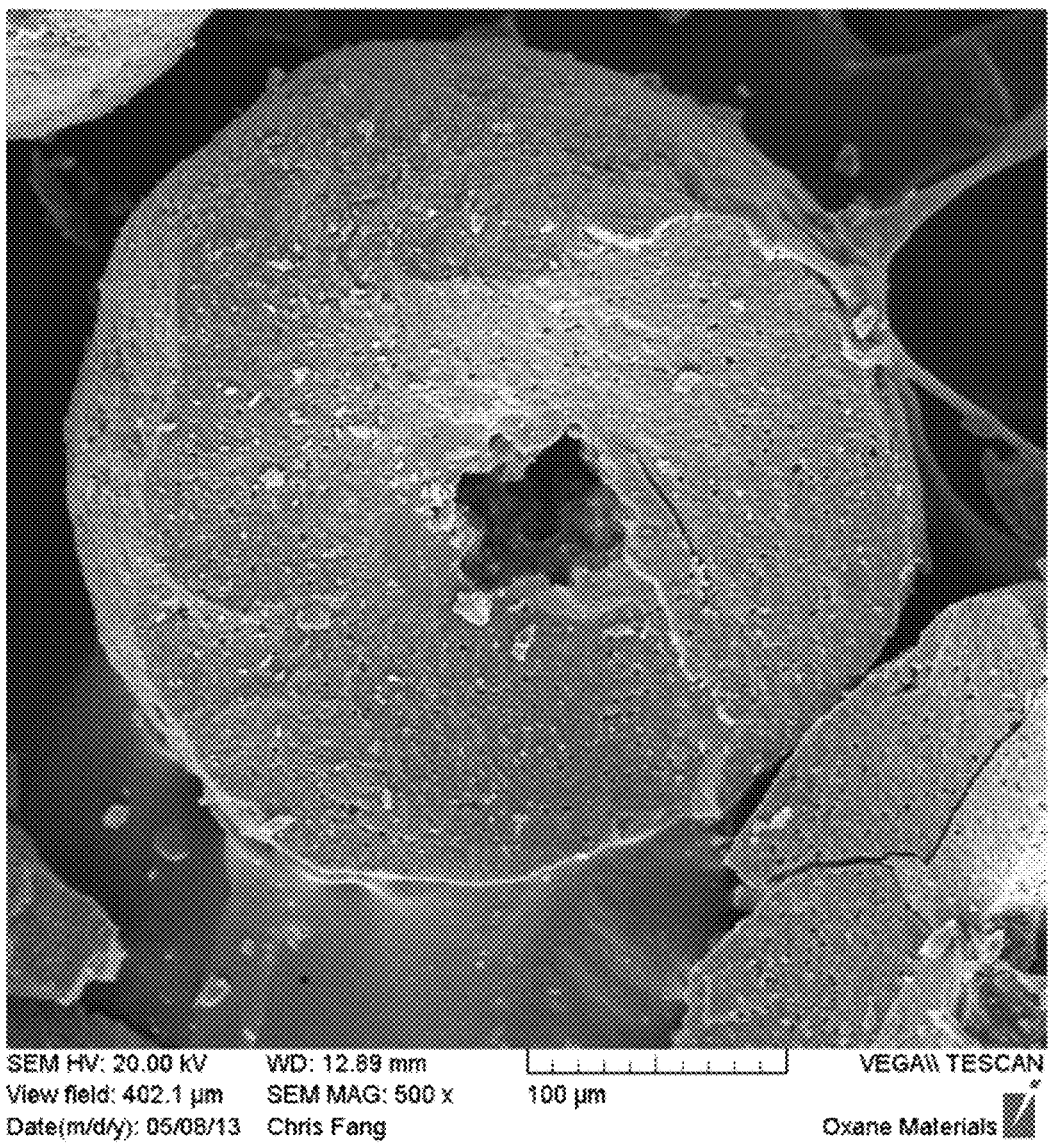
FIG. 5 is a SEM image of the cross-section of an example of a ceramic synthetic proppant of the present invention, showing the fractured surface with a hollow core formed by outward radial diffusion (or migration) of at least a portion of the core during sintering. In this Figure, the hollow core formation was irregular and less than in FIG. 2.

Alternatively, the template may partially diffuse (or otherwise migrate). An example of partial diffusion (or migration) is shown in FIG. 4. FIG. 4 is an SEM micrograph of the fracture surface of a proppant fabricated from a synthetic template. In this case, alumina was added to constrain diffusion (silica/alumina wt. ratio=1.27) resulting in the highly porous, but not hollow, region seen at the center of the image. This scattered random porous regions can be considered hollow regions or cells. FIG. 5 is the fracture surface of another proppant formed by synthetic template. In this case, the silica/alumina wt. ratio was altered to 2.27 to lower the melting temperature of the core. As a result, a hollow cavity (irregularly shaped) was formed in the center of the proppant. In this example, while a hollow cavity was formed, the diffusion (or migration) was partial and thus the cavity formed was irregularly shaped.

In addition to dopant selection and concentration, the degree of diffusion (or migration) can be controlled by the firing temperature. As one example, Table A lists the diffusion (or migration) depth for proppant of the same formulation, but fired at different temperatures. By altering the firing temperature, varied microstructures can be formed from the same template and shell formulation.

TABLE A

Radial diffusion (or migration) depth of synthetic template in the shell at different temperatures

| Sample No. | Temperature, ° C. | Diffusion (Migration) depth, um |
|---|---|---|
| 1. | 1000 | ~0 |
| 2. | 1100 | 15 |
| 3. | 1200 | 24 |
| 4. | 1250 | 30 |

Test methods for determining the magnitude of residual strain within the matrix. The residual strain due to thermal mismatch caused by the diffusion (or migration) of the template material into the shell matrix can be determined by collecting the electron diffraction pattern of a specific crystalline phase present in the matrix during transmission electron microscopy (TEM) analysis. The presence of strain within the crystalline phase, and consequently the matrix will manifest itself as a deviation in the electron diffraction pattern shape and spot positions from the unstrained condition. The magnitude of the deviation from the unstrained case would allow calculation of the magnitude of the residual strain responsible for such shifts in the electron diffraction pattern.

Another method to determine the presence of residual strain is through the use of nano-indentation. In the case of an unstrained material, the dimensions of the indentation impression and any radial cracks formed at the vertices of the indentation site are solely dependent upon the material properties. The presence of a residual strain in the matrix would lead to a change in both the indentation impression dimensions and the dimensions of the radial cracks. In the case of the residual strain component being compressive, the indentation impression dimensions would be smaller than the unstrained case and the resulting radial cracks (if any) would be much shorter than the unstrained case. In the case of a tensile residual strain being present, the indentation impression dimensions would be larger and the radial cracks would be longer than the unstrained case.

As shown in FIG. 1, based on the schematic or diagram shown, a sintered proppant with a central void (90) is shown. The sintered proppant has a geometrical center within the sphere (110), and the central void (108) can be located in the center part of the sphere which is where part or all of the green core was located prior to diffusing (or migrating) into the shell (95). As indicated, and as shown in other Figures, multiple hollow pockets or regions or cell can instead be formed by diffusion (or migration). More specifically, the interface between the hollow void formed in the shell interface is shown as (106). The region from the area starting at about 104 to the interface 106 can be representative of where a majority (by weight) of the green core diffuses (or migrates) (over 50 wt % of the diffused material) into the shell area. Area 102 in FIG. 1 is representative of where very little or no core material diffuses (or migrates) (e.g., less than 25 wt % (or less than 20 wt %, or less than 15 wt %, or less than 10 wt %, or less than 5 wt % of the diffused (migrated) material) into the shell and can consist of the shell material only in a sintered state. 100 is the surface of the proppant. As shown in the three graphs that are part of FIG. 1, which are in alignment with the proppant diagram, one can see that the porosity, of course, is highest in the central void area and that is due to the diffusion (or migration) of part or all of the green core into the shell regions. Initially, the porosity from the void-solid interface (106) to area 104 (the circumference of 104), the porosity is low because the diffusion (or migration) of the core material fills the pores (if any) in the circumferential region between 106 and 104. Then, in the circumferential area from 104 to 102, the porosity is higher (approximately 1% to 20% higher by volume) than region 104 to 106 because the porosity in this area has not been filled or not substantially filled with any diffused (migrated) core material. Then, the circumferential area from 102 to 100 (the surface of the proppant) has very little or no porosity (e.g., from 0% to 5% by volume in this area) because a higher temperature is typically reached in this area during sintering and this removes or closes all or most of the pores at this near surface region. Thus, as an example, the proppant of the present invention can have a central void with porosity that is highest in the central location of the shell with regard to radius of the sphere. More specifically, the region from A to B shown in FIG. 1 has from 0% to 5% (by volume) of porosity, such as from 0% to 1% by volume porosity. The region from B to C has porosity on the order of from 5% to 30% by volume of that region, more specifically from 10% to 20% by volume in that region, and the region from C to D has porosity that is the same or about the same as the porosity from region A to B (±10%). The region from A to B can be considered the first region; the region from B to C can be considered the second region or middle region of the shell; and the region from C to D can be considered the third region or outer region of the shell. The second region has more porosity by volume than the first region and/or the third region. The second region can have porosity that is from 10% to over 100% more compared to region 1 or region 3. The first region can comprise from 10% to 40% by volume of the overall non-void region of the proppant, such as from 10% to 30% by volume. Region 2 can comprise from 20% to 50% by volume of the overall non-void regions of the proppant and region 3 can comprise from 10% to 40% by volume of the overall non-void regions of the proppant.

The second graph shown in FIG. 1 provides a showing of the diffusion (or migration) of the core concentration which can be, for instance, crushed and/or milled cenospheres. As can be seen in the graph, the void would represent an area where no core concentration remains since it diffused (or migrated) into the shell. The diffusion (or migration) of the core material is represented by plotting the concentration (as measured by energy dispersive spectroscopy) of one of the elements contained in the core material (for example, iron, if present). The concentration profile is not linear but rather follows a power law which decreases from the interior regions to the exterior regions of the proppant. The highest remnants or migration of the core is where core diffusion (or migration) occurred at circumferential region A to B. From circumferential regions B to C and C to D, the amount of core diffusion (or migration) can gradually decrease in a linear or somewhat linear manner. The core concentration in the first region can be the highest (by weight), wherein the third region (C to D) can be the lowest with regard to diffusion (migration) amount of the core material. In comparing the first region with the second region and the third region, with regard to the amount of core which is diffused (migrated) in these three regions, the first region can have 3× to 5× (by weight) more diffused (migrated) core material than the second region and 10× to 20× (by weight) more than the third region. The third graph shown in FIG. 1 shows the formation of whiskers in situ. The whisker concentration can mimic the core diffusion (migration) concentration in the first region, second region, and third region. Therefore, for purposes of the present invention, the concentration levels of the whiskers can be identical or nearly identical (±10%) to the core concentrations described above and apply equally to this description of whisker concentrations.

For purposes of the present invention, with regard to the green body core, from about 1% to about 70% by weight (or more) of the overall green body core can diffuse (or migrate) into the shell such as from 20% to 90%, 30% to 90%, 80% to 90%, all based on the weight of the green body core.

As a more specific example, the green body core can comprise or be milled cenospheres and/or fly ash, which can optionally contain binder to form the green body. The green body shell material can comprise alumina, optionally with other ceramic materials or oxides. The diffusion (or migration) of the core into the shell (at least partially) is or can be due to the glassy ingredients or nature of the green body core, especially when the core is or contains a cenosphere or fly ash or both or at least comprises ground cenospheres and/or fly ash. This migration or diffusion of the green body core into the shell can occur via liquid phase infiltration of the ceramic shell matrix by the molten core material at or near the sintering temperature of the ceramic shell, thus leading to densification of the ceramic shell by viscous or liquid phase sintering processes. The shell, during sintering, can be an example of solid state sintering, which ultimately forms a solidified shell.

Generally, the sintering used to achieve this viscous sintering of the core and the solid state sintering of the shell can be from about 1,000° C. to about 1,600° C. for 10 minutes to 2 hours or more, such as from about 1,200° C. to 1,300° C. for 1 to 2 hours, though other times and temperatures can be used to achieve these effects.

The present invention relates, in part, to a method of forming a ceramic proppant having a ceramic core and ceramic shell structure. The method involves forming a solid green body core and forming a green shell(s) around the core, wherein the shell comprises one or more ceramic materials. The shell can be considered a ceramic shell. The method then involves sintering the green body that comprises the core and shell(s) such that at least part (or all) of the ceramic material that defines the core diffuses (or migrates) into the shell to result in a ceramic proppant having a center void (or hollow core) and a ceramic shell.

The partial or complete diffusing (or migration) of the core into the shell occurs during sintering, and the diffusing (or migrating) can be uniform such that a portion or the entire core diffuses (or migrates) uniformly throughout the shell regions or the diffusing (or migrating) can be in a gradient fashion such that a higher concentration of the core that diffuses (or migrates) into the shell is located closer to the core than to the exterior outer surface of the proppant.

In this method, the green body shell has an overall higher sintering temperature than the green body core. Put another way, the softening temperature of the green body shell is higher than the softening temperature of the green body core. For instance, the softening temperature of the green body shell is at least 100° C. higher than the softening temperature of the green body core and, more preferably, is at least 200° C. higher, such as from 200° C. to 400° C. higher compared to the softening temperature of the green body core. As an example, the softening temperature of the green body shell is from about 300° C. to about 400° C. higher than the softening temperature of the green body core. "Softening temperature" is the average softening temperature. The green body shell can be porous (e.g., uniformly or non-uniformly) and is preferably porous. The porosity can be non-interconnecting. In other words, the pores are not connected or bridged in any manner. For instance, the green body shell has a porosity (before sintering) of at least 10%, at least 20%, at least 30% by volume based on the overall volume of the green body shell, such as from 10% to 40% porosity by volume prior to sintering. After sintering, and after the optional diffusion (or migration) referred to above and described herein, the sintered shell can have a porosity of 5% by volume or more, such as at least 10% by volume, wherein volume is a reference to the shell volume after sintering. For instance, the shell can have a porosity by volume of from 10% to about 40% based on the overall volume of the sintered shell. Generally, the porosity in the shell after sintering, compared to pre-sintering, decreases, such as by an amount of 5% to 30% or 10% to 25% by volume.

As an option, whiskers and/or platelets, such as mullite whiskers, can be present in the core and/or shell. For purposes of the present invention, "whiskers" are referred to and this includes whiskers and/or platelets. These whiskers can be formed in situ during the sintering process that forms the sintered proppant. Particularly, and just as an example, during the diffusion (or migration) of the core or portion thereof into the shell, as described above, part of the diffusing (or migration) process permits one or more of the ingredients that comprise the core to react and form whiskers, such as mullite whiskers. The concentration of the whiskers can be uniform throughout the core and/or shell or it can exist as a gradient where a higher concentration of the whiskers exists closer to the sphere center of the proppant. Put another way, the concentration of whiskers can be higher near the core and at the interface between the core and shell and have a lower concentration (such as at least 20% lower, at least 30% lower, at least 40% lower, at least 50% lower, at least 60% lower with regard to the weight amount of whiskers present at or near the surface (within 15% of the surface by radius) of the proppant compared to the concentration at the core-shell interface). The formation of whiskers in situ leads to enhanced strength and reinforcement of the overall proppant.

In the present invention, as an option, one or more nucleating agents can be used in the green body or part(s) thereof (e.g., core part and/or shell part). The nucleating agents can be $TiO_2$, $Li_2O$, BaO, MgO, ZnO, $Fe_2O_3$, $ZrO_2$, and the like. The nucleating agents can be present in the green body from 0 wt % to 15 wt %, based on the weight of the green body, such as from 0.01 wt % to 15 wt %, or 0.1 wt % to 15 wt % or more, or 1 wt % to 10 wt %, or 2 wt % to 5 wt % and the like. The wt % provided here can alternatively apply to a part of the green body, for instance, to the core part and/or to the shell part of a proppant, if a shell is present. With the use of nucleating agents, the nucleating agents can promote glass ceramic material generation. For instance, nucleating agents can be used in the green core body material, and a green shell material can be applied to the green body core and then the nucleating agents in the green core body can diffuse or migrate to the shell and promote glass ceramic generation in the shell. With the use of nucleating agents, the shell or matrix can have an initial amorphous phase of 0% to 100% and then after sintering, the crystallinity can range from 100% to 0% from the inner to outer surface of the proppant. With the use of nucleating agents, improved mechanical strength can be achieved and/or improved chemical stability of the proppants.

In the present invention, as an option, one or more anisotropic growth promoters can be used in the green body. The growth promoters can be added to the green slurry used to form the green body (such as the green body core and/or green body shell). The growth promoters can be one or more oxides. For instance, several oxides are capable of promoting anisotropic growth of whiskers in ceramic material such as, but not limited to, alumina, boehmite, alumina precursors (gibbsite, bauxite). The growth promoters are more effective in promoting growth of whiskers, such as mullite whiskers, at temperatures ranging from 1000° C. to 1650° C. These oxides include $TiO_2$, $MnO_2$, $Cr_2O_3$. CaO, $K_2SO_4$, $K_2CO_3$, MgO, $AlF_3$ and SrO, and the like. Mixtures of $Na_2O$—MgO—$Al_2O_3$ and CaO—$SiO_2$—$Al_2O_3$ are also able to form anisotropic aluminate structures (platelets). Anisotropic grains/precipitates strengthen (or toughen) the matrix by preventing catastrophic growth of cracks in the matrix. Precipitates or clusters with high aspect ratios create torturous paths for the cracks either by blunting or by diverting/changing directions of the crack paths. Needle shaped mullites and platelet shape alumina and aluminates are some examples of the high aspect ratio structures.

In the present invention, for proppants, one can produce spray dried synthetic template cores (solid or hollow) from ceramic material, such as alumina, boehmite, gibbsite, and/or particulate mullite, and the like. One can also introduce anisotropic growth promoters in the shell green material during the spray coating of the shell forming green material onto the templates. During sintering of such green proppants, radial diffusion and migration of core materials would encounter anisotropic growth promoters at high temperatures, and their particulate shape would change to shapes having high aspect ratios (e.g. needle, platelets, laths, and the like). The growth promoters can be used in an amount of from about 0.5 to about 25 wt % based on the overall weight percent of the green body.

The proppants described herein, of the present invention can include one or more of the following characteristics:

said glassy phase (or amorphous phase) is present in an amount of at least 10% by weight, based on the weight of the proppant (e.g., at least 15%, at least 20%, at least 25%, at least 30%, at least 40%, at least 50%, such as from 15% to 70%, all based on wt %, based on the weight of the proppant);

said ceramic whiskers have an average length of less than 5 microns (e.g., less than 4 microns, less than 3.5 microns, less than 3.2 microns, less than 3 microns, less than 2.7 microns, less than 2.5 microns, less than 2.2 microns, such as from 0.5 micron to 5 microns, or from 1 micron to 3.5 microns, or from 0.8 micron to 3.2 microns, or from 1 micron to 3 microns or from 1.2 to 1.8 microns);

said ceramic whisker have an average width of less than 0.35 micron (e.g., less than 0.3, less than 0.28, less than 0.25, less than 0.2, less than 0.15, such as from 0.05 to 0.34 micron, from 0.2 to 0.33 micron, from 0.1 to 0.3 micron, from 0.12 to 0.2 micron, all units in microns);

said ceramic whiskers have a whisker length distribution, $d_{as}$, of about 8 or less (e.g., 7 or less, 6 or less, 5 or less, 4 or less, 3 or less, 2 or less, 1 or less, 0.5 or less, 0.4 or less, 0.3 or less, 0.2 or less, such as 0.1 to 8, 0.1 to 7, 0.1 to 6, 0.1 to 5, 0.1 to 4, 0.1 to 3, 0.1 to 2, 0.1 to 1, 0.1 to 0.75, 0.1 to 0.5, 0.1 to 0.3, 0.1 to 0.2, 0.1 to 1.8), wherein, $d_{as}=\{(d_{a90}-d_{a10})/d_{a50}\}$ wherein $d_{a10}$ is a whisker length wherein 10% of the whiskers have a smaller length, $d_{a50}$ is a median whisker length wherein 50% of the whiskers have a smaller whisker length, and $d_{a90}$ is a whisker length wherein 90% of the whiskers have a smaller whisker length;

said proppant having an free alpha-alumina content of at least 5% by weight of said proppant (e.g., 5 wt % to 50 wt % or more, at least 10 wt %, at least 20 wt %, at least 30 wt %, at least 40 wt %, based on the weight of the proppant);

said proppant having an HF etching weight loss of less than 35% by weight of said proppant (e.g., less than 30% by weight, less than 25% by weight, less than 20% by weight, less than 15% by weight, less than 10% by weight, such as from 10 wt % to 34 wt %, from 15 wt % to 30 wt %, from 18 wt % to 28 wt % by weight of said proppant);

said proppant has a major phase of whiskers of less than one micron and a secondary minor phase of whiskers of one micron or higher; and/or said ceramic whiskers have a whisker length distribution having $d_{a90}$, which is a whisker length wherein 90% of the whiskers have a smaller whisker length, of less than 12 microns (e.g., less than 10 microns, less than 8 microns, less than 7 microns, less than 6 microns, less than 5 microns, less than 4 microns, less than 3 microns, less than 2 microns, such as from 1 to 10, 1.5 to 5, 1.7 to 5, 1.8 to 4, 1.9 to 3.5, 1.5 to 3.5).

It is to be understood that all averages and distributions mentioned above are based on measuring at least 50 whiskers picked on a random basis in a proppant. Preferably, at least 10 proppants are measured in this manner and an average obtained.

In the methods of the present invention, the green body can be made from one or more ceramic or ceramic precursor particles, and can comprise, consist essentially of, or consists of cordierite, mullite, bauxite, silica, spodumene, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide, a non-oxide ceramic or any combination thereof. The green body material can be or include one or more sedimentary materials (e.g., feldspar, quartz, amphiboles, clay, shale, siltstone, sandstone, conglomerates, breccias, quartz sandstone, arkose, greywacke, quartz arenites, lithic sandstone or any combinations thereof) and/or synthetically produced materials (e.g., milled cenospheres). As an option, the green body material is not igneous or metamorphic materials and/or the resulting, proppant of the present invention can have the complete absence or substantial absence less than 1% by weight of proppant) of igneous or metamorphic materials, which can be less suitable for certain proppant uses.

The particles that form the green body can have any particle size distribution. For instance, the particles that form the green body can have a particle size distribution, $d_{gs}$, from about 0.5 to about 15, wherein, $d_{gs}=\{(d_{g90}-d_{g10})/d_{g50}\}$ wherein $d_{g10}$ is a particle size wherein 10% of the particles have a smaller particle size, $d_{g50}$ is a median particle size wherein 50% of the particles have a smaller particle size, and $d_{g90}$ is a particle size wherein 90% of the particle volume has a smaller particle size. The particle size distribution, $d_{gs}$ can be from 0.5 to 15, from 0.75 to 12, from 1 to 6, from 1 to 10, from 1.5 to 8, from 2 to 8, from 2.5 to 8, from 2.5 to 6, from 3 to 10, from 1 to 8, from 0.5 to 10, from 0.5 to 1, from 0.5 to 2, from 0.5 to 3, from 0.5 to 4, from 0.5 to 5, from 0.5 to 6, from 0.5 to 7, from 0.5 to 8 or any various combination of ranges provided herein.

The median particle size, $d_{g50}$, of the particles that form the green body can be of any median size, for instance, from about 0.01 μm to about 100 μm, wherein $d_{g50}$ is a median particle size where 50% of the particles of the distribution have a smaller particle size. The median particle size, $d_{g50}$, of the particles that form the green body can be from about 1 μm to about 5 μm, from about 1 μm to 2 μm, from 0.01 μm to 100 μm, from 0.05 μm to 100 μm, from 0.1 μm to 100 μm, from 0.5 μm to 100 μm, from 0.75 μm to 100 μm, from 1 μm to 100 μm, from 2 μm to 100 μm, from 5 μm to 100 μm, from 10 μm to 100 μm, from 20 μm to 100 μm, from 0.01 μm to 10 μm, from 0.05 μm to 10 μm, from 0.1 μm to 10 μm, from 0.5 μm to 10 μm, from 0.75 μm to 10 μm, from 1 μm to 10 μm, from 2 μm to 10 μm, from 5 μm to 10 μm, from 0.01 μm to 5 μm, from 0.05 μm to 5 μm, from 0.1 μm to 5 μm, from 0.2 μm to 5 μm, from 0.3 μm to 5 μm, from 0.4 μm to 5 μm, from 0.5 μm to 5 μm, from 0.75 μm to 5 μm, from 2 μm to 8 μm, from 2 μm to 6 μm, from 1 μm to 20 μm, from 1 μm to 30 μm, or any various combination of ranges provided herein, wherein $d_{g50}$ is a median particle size where 50% of the particles of the distribution have a smaller particle size.

The particles that form the green body or a portion of the green body, such as the green body core or green body shell, can have a unimodal particle size distribution or it can be a multi-modal particle size distribution, such as a bi-modal particle size distribution. For example, as one option, the green body core can be formed from a unimodal or bi-modal or other multi-modal particle size distribution. As a preferred option, the core can be formed from a bi-modal particle size distribution which results in a tighter particle backing, and the green body shell, if used, can be formed, as a preference, with a unimodal particle size distribution which results in less packing density and therefore permits diffusion (or migration) (at least partial) of the green body core (as described above as an option) into the shell area or radial portion thereof. Thus, in the present invention, a proppant can be formed comprising a plurality of micron particles that are sintered together, wherein the micron particles have a unimodal particle distribution or it can have a bi-modal particle distribution. The micron particles can have a $d_{50}$ of 0.5 micron to 3.5 microns. The green body and/or resulting proppant can have a plurality of pores having a pore volume wherein the majority of the pore volume results from the interstitial gaps formed between the micron particles. The pore volume created in this manner can be from about 1% to 30%, or from about 5% to about 20%, based on the total volume of the proppant either in the green state or sintered state. The $d_{10}$ of the micron particles used to form the green body can be within 100% of the $d_{50}$, or within 50% of the $d_{50}$. The micron particles used to form the green body can have a $d_{90}$ that is within 100% of the $d_{50}$ or that is within 50% of the $d_{50}$. Further, micron particles used to form the green body can have a $d_{10}$ that is within 100% of the $d_{50}$ and have a $d_{90}$ that is within 100% of the $d_{50}$ or can have a $d_{10}$ that is within 50% of the $d_{50}$ and have a $d_{90}$ that is within 50% of the $d_{50}$. As stated, the core and/or shell can comprise a plurality of micron particles that have a $d_{50}$ of from 0.5 micron to 3.5 microns and are sintered together, wherein the micron particles have a bi-modal particle distribution with a Modal A particle distribution and a Modal B particle distribution. The micron particles of each modal (A and B) can have a $d_{50}$ of 0.5 micron to 3.5 microns, and Modal A can have a $d_{50}$ that is at least 10% different from the $d_{50}$ from Modal B or at least 20% different from the $d_{50}$ of Modal B, or Modal A can have a $d_{50}$ that is from 10% to 100% different from the $d_{50}$ of Modal B.

With a tri-modal particle size distribution that forms the green body or a portion thereof, such as the core or shell, reduced porosity can be achieved and enhanced sintering can be achieved.

In the present invention, the green body or a portion thereof, such as the core or shell, can have a density, as measured by a gas pycnometer, such that the average density (g/cm$^3$) does not alter by more than 1% between the density of the whole green body compared to the density of the crushed green body, and preferably the average density is the same for the whole green body compared to the crushed green body. In other words, the average density changes 0% or 0.005% or less. Put another way, the average density of the green body or a portion thereof, such as the core or shell, can be 100%.

As an option, one or more mobile phases can be created in the droplets of the slurry that forms the green body, such as two phases, and one phase can migrate to the surface of the droplet, which can cause a multi-phase droplet (based on density) to form. This can cause a non-uniform green body of phases which can then cause a difference in diffusion (or migration) into the shell as described herein. The difference in densities can be at least 10%, at least 20%, at least 50%, at least 100% with regard to the multi-phase droplet that results in the green body.

With regard to the diffusion (or migration) of at least a portion of the green body core into the shell, a higher crystalline content will diffuse (or migrate) slower than a semi-crystalline or glassy green body core. Further, the largest amount of diffusion (or migration) can occur when fine particles of a glassy nature are used to form the green body core, and the green body shell is formed from coarse particles of a crystalline nature. Thus, as an option, the green body core can contain at least 50% by weight of a glassy material or at least 75% by weight or at least 95% by weight based on the weight of the green body core and/or the green body shell can contain at least 50% of a crystalline material, such as at least 75% or at least 95% by weight based on the weight of the green body shell. Further, the particles used to form the green body core can be at least 10%, at least 25%, at least 50%, at least 100% smaller in the average mean size ($d_{50}$ size) compared to the mean particle size ($d_{50}$ size) of the particles that form the green body shell.

As an option and taking into account that proppant sizes can be relevant to the standard deviations, set forth below are preferred standard deviation ranges based on mean particle size of the proppant (green or sintered state). For instance, when the mean particle size is from 100-299 μm, the standard deviation can be from 0.83 to 2.5. The mean particle size is a reference to the green body and/or resulting sintered body, and the green body can be a template or a template with a shell(s), and/or the resulting sintered version thereof. The ranges provided for mean particle size and standard deviation can be exact ranges or can "about" these ranges (e.g., from about 100 microns to about 299 microns, or a standard deviation of from about 0.83 to about 2.5, and so on).

100–299 μm, σ=0.83–2.5
300–499 μm, σ=2.5–4.16
500–799 μm, σ=4.16–6.66
800–999 μm, σ=6.66–8.33
1000–1499 μm, σ=8.33–12.5
1500–2000 μm, σ=12.5–16.66

Based on the particle size distribution to achieve a monodisperse distribution (as specified previously), the diameters of the particles can fall within a 5% tolerance band about the mean particle diameter:

$$d_s=\mu\pm 0.025\mu$$

and $d_s$ can be defined by:

$$d_s=\frac{(d_{90}-d_{10})}{d_{50}}$$

where $d_{90}$, $d_{50}$ and $d_{10}$ are the $90^{th}$, $50^{th}$, and $10^{th}$ percentiles of the particle size distribution respectively. For example, $d_{90}$ refers to the particle size below which 90% of the particles are below this particle size, similarly for the $d_{50}$ and $d_{10}$.

Specifying the total particle size distribution width to be less than or equal to 5% of the mean particle size, the following range for $d_s$ $$0.00<d_s\leq 0.05$$

is obtained.

In the present invention, the ceramic or ceramic precursor can be present in the green body in various amounts, such as from about 50% by weight to 100% or to about 99.9% by weight of the green body, from 65% to 99.9%, from 70% to 99.5%, from 75% to 99%, from 80% to 98%, from 85% to 97%, from 75% to 95%, from 80% to 90%, from about 90% to about 99.9%, or any various combination of ranges provided herein, wherein the % is a weight percent based on the weight of the green body.

In order for the slurry to be spray dried, the rheology is preferred to be in a certain range to obtain desired properties. The sprayability of slurry is related to and affected by the density, viscosity, and surface tension of the slurry. These variables are, in turn, affected by chemical composition, solid content, particle size distribution, type and amount of additives such as binder, dispersant, surfactant and pH and zeta potential (surface charge), and the like. For stable and uniform drop formation during spray drying processes, slurry characteristics have an important role. Viscosity, surface tension and density determine the balance of viscous, inertial and surface tension forces during drop formation. A dimensionless characteristic, Z, describing this balance, called the Ohnesorge Number or Z number can be used as a measure of sprayability $$Z=\frac{\sqrt{We}}{\mathrm{Re}}=\frac{\eta}{\sqrt{p\sigma l}}$$

where $R_e$ is the Reynold's Number ($Re=\rho\upsilon l/\eta$), $W_e$ the Weber Number, ($We=\rho\upsilon^2/\sigma$), σ the surface tension in N/m, ρ the density of slurry in $kg/m^3$, l the characteristic length (usually the orifice diameter) in m, η the viscosity in Pa·s, and u velocity in m/s. The range of Z for preferred spherical drop ejection in spray drying should be in a certain range, for example from 1 to 10, such as, from 2 to 9, or from 3 to 8, or from 4 to 6. As shown in one set of examples, when the Z number is above 1 and below 10, slurries had excellent sprayability for spray drying based on observed results. However, when the Z number was below 1, the slurries had poor or less than desirable sprayability which had to be addressed and/or modified in order to obtain desirable properties.

The green body material can further comprise additional components used to contribute one or more properties to the proppant or part thereof. For instance, the green body (e.g., the core and/or shell) can further comprise at least one sintering aid, glassy phase formation agent, grain growth inhibitor, ceramic strengthening agent, crystallization control agent, glass-ceramic crystallization agents, and/or phase formation control agent, or any combination thereof. The sintering promoter can be or include a compound containing zirconium, iron, magnesium, alumina, bismuth, lanthanum, silicon, calcium, cerium, yttrium, a silicate, a borate or any combination thereof. It is to be understood that more than one of any one of these components can be present and any combination can be present. For instance, two or more sintering aids can be present, and so on. There is no limit to the combination of various agents or the number of different agents used. Generally, one or more of these additional agents or aids can include the presence of yttrium, zirconium, iron, magnesium, aluminum, alumina, bismuth, lanthanum, silicon, calcium, cerium, one or more silicates, one or more borates, or one or more oxides thereof, or any combination thereof. These particular aids or agents are known to those skilled in the art. For instance, a sintering aid will assist in permitting uniform and consistent sintering of the ceramic material or oxide. A glassy phase formation agent, such as a silicate, generally enhances sintering by forming a viscous liquid phase upon heating in the sintering process. A grain growth inhibitor will assist in controlling the overall size of the grain. A ceramic strengthening agent will provide the ability to strengthen the overall crush strength. A crystallization control agent will assist in achieving the desired crystalline phase upon heat treatment such as sintering or calcining. For instance, a crystallization control agent can assist in ensuring that a desirable phase is formed such as an alpha aluminum oxide. A phase formation control agent is the same or similar to a crystallization control agent, but can also include assisting in achieving one or more amorphous phases (in addition to crystalline phases), or combinations thereof. The various aids and/or agents can be present in any amount effective to achieve the purposes described above. For instance, the aid and/or agents can be present in an amount of from about 0.1% to about 5% by weight of the overall weight of the proppant. The proppant can comprise one or more crystalline phases or one or more glassy phases or combinations thereof.

The green body core can further comprise such additives and/or components that can react or otherwise interact with the ceramic shell or various components thereof during sintering to promote the formation of residual strain fields (microstrains and/or macrostrains) within the sintered proppant body. These reactions between the active components of the core and shell materials have the ability to generate additional phases which exhibit a different thermal expansion coefficient to the core and/or shell leading to a residual strain field through the cross-section of the proppant shell. Alternatively, the active component or components of the core, may interact with, or modify the crystal structure of the shell material through such processes as atomic substitution or filling of vacancies within the crystal structure. These modifications of the crystal structure may lead to the formation of lattice strains and/or thermal mismatch strains within the shell. The formation of such residual compressive strain fields have the ability to lead to improvements in the apparent fracture toughness and strength of the ceramic shell and consequently an improvement in the strength of the proppant. In addition, the formation of residual compressive strain fields within the surface regions of the proppant particle, may improve the corrosion resistance of the ceramic by increasing the apparent activation energy of the corrosion reaction. These residual strain fields may be characterized using any one of a number of diffraction techniques, including x-ray diffraction, neutron diffraction or synchrotron radiation diffraction. The existence of macrostrains can manifest themselves as a shift in the diffraction peak positions and the microstrains (or root mean square strain, rms strain) can manifest themselves as a broadening of the peak width, i.e. an increase in the half-width at full maximum (HWFM) value of the peaks. Alternatively, the diffraction patterns can be collected at varying angles of sample tilt and inclination (with respect to the incident radiation beam) using a Eulerian cradle to obtain a set of diffraction patterns that will allow the extraction of the 3 dimensional strain tensor for the system, which describes the macrostrain and microstrain components of the system. The absolute value of the total residual strain in the system may range from 0% to 5% or higher, such as from 1% to 3% or from 3% to 5%.

The green body material can include reinforcing particulates. The particulates can be used for strength enhancement or density control (reduce or increase density), or both. The particulates can be included in the composition which forms the green body or part thereof, in any amount such as from about 1 vol % to 50 vol % or more, for example, from 5 vol % to 20 vol % of the overall green body or part thereof. The reinforcing particulates can be ceramic material (e.g., oxide or non-oxide), metallic material (e.g., metal elements or alloys), organic material, or mineral-based material or any combination thereof. Ceramic particulates include, but are not limited to, alumina, zirconia, stabilized zirconia, mullite, zirconia toughened alumina, spinel, aluminosilicates (e.g., mullite, cordierite), silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, steatite, and the like, or any combination thereof. Metallic particulates include, but are not limited to, iron, nickel, chromium, silicon, aluminum, copper, cobalt, beryllium, tungsten, molybdenum, titanium, magnesium, silver, as well as alloys of metals, and the like, or any combination thereof. Metallic particulates may also include the family of intermetallic materials, such as the iron aluminides, nickel aluminides, titanium aluminides, and the like. Organic particulates include, but are not limited to, carbon-based structures such as nanotubes, nanorods, nanowires, nanospheres, microspheres, whiskers of oxide, fullerenes, graphene, carbon fibers, graphite fibers, nomex fibers, graphene, and the like, or combinations thereof. Mineral-based particulates include, but are not limited to, such materials as kyanite, mica, quartz, sapphire, corundum, including the range of aluminosilicate minerals that display high hardness and strength. Single crystal materials can be used.

High quality ceramic aggregate or proppant can be achieved via a number of approaches including compositional, structural, and process design in accordance with the present invention. The core can be formed by any suitable process, such as spray drying, granulation, or the like, or any combination thereof. The shell can be formed by any suitable process that can result in a uniform coating, such as spray coating, dip coating, or the like, or any combination thereof. Both the core and the shell can be either dense or porous depending on the desired structure and the properties of the final product. Structural additions can be created during any combination of the core formation process, the coating process, or the sintering process. Structural additions can be in the form of whiskers, plate-like structural additions, inclusions, microporosity or dense layers of different chemical composition.

Structural additive can be added during the core formulation process, the coating process or generated in-situ during the sintering process. Through precise control of additions and the surrounding processes, the specific gravity (SG), mechanical properties, and chemical durability of the proppant can be improved. For example. Silicon Carbide (SiC) rods may be added to reinforce the mechanical strength of the ceramic body. The rods may be added in either the core formulation process or the coating process and can survive sintering in a locally reduced atmosphere. Converting the core or inner shell of the proppant into glass-ceramics can improve the fracture toughness of the core, thus the mechanical behavior of the whole proppant. In-situ oxide whisker toughening can be achieved using proper composition and mullitization promoter to form the ceramic whiskers such as mullite whiskers to toughen the whole structure of the proppant. Non-oxide whiskers such as SiC whiskers can be used in-situ to toughen the core and the whole proppant. Oxide whiskers such as potassium titanate can be added to toughen the whole structure of the proppant.

Plate-like materials such as tabular alumina or hydrotalcite that do not react in the proppant matrix and that serve to stop the propagation of cracks can be formed in the proppant under pressure. Toughening agents, for example, partially stabilized zirconia (PSZ), can be added in the core and/or in the shell to toughen the proppant. In accordance with an in-situ forming particulate-toughening mechanism, remaining unreacted alumina particles in the core precursor can function as a particulate toughening agent to make the structure strong and tough.

A green body proppant can include SiC particles in accordance with the present invention. In-situ passivation of SiC particles contained in the green body of the proppant under controlled heating conditions can be followed by sintering at elevated temperature. Controlled heating conditions can include heating profile, oxygen partial pressure, or the like, or any combination thereof. The in situ-passivation SiC particles can form a thin silica or mullite coating on the SiC particles that stops oxygen supply to the unreacted SiC. That process effectively protects SiC particles from further oxidation and improves the bonding of SiC particles and the ceramic matrix such as alumina silicates. The resultant sintered body can be a SiC toughened ceramic composite.

Accordingly, a green body proppant is provided by the present invention that contains a carbide or any combination of carbides in the form of rods, whiskers, platelets, or any combination thereof in an amount effective to strengthen a sintered proppant formed from the green body proppant, wherein the green body proppant comprises a core, a shell, or any combination thereof. The carbide can include any suitable carbide, for example, silicon carbide. The green body can further contain an oxide, any suitable oxide or combination of oxides. The green body can further contain potassium titanate, which can be in any suitable form, for example, whiskers. The green body can further contain a tabular alumina, hydrotalcite, or any combination thereof. The green body can further include partially stabilized zirconia (PSI). The green body can further include any suitable alumina or combination of aluminas. A green body proppant is also provided that includes alumina and additionally silicon carbide, potassium titanate, hydrotalcite, partially stabilized zirconia, or any combination thereof. The present invention further provides a method of forming a silicon carbide-toughened ceramic composite proppant. A green body can be formed containing silicon carbide particles, the green body comprising a core, a shell, or both. The green body can be heated under controlled heating conditions. The heated green body can be sintered at an elevated temperature to form a silicon carbide-toughened ceramic composite proppant. Sintered proppants formed from the green bodies and/or using the methods of the present invention are also provided. The alumina precursor can be or include aluminum hydroxide, bauxite, gibbsite, boehmite or diaspore or any combination thereof. The alumina or alumina precursor can have any particle size distribution.

Proppants that contain graphene and methods of producing the same are provided by the present invention. Graphene-toughened proppants, such as ceramic proppants and methods of forming a graphene-toughened ceramic proppant are provided in which, for example, a green body containing graphene is formed, the green body including a core, a shell, or both; heating the green body under controlled heating conditions; and sintering the heated green body at an elevated temperature to form a graphene-toughened ceramic proppant. Conductive proppants and methods of forming a conductive ceramic proppant are provided in which, for example, a green body containing graphene is formed, the green body including a core, a shell, or both; heating the green body under controlled heating conditions; and sintering the heated green body at an elevated temperature to form a conductive ceramic proppant. Conductive ceramic proppants can be thermally conductive, electrically conductive, or both.

Graphene can be added to material for forming the proppant core, proppant shell, or both. The graphene can serve to increase strength, increase conductivity, or both. The graphene can be provided in any desirable form or combination of forms, for example, sheets, platelets, fibers, chemically-modified graphene, doped graphene, functionalized graphene, grossly warped nanographene, and the like. Graphene, graphene oxide, or a combination thereof can be employed. Combinations of graphene and graphite can be used. Graphene or derivatives thereof can be combined with one or more other types of carbon molecules such as diamonds, graphite nanotubes, fullerenes, and the like. Graphene can be produced using any suitable procedure such as exfoliation, epitaxial growth, chemical vapor deposition, electrostatic force, reduction of graphene oxide or carbon dioxide, sonication, nanotube excision, metal-carbon melts, spark plasma sintering, pyrolysis, or any combination thereof. For example, graphene can be produced using methods described in U.S. Pat. Nos. 7,785,557; 7,887,888; 7,988,941; 8,057,863; 8,114,373; 8,142,754; 8,226,801; 8,268,180; 8,293,607; 8,309,438; 8,317,984; 8,361,813; 8,388,924; 8,414,799; 8,425,735; and 8,470,400, all incorporated by reference herein. Graphene can be produced prior to, concurrently with, or after the formation of the proppant into which it is incorporated. Graphene can be obtained commercially, for example, from ACS Materials, LLC (Medford, Mass.), Angstrom Materials, Inc. (Dayton, Ohio), Graphanea, S.A. (Donostia-San Sebastian, Spain), Graphene Technologies (Novato, Calif.), or National Nanomaterials (Austin, Tex.). One or more layer of graphene can be employed. Graphene can be 3D or pillared. Graphene can be incorporated into ceramics as described in U.S. Patent Application Publication No. 2013/0184143 (incorporated by reference herein) or using any other suitable process. Graphene, graphene oxide, and/or other forms of graphene can be mixed into slurry to coat a cenosphere or synthetic template. Proppant manufacture can be performed so that the graphene remains substantially intact during spraying, sintering, and the like. A greater amount of graphene can be applied initially to a green ceramic to allow for some degradation during manufacturing so that sufficient intact graphene remains in the finished proppant to maintain desired functionality such as strength and conductivity. Graphene can be incorporated into any type of ceramic or combination of ceramic materials, such as silicon carbide, silicon nitride, alumina, silica, titania, and zirconia.

Graphene can be distributed in the proppant in a manner similar to that described herein for whiskers. For example, the graphene concentration can mimic the core diffusion (or migration) concentration in the first region, second region, and third region as shown in FIG. 1. Therefore, for purposes of the present invention, the concentration levels of graphene can be identical or nearly identical (±10%) to the core concentrations described above and apply equally to this description of graphene concentrations. The concentration of graphene can be uniform throughout the core and/or shell or it can exist as a gradient where a higher concentration of graphene exists closer to the sphere center of the proppant. Put another way, the concentration of graphene can be higher near the core and at the interface between the core and shell and have a lower concentration (such as at least 20% lower, at least 30% lower, at least 40% lower, at least 50% lower, at least 60% lower with regard to the weight amount of graphene present at or near the surface (within 15% of the surface by radius) of the proppant compared to the concentration at the core-shell interface). Graphene can be located in any part of a green body or sintered proppant, for example, the core, the shell, the transition region, the outer shell, or any combination thereof. The amount and/or type of graphene can be the same or different in two or more parts of a proppant.

The proppants of the present invention can be made by taking a plurality of synthetic templates or green body cores as described herein which would have a size, for instance, of from about 10 microns to about 30 microns. This plurality of smaller green body cores can then be formed as part of a slurry and then a green body core comprising a plurality of smaller green body templates or cores can be formed having, for instance, a diameter for this green body of from 20 microns to about 250 microns. This green body can then be processed in the same manner as described earlier to form a sintered ceramic proppant. The plurality of smaller templates or cores, during the sintering process, become one mass and ultimately form a sintered proppant that can have a hollow void (or two or more voids or pockets or pores) as described earlier. A small plurality of templates or cores can have a hollow central void or can be completely solid.

In the present invention, the proppant can be made a number of ways, including, but not limited to, the following:

Option 1: A solid green body core can first be made and while still a green body, a shell, or several shell layers can be formed on the green body core, and then the green body core/shell(s) can be sintered to form the ceramic proppant. The green body core that is used in this option can then remain solid or can form into a hollow void(s) or pockets or a single hollow core through diffusion (or migration) during sintering, and the shell layer or layers can optionally contain pore formers that create pores upon sintering and/or the shell layer can contain microspheres. This two-step process can be used, for instance, wherein a core can be formed, for instance, by spray-dryer technique and then after the formation of the green body core, one or more green shell layers can be formed, for instance, by fluid bed techniques as described herein.

Option 2: As another option, the green body core can be formed as above, but first sintered to form a sintered core, which then can receive one or more shell layers as described above in Option 1 and then sintered again. This core can also be a hollow core or a solid core.

Option 3: A green body core and a green body shell can be formed at the same time and the green body core can be hollow at the time of formation of the green body core/shell. For instance, this can be done by a co-axial method, such as co-axial extrusion or spray-drying or other techniques that can simultaneously or essentially simultaneously form a hollow core green body and one or more shell layers on top and then the overall product can be sintered. This would be a form of a one-step process. This one-step process can further have pore formers and/or microspheres present in one or more shell layers as described, for instance, in Option 1.

Option 4: A hollow core can be formed by using a fugitive spherical template, such as a polymer template, such as a silicon-containing polymer. This fugitive spherical template can be a solid or a hollow fugitive spherical template and can be formed by co-axial nozzle techniques, such as described herein. This fugitive spherical template can then have a ceramic material applied on the surface so as to form a shell layers. One or more shell layers can be applied in this manner, such as by spray coating ceramic mixture as described herein for the green body. Then afterwards, the sintering can occur as described herein, wherein the fugitive template is burned out of a sintered ceramic proppant creating a hollow central void. Interestingly, through sintering in an oxidizing atmosphere, the active polymeric template can be pyrolyzed and form $SiO_2$ and/or other products which then, in turn, react with one or more ceramic components in the ceramic green shell material, such as alumina, to form a mullite inner layer or inner shell and an outer shell that is essentially the sintered ceramic shell. Put another way, as an option, the sintered proppant that is formed would essentially be a shell layer with no ceramic core and would have at least two phases—one phase that is a mullite-containing phase in the inner regions of the shell layer and a phase of ceramic that does not contain mullite.

The fugitive template as described above can be either solid or hollow and can be formed through an inkjet-like system with a piezoelectric dispensing mechanism using a solution of polymeric material, such as polyethylene, poly (methyl) methacrylate, and the like. The pulsing pressure generated by the piezo device can break the continuous stream of the solution to droplets of essentially the same size. The surface tension of the liquid then allows the droplets to become spherical and the droplets can then be dried by appropriate techniques, such as fluidized bed spray drying techniques, drop tower drying techniques, infrared curing, UV curing, and the like. In the case of hollow microspheres, the nozzle can be co-axial and concentric with the synchronized pulse gas (e.g., air) flow in the center and the liquid flow from the surrounding nozzle.

For any one or more components that form the green body, for example, the particle size distribution, $d_{as}$, can be from about 0.5 to about 15, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5, and the like. The one or more components that make up the green body, such as alumina or alumina precursor, can have a median particle size, $d_{a50}$, of from about 0.01 μm to about 100 μm, wherein $d_{a50}$ is a median particle size where 50% of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% of the particles of the distribution have a smaller particle size.

Further, as an option, the particulate material or particles used to form the green body core and/or green body shell can be or have a unimodal particle distribution. In other words, the proppant can comprise a plurality of micron particles that are sintered together, wherein the micron particles have a unimodal particle distribution. The micron particles can have a $d_{50}$ of 0.5 micron to 3.5 microns.

The siliceous material that can be one or more of the components that form the green body, can be any silicon containing material, such as silicate containing material, silicon containing minerals or ore, silicates, silicon oxides, and the like. The siliceous material can be or include one or more cenospheres, fly ash or any combination thereof. The siliceous material can be natural, synthetic, or a by-product. The siliceous material can be or include silicate materials, quartz, feldspar, zeolites, bauxite, calcined clays or any combination thereof. The siliceous material can have any particle size, such as a particle size distribution. The $d_{as}$ can be from 0.5 to 15, 0.75 to 15, 1 to 15, 1 to 5, 1 to 6, 1 to 8, 5 to 15, 0.5 to 10, 0.5 to $5d_{ss}$, of from about 0.5 to about 15, wherein, $d_{as}=\{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s90}$ is a particle size wherein 90% of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5 and the like. The siliceous material can have a median particle size, $d_{as50}$, of from about 0.01 μm to about 100 μm, wherein $d_{a50}$ is a median particle size where 50% of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% of the particles of the distribution have a smaller particle size.

As an option, the particle size distribution and/or the median particle size of the alumina or precursor thereof, and the siliceous material and/or one or more other components that can be present, can be the same or different, or can be within (±) 1%, 5%, 10%, 15%, 20%, 25% of each other.

The green body material can include at least one binder. The binder can be or include a wax, a starch, a modified starch, polyvinyl alcohol (PVA), polyethylene glycol (PEG), a sodium silicate solution, a potassium silicate solution, a functionalized latex polymer, an acrylic based polymer system, guar gums, alginates, or a low molecular weight functionalized polymer (e.g., 1,000 MW to 100,000 MW or 500 MW to 5,000 MW) or any combination thereof. A binder may be used to facilitate the formation of the green body mixture and can provide strength to the green body to facilitate handling operations.

The green body material can further include at least one dispersant. The dispersant can be or include at least one surfactant. The dispersant system maybe either cationic type, anionic type or a combination thereof. A dispersant may be used to facilitate a uniform mixture of alumina or alumina precursor and a siliceous material in the green body material. Specific dispersants can include, but are not limited to, DOLAPIX CE64 (Zschimmer & Schwarz, GmbH), DARVAN C (RT Vanderbilt Company, Industrial Minerals & Chemicals) and similar materials which may comprise from about 0% by weight to about 5% by weight of the green body material or any other amount to assist in the dispersion of materials.

The green body material can further include at least one slurrying agent. The slurrying agent can be or include water, an organic solvent or any combination thereof.

Besides the other ingredients mentioned above that can comprise the slurry, including the particulates (which includes the ceramic and/or oxide material), the binder, and dispersant, other optional components can be one or more of the following: flux agent (sodium silicate and/or sodium oxide), a defoaming agent (e.g., TU-44, or TU-45), and the like. An example of a binder is Optapix AC 112 or Optapix AC95 from Zschimmer & Schwartz. A suitable dispersant can be Dolapix CE-64 from Zschimmer & Schwartz. A rheological control agent (viscosifier) can also be present as an option, which can be Bentone EW from Elementis. The rheological control agent can be present in an amount, for instance, from 0.25 wt % to 1 wt % based on the overall weight of the slurry.

The slurry can have a variety of viscosities. Preferably, the viscosity of the slurry is such to obtain more uniform droplets and, therefore, obtain monodisperse microspheres. The viscosity is preferably in the range of from about $10^2$ to about $10^5$ cP, such as $10^1$ cP to $10^3$ cP. Other examples of viscosities can be from $10^3$ to $10^4$ cP.

With regard to the spray dryer, an example of a suitable spray dryer is a GEA Niro Mobile Minor or Anhydro spray dryer.

Upon exiting the spray dryer, the green body can optionally receive one or more coatings that can form a shell using a fluid bed coater, for instance, 100N manufactured by Applied Chemical Technologies, or VFC-1200 manufactured by Vector Corporation. Upon exiting the spray dryer or fluid bed coater, the green body can then be subjected to sintering. The sintering can be performed under a pressure of from about $0.1 \times 10^5$ Pa to about $10 \times 10^5$ Pa, such as from about $0.5 \times 10^5$ Pa to about $7 \times 10^5$ Pa, or from about $1 \times 10^5$ Pa to about $5 \times 10^5$ Pa.

The sintering can be performed at a temperature from about 500° C. to about 2500° C. The sintering can be performed at an elevated pressure, for instance at a pressure from about 0.1 MPa to about 200 MPa for about 1 hour to about 20 hours. The sintering preferably occurs at a temperature below 1400° C., such as from 1000° C. to about 1200° C., for about 30 minutes to 4 hours, and more preferably from 2 to 4 hours. The sintering temperatures referred to herein are the temperature of the material being sintered. Other sintering temperatures/times can be at a temperature from about 1100° C. to about 1300° C. for about 1 hour to about 20 hours. Another example of the pressure during sintering is from about 0.1 MPa to about 200 MPa.

The sintering can be performed at any firing rate, such as a firing rate of from about 0.01° C./min to about 2000° C./min.

Sintering furnaces that can be used as a reactor in the present method can be any vessel that would permit the present method to be achieved. For instance, the reactor can be a fluidized bed furnace or fluidized furnace. The reactor can be a high temperature reactor, for instance, with process atmospheric control(s). Other types of furnaces can be used. The high temperature reactor can be a sealed chamber that permits control of the process atmosphere (composition, pressure, and the like) and can be heated by any means, including, but not limited to radiant, infra-red, microwave, induction, RF, laser, self-propagating combustion, and the like. The fluidized bed furnace can use air or an oxygen-containing gas, or an inert gas as the fluidizing medium. Example of other furnaces (or reactors) include:

i. Rotary
 ii. Static Bed (or other dynamic bed furnace)
 iii. Muffle
 iv. Drop Tower
 v. Mechanical fluid bed where the air is recycled and/or
 vi. Microwave
   These above furnaces generally use a sealed environment.
 vii. Conventional fluidized bed furnace.

With regard to the formation of the green body template or core, as indicated, spray drying techniques can be used. As preferred options, the following is provided.

The slurry that is used to form the green body template or core can be an aqueous (or non-aqueous) suspension of oxide and/or non-oxide ceramic particles. The particles can have a $d_{50}$ particle size ranging from 0.2 micron to about 50 microns (e.g., 0.5 micron to 2.5 microns, 0.75 micron to 2 microns, 1 micron to 2 microns, 0.2 micron to 5 microns) or other sizes. The slurry can have a solids concentration of from about 30 wt % to about 80 wt %, such as from about 35 wt % to 75 wt %, 40 wt % to 70 wt %, 45 wt % to 60 wt %, 50 wt % to 80 wt % based on the overall weight percent of the slurry. The slurry can contain one or more binders, such as one or more organic binders. The binders can be present in an amount of from about 0.5 wt % to 5 wt % or other amounts, such as 1 wt % to 4 wt %, 2 wt % to 5 wt %, and the like. The weight percent is based on a dry powder basis (i.e., the dry components that form the slurry). As a further option, the slurry can contain one or more dispersants and/or surfactants, which can improve rheological properties (such as viscosity, stability, and the like) of the slurry. The dispersant can be present, for instance, in an amount of from 0.1 wt % to about 1.5 wt %, such as 0.1 wt % to 1.2 wt % and the like, based on a dry powder basis.

The spray dryer can have an inlet air temperature that ranges from 225° C. to 400° C. or other temperatures outside of this range. The spray dryer can have an outlet air temperature that ranges from 95° C. to 115° C. or other temperatures outside of this range. The spray dryer can have an atomizing air pressure that ranges from 0.2 bar to 2 bar or other pressures above this range. The spray dryer can have a slurry flow rate that ranges from 20 grams per minute to 9,000 grams per minute or higher. In the case of a single fluid hydraulic nozzle, employed in the atomization of the slurry in the spray dryer, the slurry pressures may range from less than 6 bar to 100 bar or higher, but preferably between 13 bar and 42 bar. The slurry flow rate can be governed by a combination of the nozzle orifice and the nozzle insert and may range from less than 4,500 grams per minute to 30,000 grams per minute or higher, and preferably between 8,500 grams per minute to 14,750 grams per minute.

Described here is one option to preparing the slurry and synthetic green bodies and proppants. The slurry can be made with desired ceramic matrix powder having a desired particle size (e.g. average mean particle size $d_{50}=1.50\pm0.15$ μm or other sizes) optionally with at least one binder with or without at least one defoamer.

The slurry can be sprayed through a nozzle under constant or pulsing dispensing pressure to form droplets that can immediately become spheres due to the surface tension of the slurry. The nozzle may be of the single fluid hydraulic type, a two fluid nozzle in which compressed air is used to assist droplet formation and the two fluid nozzle may be of the internal mix or external mix variety. Other nozzle types may be used including a design that incorporates a secondary "blowing" air stream to effectively blow bubbles of slurry and thus form hollow spheres.

The spheres are then dried (preferably immediately) in a chamber filled with blowing hot air, with the process operating in counter-current mode. That is, the slurry droplet trajectory is in the opposite direction to the hot air flow. The product fraction of interest is collected at the bottom of the chamber by way of an airlock assembly. Particles that are below a critical size pass through the exhaust stream of the spray drier and are separated from the air stream by way of various devices including, but not limited to, cyclones, bag dust collector, electrostatic dust collectors, and the like. The dried green products can then be sintered at a temperature to densify and strengthen the structure, as described earlier.

By changing the composition of the starting material in the slurry, porous spheres can be produced. For instance, the addition of fugitive phases can be used. The fugitive phase can be or include a combustible inorganic or organic material. For instance, the combustible inorganic or organic material can be or include cellulose-based material, wood-based material, and/or carbonaceous material, polymeric material (or particles) or any combination thereof. The combustible inorganic or organic material can be or include crushed tree nut shell material, carbon black, carbon fiber, graphite fiber, charcoal, activated carbon, carbon toner, graphite, coal, paper, plant material, starch, starch granules, flour, or any combination thereof. International Patent Application WO 2011/082102 provides techniques and materials that can be used here and this application is incorporated in its entirety by reference herein.

By using a co-axial nozzle with different slurries, proppants with core-shell structure can be produced simultaneously. For instance, the center orifice of the nozzle assembly may carry a cenosphere (or fly ash) slurry and the outer slurry orifice of the nozzle assembly may carry the matrix ceramic slurry. By control of the two slurry flow rates and pressures and the atomizing air pressure, droplets of slurry consisting of a central region of cenosphere (or fly ash) slurry encapsulated by the ceramic matrix slurry may be formed, which then pass into the drying chamber of the spray dryer and are formed into green spherical particles.

A multilayer core-shell structure can be produced by a co-axial nozzle spray process to obtain a functionally gradient structure for better mechanical or chemical properties.

By using a co-axial nozzle, a green body with a hollow core in the center can be formed by a continuous or pulsing stream of air, and one or more periphery hollow stream(s) to form a shell of simple matrix or a complex shell with a functionally gradient matrix.

Regarding the sintering process, in more detail, the sintering can be a fast heating process. A tunnel kiln can be used. Or, the particulate proppant can be sintered by a fast sintering technique with ramping rate up to 50° C./min or faster. The ramping rate can be 10 to 100° C./min or even higher. In addition, the holding time can be reduced from several hours to within one hour or even a few minutes only (e.g., 3 minutes to 30 minutes). As indicated, the sintering can occur in fluidized bed conditions or in a rotary kiln. With the fast and homogeneous heating in the sintering process, the mechanical properties of the product are substantially improved, because fast sintering can suppress grain growth and allow fine-grain microstructure. The fine-grain ceramics can be beneficial to fracture toughness and strength.

The proppants of the present invention while preferably used to prop open subterranean formation fractions, can be used in other technologies, such as an additive for cement or an additive for polymers, or other materials that harden, or would benefit. The proppants of the present invention can also be used as encapsulated delivery systems for drugs, chemicals, and the like.

The proppants of the present invention can be used to prop open subterranean formation fractions. The proppant can be suspended in a liquid phase or other medium to facilitate transporting the proppant down the well to a subterranean formation and placed such as to allow the flow of hydrocarbons out of the formation. The medium chosen for pumping the proppant can be any desired medium capable of transporting the proppant to its desired location including, but not limited to, a gas and/or liquid, energized fluid, foam, like aqueous solutions, such as water, brine solutions, and/or synthetic solutions. Any of the proppants of the present invention can have a crush strength sufficient for serving as a proppant to prop open subterranean formation fractures. For instance, the crush strength can be 1,000 psi or greater, 3,000 psi or greater, greater than 4,000 psi, greater than 9,000 psi, or greater than 12,000 psi. Suitable crush strength ranges can be from about 3,000 psi to about 20,000 psi, or from about 5,000 psi to about 20,000 psi, and the like. In some applications, like coal bed methane recovery, a crush strength below 3,000 psi can be useful, such as 500 psi to 3,000 psi, or 1,500 psi to 2,000 psi.

The proppant can be suspended in a suitable gas, foam, energized fluid, or liquid phase. The carrier material, such as a liquid phase is generally one that permits transport to a location for use, such as a well site or subterranean formation. For instance, the subterranean formation can be one where proppants are used to improve or contribute to the flow of hydrocarbons, natural gas, or other raw materials out of the subterranean formation. The present invention also relates to a well site or subterranean formation containing one or more proppants of the present invention.

The proppants of the present invention also can present oil and gas producers with one or more of the following benefits: improved flow rates, improved productive life of wells, improved ability to design hydraulic fractures, and/or reduced environmental impact. The proppants of the present invention also can eliminate or materially reduce the use of permeability destroying polymer gels, and/or reduce pressure drop through the proppant pack, and/or the ability to reduce the amount of water trapped between proppants thereby increasing hydrocarbon "flow area."

The high density of conventional ceramic proppants and sands (roughly 100 lb/cu.ft.) inhibit their transport inside fractures. High density causes proppants to "settle out" when pumped thereby minimizing their efficacy. To maintain dense proppants in solution, expensive polymer gels are typically mixed with the carrier solution (e.g. completion fluid). Once suspended in a gelled completion fluid, proppant transport is considerably enhanced. Polymer gels are extremely difficult to de-cross link, however. As a result, the gel becomes trapped downhole, coats the fracture, and thereby reduces reservoir permeability. Gel-related reservoir permeability "damage factors" can range from 40% to more than 80% depending on formation type. The lightweight high strength buoyancy property that can be exhibited by the proppants of the present invention can eliminate or greatly reduce the need to employ permeability destroying polymer gels, as they naturally stay in suspension. The use of extreme pressure, polymer gels, and/or exotic completion fluids to place ceramic proppants into formations adversely impacts the mechanical strength of the reservoir and shortens its economic life. Proppants of the present invention can enable the use of simpler completion fluids and possibly less (or slower) destructive pumping. Thus, reservoirs packed with buoyant proppants preferably exhibit improved mechanical strength/permeability and thus increased economic life.

Enhanced proppant transport enabled by buoyancy also may enable the placement of the present proppants in areas that were heretofore impossible, or at least very difficult to prop. As a result, the mechanical strength of the formation can be improved, and can reduce decline rates over time. This benefit could be of significant importance, especially within hydraulic fractures ("water fracs") where the ability to place proppants can be extremely limited. If neutrally buoyant proppants are employed, for example, water (fresh to heavy brines) may be used in place of more exotic completion fluids. The use of simpler completion fluids can reduce or eliminate the need to employ de-crossing linking agents. Further, increased use of environmentally friendly proppants may reduce the need to employ other environmentally damaging completion techniques such as flashing formations with hydrochloric acid. In addition to fresh water, salt water and brines, or synthetic fluids are sometimes used in placing proppants to the desired locations. These are of particular importance for deep wells.

While the term proppant has been used to identify the preferred use of the materials of the present invention, it is to be understood that the materials of the present invention can be used in other applications. The proppant of the present invention also can be used to form other products, such as, for example, matrix materials, concrete formulations, composite reinforcement phase, thermal insulating material, electrical insulating material, abrasive material, catalyst substrate and/or support, chromatography column materials (e.g., column packings), reflux tower materials (e.g., reflux tower packings, for instance, in distillation columns), and the like. The proppants may be used in medical applications, filtration, polymeric applications, catalysts, rubber applications, filler applications, drug delivery, pharmaceutical applications, and the like.

The present invention has many advantages, including achieving a monodisperse distribution and/or providing enhanced conductivity and/or permeability, mechanical properties enhancement through microstructural control, and/or case strengthening by core material diffusion (or migration), and/or control over defect distribution either by elimination or filling of defects by core material during diffusion (or migration) or both, and the like.

The present invention will be further clarified by the following examples, which are intended to be exemplary of the present invention.

EXAMPLES

Example 1

Figure 6:
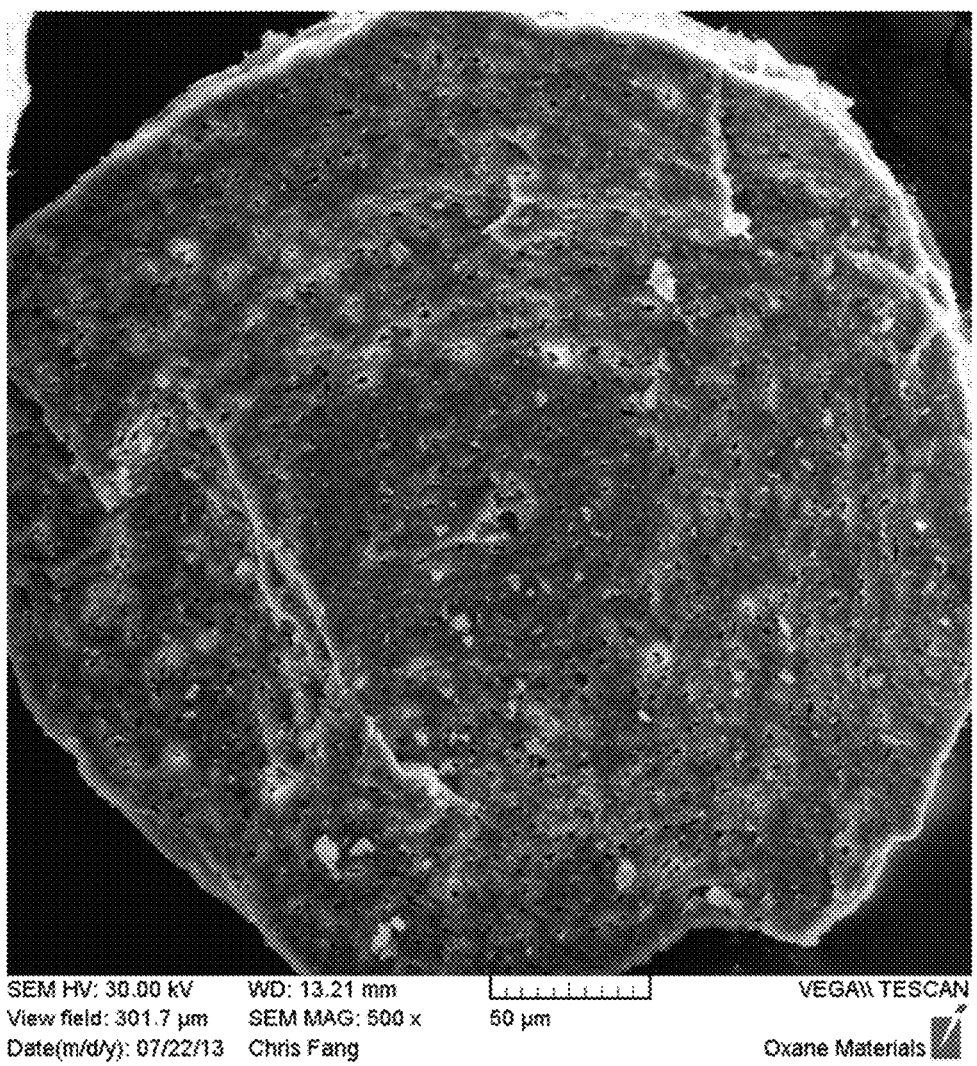
FIG. 6 is a fracture cross section of a proppant with a dense core of formula 1 (high melting formulation) in Table DA-1.
Figure 7:
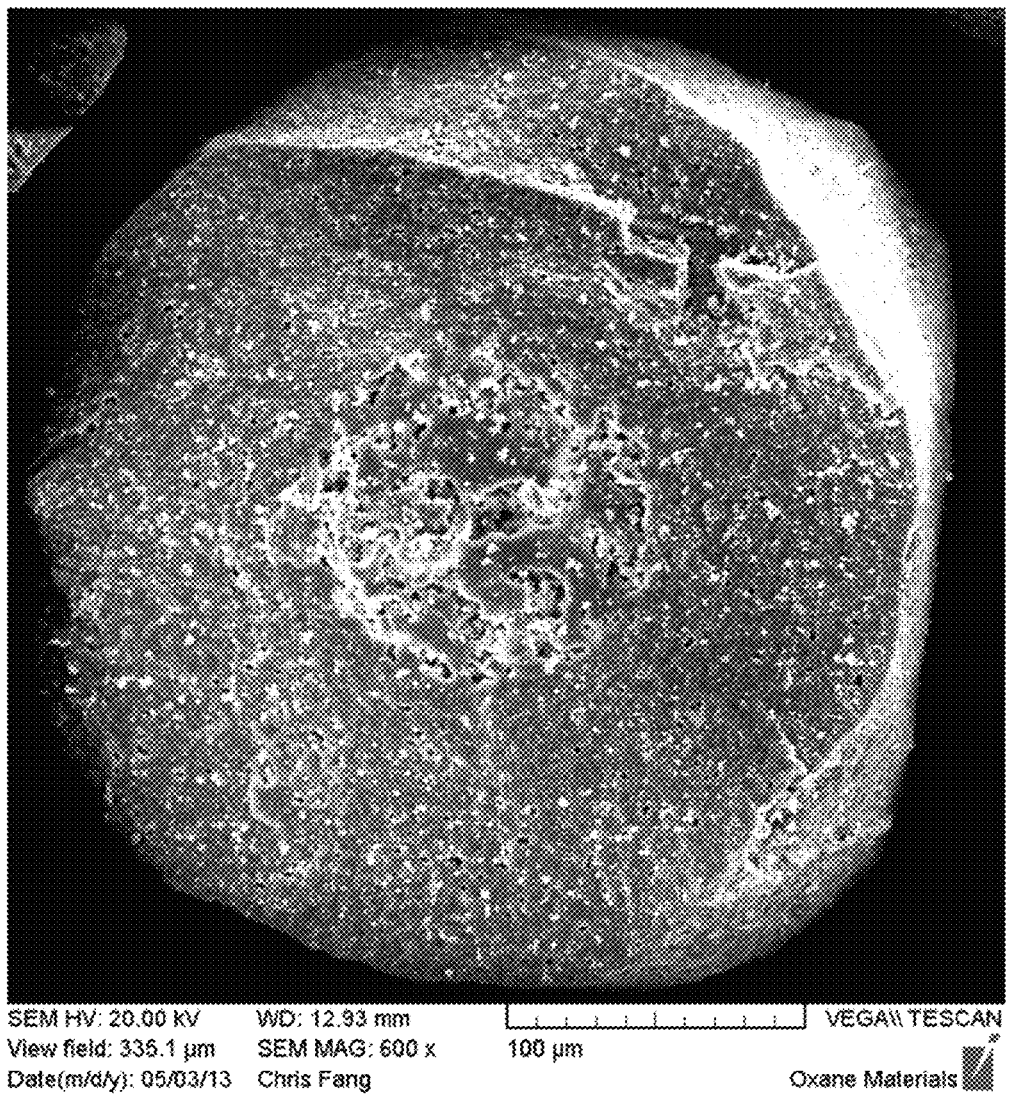
FIG. 7 is a fracture cross section of a proppant with a porous core of formula 2 in Table DA-1.
Figure 8:
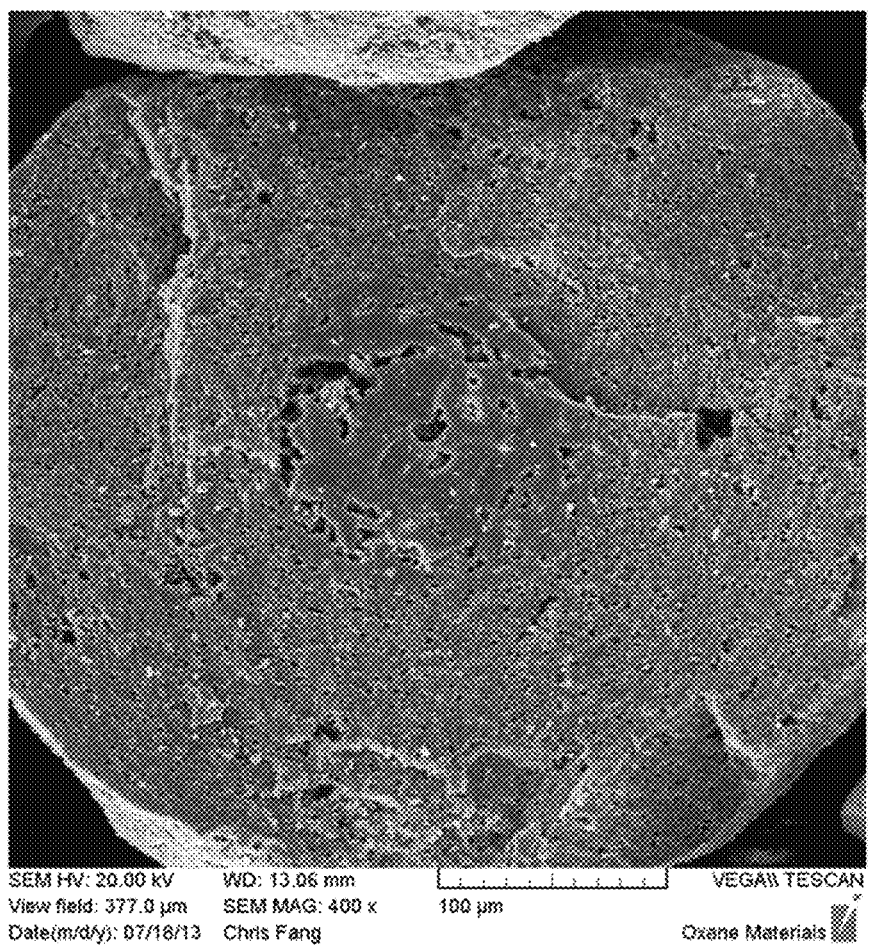
FIG. 8 is a fracture cross section of a proppant with a relatively solid core of formula 3 in Table DA-1.
Figure 9:
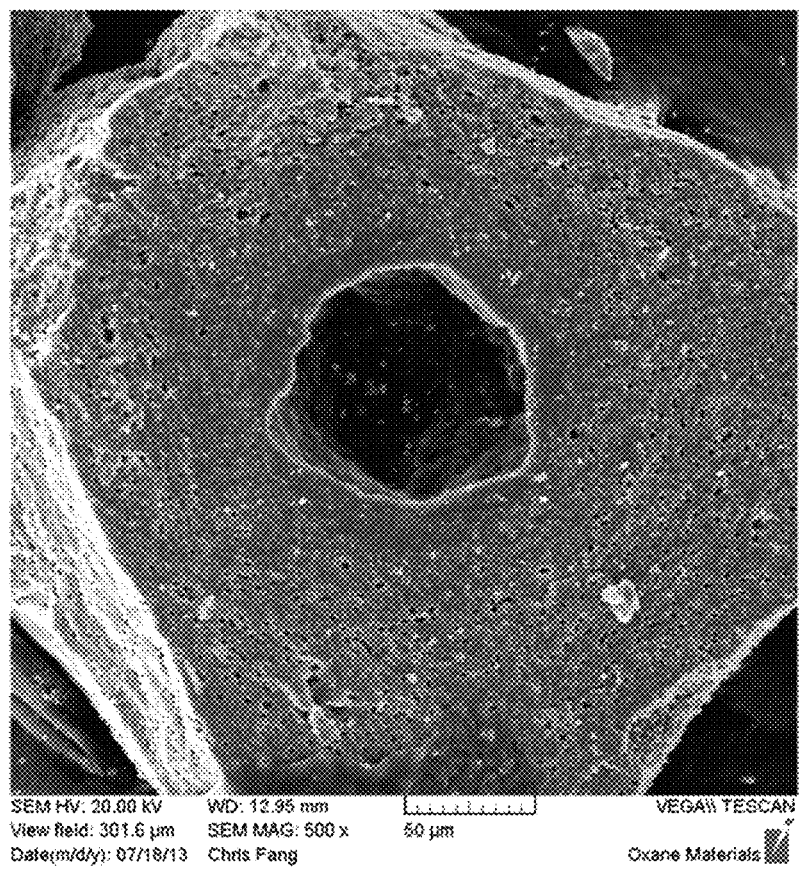
FIG. 9 is a fracture cross section of a proppant with a hollow core of formula 4 in Table DA-1. A hollow core of low sphericity was formed. A diffusion region between the inner shell and the matrix of the outer shell is visible.
Figure 10:
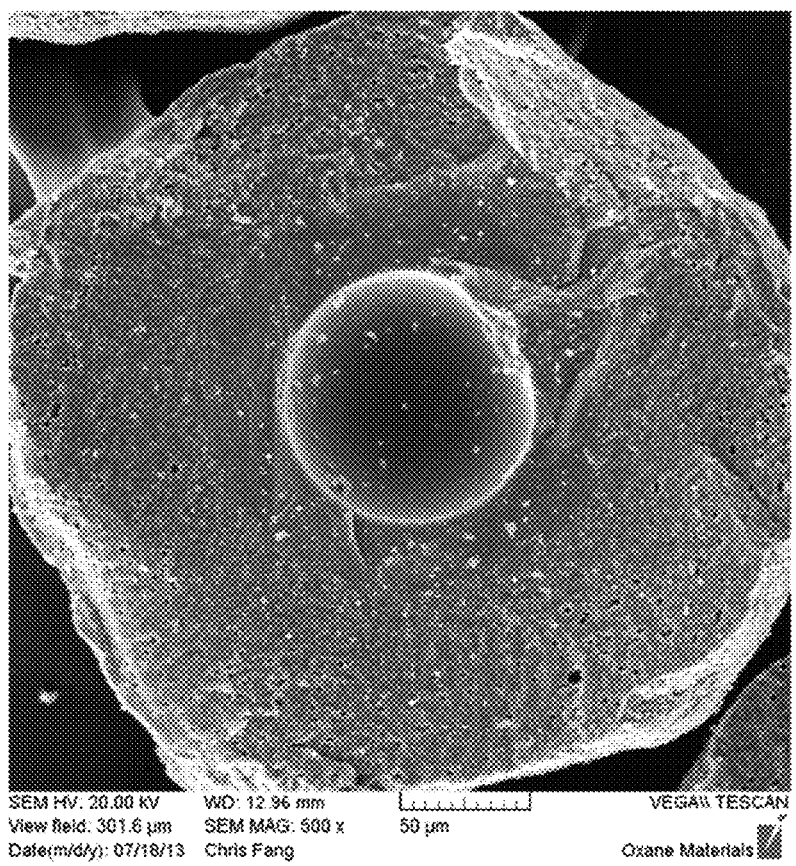
FIG. 10 is a fracture cross section of a proppant with a hollow core of formula 5 in Table DA-1. A diffusion region between the inner shell and the outer shell is clearly shown in the image. The resultant hollow core is highly spherical, with a dense inner shell and smooth inner surface that are essentially free from macro structural defects.

Various formulations for a proppant core were made as shown in the Table below. The numbers in the Table are wt % based on weight of proppant core. Exemplary low melting formulations of a proppant core in accordance with the present invention are listed in Table 1, wherein *S/A is the $SiO_2/Al_2O_3$ weight ratio and #LM are the low melting components, $Na_2O+K_2O$. The core of the low-melting formulations enhanced diffusion (or migration in general) of the core into the shell thus strengthened the core-shell interface and promoted densification of the shell. Use of fluxes or components of low melting point can effectively lower the melting point of the core based on the present invention. FIG. 6 is a fracture cross section of a proppant with a dense core of formula 1 (high melting formulation) in Table 1. FIG. 7 is a fracture cross section of a proppant with a porous core of formula 2 in Table 1. FIG. 8 is a fracture cross section of a proppant with a relatively solid core of formula 3 in Table 1. FIG. 9 is a fracture cross section of a proppant with a hollow core of formula 4 in Table 1. A hollow core of low sphericity was formed. A diffusion (or migration) region between the inner shell and the matrix of the out shell is visible. FIG. 10 is a fracture cross section of a proppant with a hollow core of formula 5 in Table 1. A diffusion (or migration) region between the inner shell and the outer shell is clearly shown in the image. The resultant hollow core is highly spherical, with a dense inner shell and smooth inner surface that are essentially free from macro structural defects.

TABLE 1

Major composition of the core for examples in FIGS. 6 to 10

| Formula | $SiO_2$ | $Al_2O_3$ | $Fe_2O_3$ | MgO | CaO | $Na_2O$ | $K_2O$ | $TiO_2$ | *S/A | #LM |
|---|---|---|---|---|---|---|---|---|---|---|
| 1. | 26.48 | 67.38 | 1.43 | 0.19 | 0.42 | 0.84 | 1.98 | 1.27 | 0.39 | 2.82 |
| 2. | 50.50 | 39.75 | 2.52 | 0.79 | 1.02 | 1.32 | 2.12 | 0.69 | 1.27 | 3.44 |
| 3. | 61.97 | 26.85 | 4.13 | 1.19 | 1.60 | 0.82 | 2.13 | 1.01 | 2.31 | 2.95 |
| 4. | 60.68 | 24.49 | 4.07 | 1.13 | 1.55 | 2.17 | 3.17 | 0.99 | 2.48 | 5.34 |
| 5. | 60.39 | 22.13 | 4.02 | 1.07 | 1.50 | 3.51 | 4.22 | 0.97 | 2.73 | 7.73 |

The proppants of the present invention can be modeled using a variety of techniques and can be configured based on models of the present invention. This modeling can be used to show the impact of core and shell properties on bead densification and microstructure. Core shell structure can be modeled as infiltration of molten glass into the shell during sintering. Glass can be formed, which can predominantly take place in the core, by melting of glassy material in the core to form a hollow or synthetic core. Glass formers (forming agents) can be used to facilitate this process. Glass formers can be dissolved from the core and/or the shell. Modeling can be verified utilizing isothermal sintering of a narrow-sized bead. Polish cross sections can be used to identify various model parameters. Agglomerate wetting analysis can be modified for bead core-shell geometry. Techniques and modeling as described in Powder Technology 106 (1999) 62-70 Levresse, P. et.al. can be used, which is incorporated by reference herein in its entirety.

Glass formation can start before significant densification of the shell of a proppant. That is, there can be connected pores from the core to bead surface and the glass transition temperature (Tg) and DSP can be less (occur prior to) the onset of shell densification. To model these processes generate superior proppants, and obtain an optimal furnace profile, equations were developed relating to infiltrated zone radius ($R_f$) compared to core radius (b)—the $R_f/b$ ratio, capillary driving force ($\Delta P$) for infiltration of the shell, and infiltration radius (R(t)) as a function of time.

Figure 11:
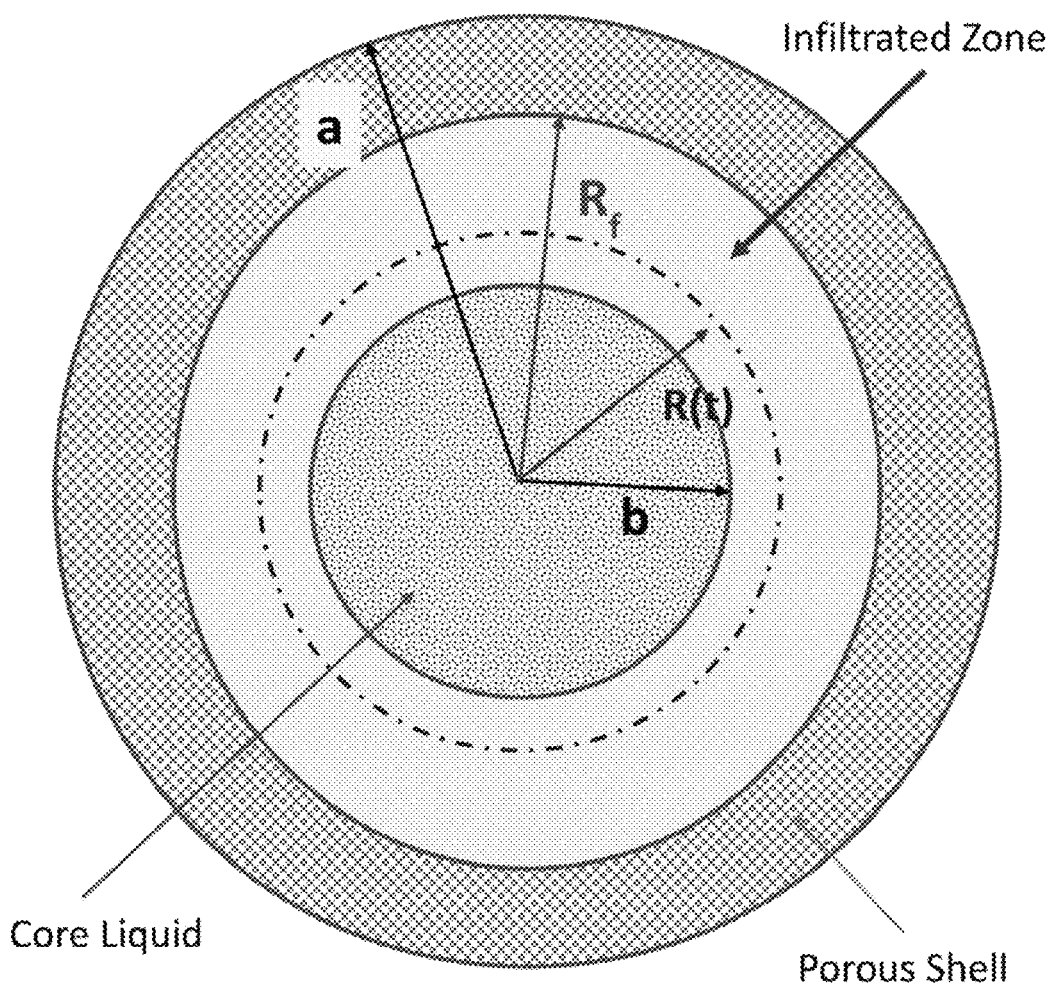
FIG. 11 is a schematic diagram of a proppant bead depicting infiltration of glass from the core into the shell of the proppant bead.

The following equation was developed relating to infiltrated zone radius ($R_f$) compared to core radius (b)—the $R_f/b$ ratio, which can be further understood by reference to FIG. 11.

$$\frac{Rf}{b} = \sqrt[3]{\frac{(1 + \sigma c \phi c - \phi s)}{1 - \phi s}}$$

Figure 12:
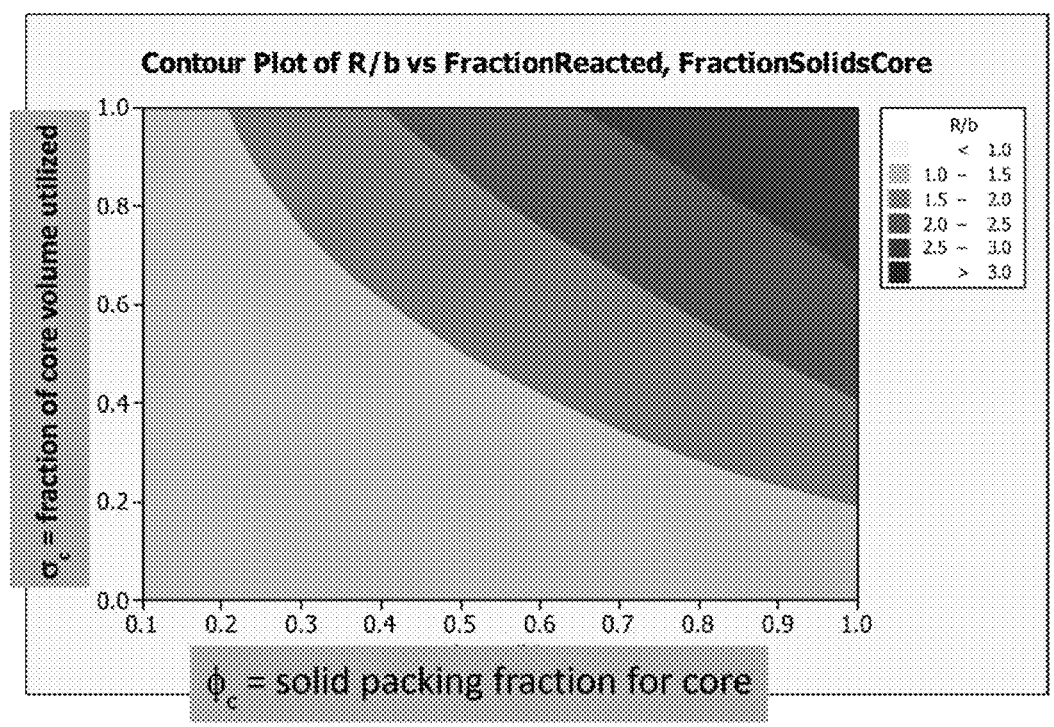
FIG. 12 is a contour plot of R/b v. fraction reacted, fraction solids core.
Figure 13:
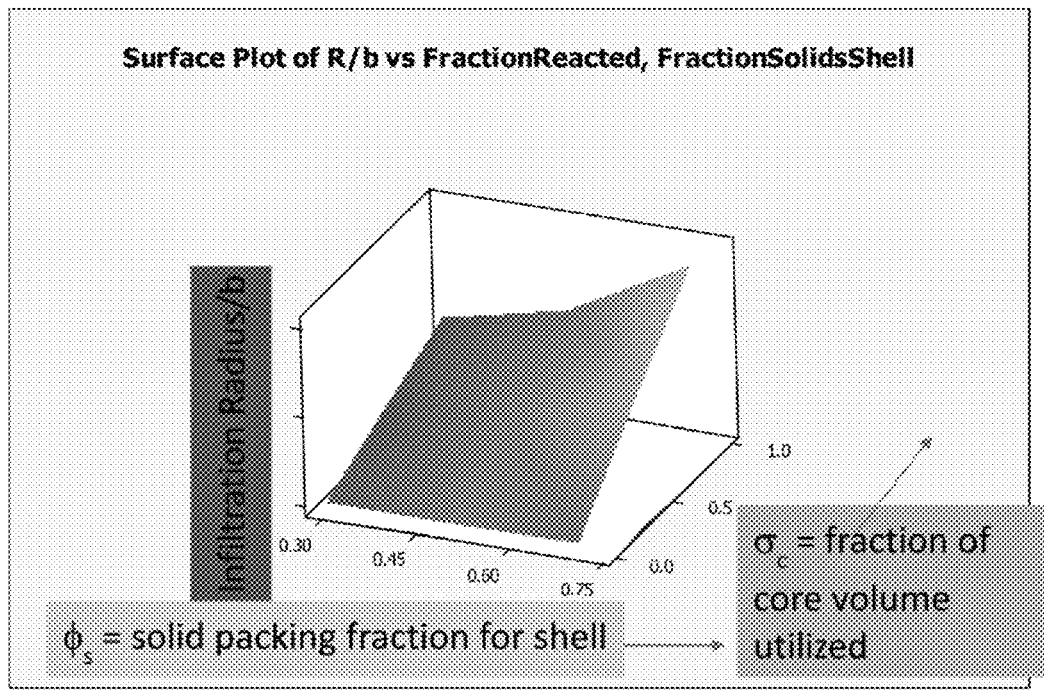
FIG. 13 is a surface plot of R/b v. fraction reacted, fraction solids shell.
Figure 14:
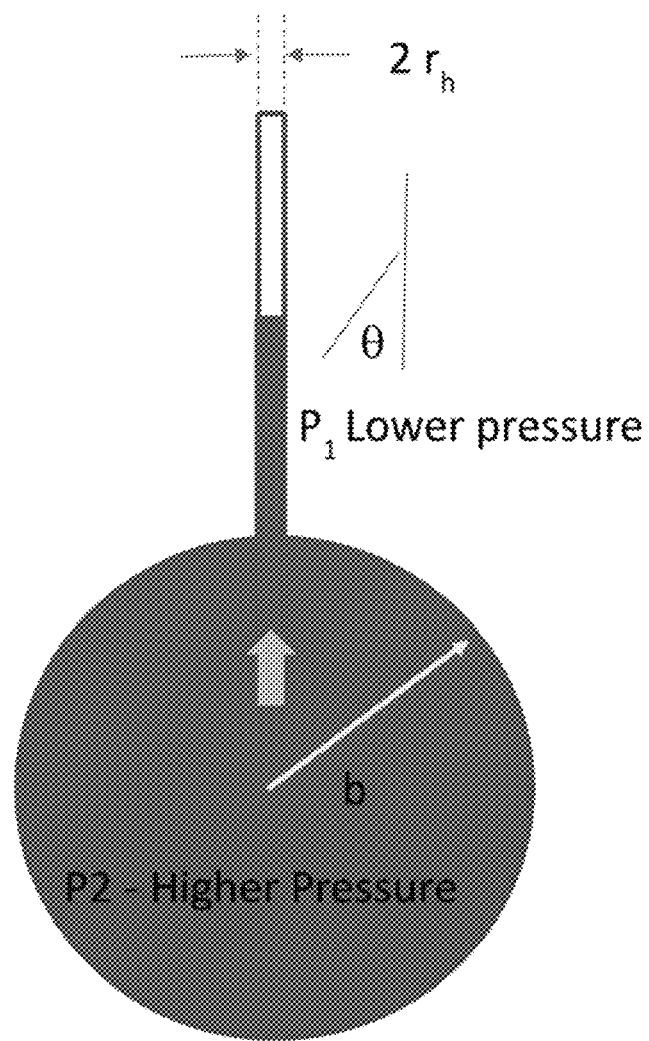
FIG. 14 is a schematic diagram of capillarity as a driving force for infiltration.

The symbols (variables) in this equation or otherwise shown in FIG. 11 are bead outer radius (a), core radius (b), infiltrated zone radius ($R_f$), infiltrated zone radius as a function of time (R(t)), fraction of core volume utilized ($\sigma_c$), solid packing fraction for core ($\phi_c$), solid packing fraction for shell ($\phi_s$), fraction porosity in core ($P_c$), and fraction porosity in shell ($P_s$). The equation assumes no changes in bead radii (a and b) during infiltration process, and no changes in bead properties (packing fractions) during infiltration. This equation and others described herein can be consistent with mass conservation capillarity, and Darcy's law. Using this equation, it was found that the relative infiltration $$\frac{Rf}{b}$$

increases with increasing core fraction utilized and packing density of the core, see FIG. 14. The variable $\sigma_c$ (fraction of core volume utilized) can be controlled by controlling glass viscosity through formulation. The variable $\phi_c$ (solid packing fraction for core), see FIG. 12, can be modified with spray drying conditions and slurry properties. The variable $\phi_s$ (solid packing fraction for shell) appears to have no significant impact for infiltration as shown in FIG. 13.

The following equations were developed to model capillary driving force ($\Delta P$) for infiltration of the shell, which can be further understood by reference to FIG. 14.

$$P = \gamma \cos(\theta) \left( \frac{1}{r1} + \frac{1}{r2} \right) \text{ Capillarity Equation}$$

$$P_1 = 2\gamma \cos(\theta) \left( -\frac{1}{rh} \right)$$

$$P_2 = 2\gamma \cos(\theta) \left( -\frac{1}{b} \right)$$

$$\Delta P = P_1 - P_2 = \gamma \cos(\theta) \left( \frac{1}{b} - \frac{1}{rh} \right)$$

The symbols (variables) in this equation are pressure at shell capillary ($P_1$), pressure at the core ($P_2$), pressure difference ($\Delta P$), surface tension of liquid glass ($\gamma$), average pore radius of the shell ($r_h$), core radius (b), and wetting angle glass on shell material (θ). With b>>$r_h$, and (P1−P2)<0 or P2>P1, and liquid moves from high pressure core region to shell region. There can be additional driving force for liquid infiltration due to glass volume expansion, shrinkage of shell, or bloating of the cenos.

Figure 15:
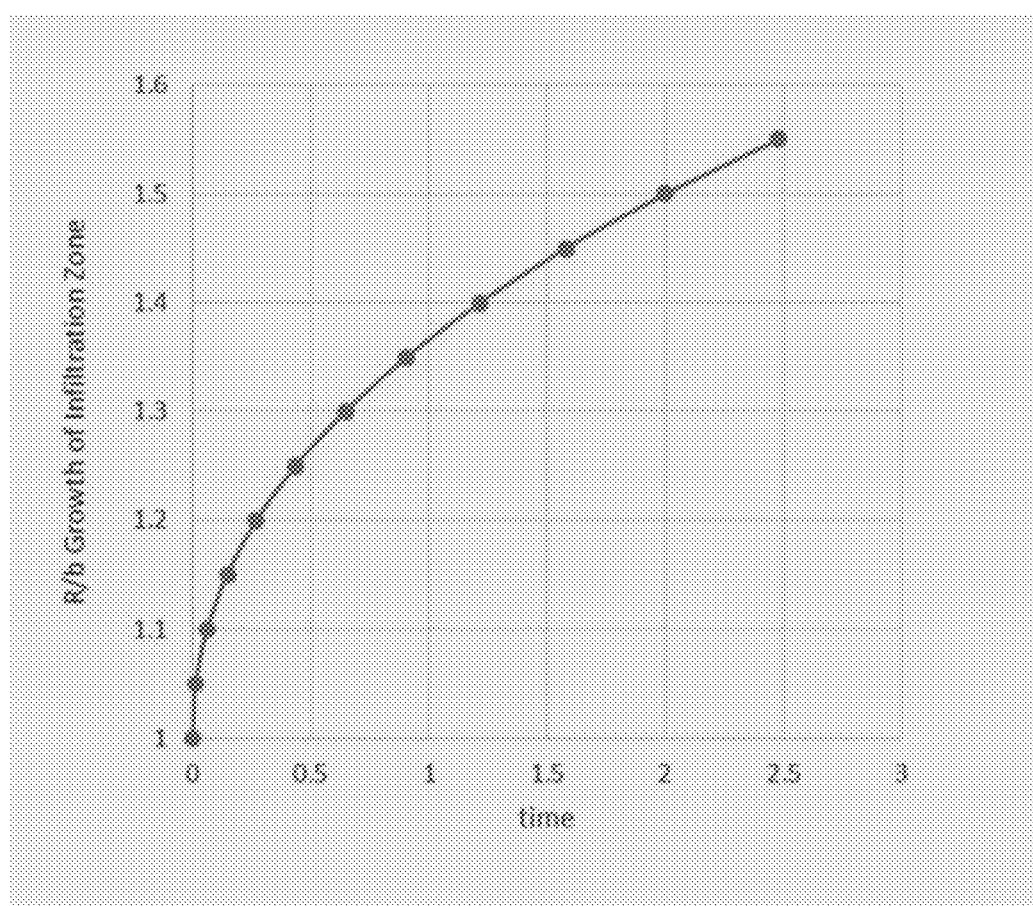
FIG. 15 is a graph of R/b growth of the infiltration zone v. time.

The following equation was developed to model infiltration radius (R(t)) as a function of time and can be used to $$\Delta P \cdot (t - to) = \frac{\eta}{Kw}\left[3\left(\frac{R}{b}\right)^2 - 2\left(\frac{R}{b}\right)^3 - 1\right] \text{ or}$$

$$\Delta P \cdot t = \frac{\eta}{Kw}\left[3\left(\frac{R}{b}\right)^2 - 2\left(\frac{R}{b}\right)^3 - 1\right]$$

$$\Delta P = P_1 - P_2 = \gamma \cos(\theta)\left(\frac{1}{b} - \frac{1}{rh}\right)$$

and the symbols (variables) in this equation are liquid/glass viscosity (η), shell permeability (Kw), core radius (b), infiltrated radius at time t (R), pressure difference (ΔP), surface tension of liquid glass (γ), average pore radius of the shell ($r_h$), core radius (b), wetting angle glass on shell material (θ), and incubation time, time to form glass (to). The equation establishes the relation between the radius at time t and the bead properties. The equation also contains all relevant variables for understanding bead densification due to glass infiltration. The bead (proppant) properties can depend on bead geometry, material properties, and processing parameters (e.g. packing fractions). Variables ΔP, η, Kw are a function of temperature. Infiltration zone dimensions can be controlled by material properties and processing conditions. With respect to materials, core glass viscosity can be modified by modifying ST core formulation. A decrease in viscosity can be achieved by alkali addition. An increase in viscosity can be achieved by the addition of one or more of alumina, fine silica, and the like. For processing, shell permeability and core packing density can be changed. The firing profile can depend on bead size. Proppants with superior properties can be achieved using these formulae. FIG. 15 is a graph of R/b growth of the infiltration zone v. time.

The present invention includes the following aspects/embodiments/features in any order and/or in any combination:

1. The present invention relates to a plurality of sintered ceramic proppants having a mean particle size, wherein the sintered ceramic proppants are monodispersed with a distribution that is a 3-sigma distribution or lower with a width of the total distribution being 5% or less of the mean particle size.
2. The plurality of sintered ceramic proppants of any preceding or following embodiment/feature/aspect, wherein said distribution is a 2-sigma distribution or lower.
3. The plurality of sintered ceramic proppants of any preceding or following embodiment/feature/aspect, wherein the distribution is a 1-sigma distribution.
4. The plurality of sintered ceramic proppants of any preceding or following embodiment/feature/aspect, wherein said sintered ceramic proppants comprise aluminum oxide, silicon dioxide, and one or more mixed metal aluminum oxides.
5. The plurality of sintered ceramic proppants of any preceding or following embodiment/feature/aspect, wherein said sintered ceramic proppants have a specific gravity of from 0.6 to 4.
6. The plurality of sintered ceramic proppants of any preceding or following embodiment/feature/aspect, wherein said proppants have a crush strength of from 5,000 psi to 30,000 psi.
7. The plurality of sintered ceramic proppants of any preceding or following embodiment/feature/aspect, wherein said sintered ceramic proppants have a Krumbein sphericity of at least 0.9.
8. The plurality of sintered ceramic proppants of any preceding or following embodiment/feature/aspect, wherein said sintered ceramic proppants have a particle size of from about 100 microns to 3,000 microns.
9. The plurality of sintered ceramic proppants of any preceding or following embodiment/feature/aspect, wherein said sintered ceramic proppants comprise a core and at least one shell around said core.
10. The plurality of sintered ceramic proppants of any preceding or following embodiment/feature/aspect, wherein said sintered ceramic proppants comprise a core and a shell, wherein a central void is present within said core.
11. A method of making a sintered ceramic proppant comprising forming a spherical green body core comprising one or more ceramic particulate materials;
   forming, at the same time or afterwards, a green body shell around said green body core, wherein said green body shell comprises at least one ceramic particulate material which results in a green core/shell body;
   sintering said green core/shell body, and, during sintering, diffusing or otherwise migrating at least a portion of said green body core into said green body shell to form a sintered ceramic proppant having a) a central void or a plurality of hollow regions and b) a shell.
12. The method of any preceding or following embodiment/feature/aspect, wherein said central void or plurality of hollow regions comprises at least 5% by volume of the overall volume of the sintered ceramic proppant.
13. The method of any preceding or following embodiment/feature/aspect, wherein said diffusing (or migration) results in at least 1% by weight of said green body core diffusing (or migrating) into said shell.
14. The method of any preceding or following embodiment/feature/aspect, wherein said diffusing (or migration) results in at least 10% by weight of said green body core diffusing (or migrating) into said shell.
15. The method of any preceding or following embodiment/feature/aspect, wherein said diffusing (or migrating) results in at least 30% by weight of said green body core diffusing (or migrating) into said shell.
16. The method of any preceding or following embodiment/feature/aspect, wherein the green body shell has a softening temperature that is higher than the softening temperature of the green body core.
17. The method of any preceding or following embodiment/feature/aspect, wherein said green body shell has a softening temperature of at least 100° C. higher than the softening temperature of the green body core.
18. The method of any preceding or following embodiment/feature/aspect, wherein the softening temperature of the green body shell is from about 300° C. to about 400° C. higher than the softening temperature of the green body core.

19. The method of any preceding or following embodiment/feature/aspect, wherein the green body shell has a porosity of at least 10% by volume based on the volume of the green body shell.
20. The method of any preceding or following embodiment/feature/aspect, wherein the green body shell has a porosity of at least 30% by volume based on the volume of the green body shell.
21. The method of any preceding or following embodiment/feature/aspect, wherein said sintered ceramic proppant has at least 10% porosity in the sintered shell.
22. A plurality of sintered ceramic proppants having a Krumbein sphericity of at least 0.92.
23. The plurality of sintered ceramic proppants of any preceding or following embodiment/feature/aspect, wherein said Krumbein sphericity is 0.95 to 0.99.
24. The method of any preceding or following embodiment/feature/aspect, wherein the slurry has an Ohnesorge Number (Z) of from 1 to 10.
25. The method of any preceding or following embodiment/feature/aspect, wherein the slurry has an Ohnesorge Number (Z) of from 2 to 10.
26. The method of any preceding or following embodiment/feature/aspect, wherein the slurry has an Ohnesorge Number (Z) of from 4 to 6.
27. A proppant comprising a plurality of micron particles that are sintered together, wherein said micron particles have a unimodal particle distribution, wherein said micron particles have a $d_{50}$ of 0.5 micron to 3.5 microns.
28. The proppant of any preceding or following embodiment/feature/aspect, wherein said proppant has a plurality of pores having a pore volume wherein a majority of the pore volume results from interstitial gaps formed between the micron particles.
29. The proppant of any preceding or following embodiment/feature/aspect, wherein the proppant is spherical and have a Krumbein sphericity of at least about 0.9 and/or a roundness of at least about 0.9.
30. The proppant of any preceding or following embodiment/feature/aspect, wherein the pore volume is from about 1% to 30% based upon the total volume of said proppant.
31. The proppant of any preceding or following embodiment/feature/aspect, wherein the pore volume is from about 5% to 20% based upon the total volume of said proppant.
32. The proppant of any preceding or following embodiment/feature/aspect, wherein said proppant has a specific gravity of from 0.8 to 4.
33. The proppant of any preceding or following embodiment/feature/aspect, wherein said proppant has a specific gravity of from about 1 to 3.5.
34. The proppant of any preceding or following embodiment/feature/aspect, wherein said proppant has a $d_{10}$ that is within 100% of the $d_{50}$.
35. The proppant of any preceding or following embodiment/feature/aspect, wherein said proppant has a $d_{10}$ that is within 50% of the $d_{50}$.
36. The proppant of any preceding or following embodiment/feature/aspect, wherein said proppant has a $d_{90}$ that is within 100% of the $d_{50}$.
37. The proppant of any preceding or following embodiment/feature/aspect, wherein said proppant has a $d_{90}$ that is within 50% of the $d_{50}$.
38. The proppant of any preceding or following embodiment/feature/aspect, wherein said proppant has a $d_{10}$ that is within 100% of the $d_{50}$ and has a $d_{90}$ that is within 100% of the $d_{50}$.
39. The proppant of any preceding or following embodiment/feature/aspect, wherein said proppant has a core and at least one shell on said core.
40. The proppant of any preceding or following embodiment/feature/aspect, wherein said core comprises said plurality of micron particles that are sintered together.
41. The proppant of any preceding or following embodiment/feature/aspect, wherein said shell comprises a plurality of micron particles that are sintered together.
42. The proppant of any preceding or following embodiment/feature/aspect, wherein said proppant is in the absence of a binder.
43. The proppant of any preceding or following embodiment/feature/aspect, wherein said proppant is in the absence of a polymer.
44. The proppant of any preceding or following embodiment/feature/aspect, wherein the core comprises a plurality of micron particles that are sintered together, wherein said micron particles have a bimodal particle distribution with a modal A particle distribution and a modal B particle distribution.
45. The proppant of any preceding or following embodiment/feature/aspect, wherein said micron particles of each modal have a $d_{50}$ of 0.5 micron to 3.5 microns, and modal A has a $d_{50}$ that is at least 10% different from the $d_{50}$ of modal B.
46. The proppant of any preceding or following embodiment/feature/aspect, wherein said micron particles of each modal have a $d_{50}$ of 0.5 micron to 3.5 microns, and modal A has a $d_{50}$ that is at least 20% different from the $d_{50}$ of modal B.
47. The proppant of any preceding or following embodiment/feature/aspect, wherein said micron particles of each modal have a $d_{50}$ of 0.5 micron to 3.5 microns, and modal A has a $d_{50}$ that is from 10% to 100% different from the $d_{50}$ of modal B.
48. A proppant comprising a core and a shell, wherein said core is a ceramic or oxide core, and said shell comprises at least one ceramic material, and said proppant has a core strength to shell strength ratio of from 0.8 to 1.
49. The proppant of any preceding or following embodiment/feature/aspect, wherein said proppant has an overall proppant strength to core strength ratio of from 2 to 3.
50. The proppant of any preceding or following embodiment/feature/aspect, wherein said proppant has a specific gravity of 2.6 to 4.5.
51. The proppant of any preceding or following embodiment/feature/aspect, wherein core is a synthetic core.
52. The method of any preceding or following embodiment/feature/aspect, wherein said green core is solid prior to said sintering.
53. The method of any preceding or following embodiment/feature/aspect, wherein said central void has a shape and size of said green core or a portion thereof.
54. The method of any preceding or following embodiment/feature/aspect, wherein whiskers or fibers are formed in-situ in said shell during said sintering and as a result of said diffusing (or migrating).
55. The method of any preceding or following embodiment/feature/aspect, wherein said diffusing (or migrating) of the green body core or portion thereof into the 53. shell results in a gradient of wherein a higher concentration of the core is present closer to the core than to an exterior outer surface of the proppant.

56. The method of any preceding or following embodiment/feature/aspect, wherein said spherical green body, green body shell, or both further comprise at least one nucleating agent.

57. The method of any preceding or following embodiment/feature/aspect, wherein said ceramic particulate materials comprise cordierite, mullite, bauxite, silica, spodumene, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide, a non-oxide ceramic or any combination thereof.

58. The method of any preceding or following embodiment/feature/aspect, wherein said ceramic particulate materials comprise one or more sedimentary materials or synthetically produced materials or both.

59. The method of any preceding or following embodiment/feature/aspect, wherein said spherical green body core and said green body shell are in the absence of igneous or metamorphic materials.

60. The plurality of sintered ceramic proppants of any preceding or following embodiment/feature/aspect, wherein said sintered ceramic proppants have less than 1% by weight of proppant of igneous or metamorphic materials.

61. The method of any preceding or following embodiment/feature/aspect, wherein the green body or a portion thereof has a density, as measured by a gas pycnometer, such that the average density (g/cm$^3$) does not alter by more than 1% between the density of the whole green body compared to the density of the crushed green body.

62. The method of any preceding or following embodiment/feature/aspect, wherein the average density changes 0.005% or less.

63. The method of any preceding or following embodiment/feature/aspect, wherein one or more mobile phases are formed in droplets of the slurry that forms the green body and one phase migrates to the surface of the droplet, which causes a multi-phase droplet to form.

64. The method of any preceding or following embodiment/feature/aspect, wherein said multi-phase droplet forms a non-uniform green body of phases.

65. The method of any preceding or following embodiment/feature/aspect, wherein said non-uniform green body of phases diffuses (or migrates) at different rates into said shell with respect to the phases.

66. The method of any preceding or following embodiment/feature/aspect, wherein said green body core comprises at least 50% by weight, based on the weight of the green body core of glassy material, and said green body shell comprises at least 50% crystalline material.

67. The method of any preceding or following embodiment/feature/aspect, wherein said green body core comprises at least 75% by weight, based on the weight of the green body core of glassy material, and said green body shell comprises at least 75% crystalline material.

68. The method of any preceding or following embodiment/feature/aspect, wherein said green body core comprises at least 95% by weight, based on the weight of the green body core of glassy material, and said green body shell comprises at least 95% crystalline material.

69. The method of any preceding or following embodiment/feature/aspect, wherein the particles used to form the green body core are at least 10% smaller in average mean size ($d_{50}$ size) compared to the mean particle size ($d_{50}$ size) of the particles that form the green body shell.

70. The method of any preceding or following embodiment/feature/aspect, wherein the particles used to form the green body core are at least 50% smaller in average mean size ($d_{50}$ size) compared to the mean particle size ($d_{50}$ size) of the particles that form the green body shell.

71. The method of any preceding or following embodiment/feature/aspect, wherein the particles used to form the green body core are at least 100% smaller in average mean size ($d_{50}$ size) compared to the mean particle size ($d_{50}$ size) of the particles that form the green body shell.

72. The method of any preceding or following embodiment/feature/aspect, wherein the ceramic particulate materials that form the green body or a part thereof has the following standard deviation range based on the indicated mean particle size range:
    100–299 μm, σ=0.83–2.5
    300–499 μm, σ=2.5–4.16
    500–799 μm, σ=4.16–6.66
    800–999 μm, σ=6.66–8.33
    1000–1499 μm, σ=8.33–12.5
    1500–2000 μm, σ=12.5–16.66.

73. The method of any preceding or following embodiment/feature/aspect, wherein the ceramic particulate materials that form the green body or a part thereof has a monodisperse particle distribution such that $$d_s = \frac{(d_{90} - d_{10})}{d_{50}}$$

where $d_{90}$, $d_{50}$ and $d_{10}$ are the 90$^{th}$, 50$^{th}$, and 10$^{th}$ percentiles of the particle size distribution respectively, wherein $0.00 < d_s \leq 0.05$.

74. The plurality of sintered ceramic proppants of any preceding or following embodiment/feature/aspect, wherein said sintered ceramic proppants comprise at least one ceramic, wherein said ceramic comprises cordierite, mullite, bauxite, silica, spodumene, clay, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide or a non-oxide ceramic or any mixtures thereof.

75. The plurality of sintered ceramic proppants of any preceding or following embodiment/feature/aspect, wherein said sintered ceramic proppants comprise at least one ceramic, wherein said ceramic comprises a glass-ceramic.

76. The plurality of sintered ceramic proppants of any preceding or following embodiment/feature/aspect, wherein said sintered ceramic proppants comprise at least one ceramic, wherein said ceramic comprises aluminum oxide, silicon oxide, titanium oxide, iron oxide, magnesium oxide, calcium oxide, potassium oxide and/or sodium oxide, or any combination thereof.

77. A plurality of sintered ceramic proppants having a mean particle size, wherein the sintered ceramic proppants are monodispersed with a standard deviation of 3 or less.
78. The plurality of sintered ceramic proppants of any preceding or following embodiment/feature/aspect, wherein said standard deviation is 2.75 or less.
79. The plurality of sintered ceramic proppants of any preceding or following embodiment/feature/aspect, wherein said standard deviation is 2 or less.
80. The plurality of sintered ceramic proppants of any preceding or following em1odiment/feature/aspect, wherein said standard deviation is 1 or less.
81. The plurality of sintered ceramic proppants of any preceding or following embodiment/feature/aspect, wherein said standard deviation is 0.5 or less.
82. The plurality of sintered ceramic proppants of any preceding or following embodiment/feature/aspect, wherein said standard deviation is from 0.5 to 3.
83. A plurality of ceramic proppants having a mean particle size, wherein the ceramic proppants are monodispersed and have a coefficient of variance (CV) of 8% or less.
84. The plurality of ceramic proppants of any preceding or following embodiment/feature/aspect, wherein said coefficient of variance is from about 5% to 8%.
85. The plurality of ceramic proppants of any preceding or following embodiment/feature/aspect, wherein said ceramic proppants are sintered.
86. The plurality of ceramic proppants of any preceding or following embodiment/feature/aspect, wherein said ceramic proppants are green bodies.
87. The plurality of ceramic proppants of any preceding or following embodiment/feature/aspect, wherein said ceramic proppants are green bodies having a core and shell.
88. A ceramic proppant that comprises at least one ceramic, wherein said proppant has a change in sphericity of 5% or less.
89. The ceramic proppant of any preceding or following embodiment/feature/aspect, wherein said change of sphericity is 3% or less.
90. The ceramic proppant of any preceding or following embodiment/feature/aspect, wherein said change of sphericity is from about 0.5% to 5%.
91. The ceramic proppant of any preceding or following embodiment/feature/aspect, wherein said ceramic proppant is sintered.
92. The ceramic proppant of any preceding or following embodiment/feature/aspect, wherein said ceramic proppant is a green body.
93. The ceramic proppant of any preceding or following embodiment/feature/aspect, wherein said ceramic proppant is a green body having a core and shell.
94. A ceramic proppant comprising at least one ceramic and having a strength/porosity relationship at a load of 20,000 psi of from 0.4 to 0.9.
95. The ceramic proppant of any preceding or following embodiment/feature/aspect, wherein said strength/porosity relationship at a load of 20.000 psi is from 0.46 to 0.88.
96. The ceramic proppant of any preceding or following embodiment/feature/aspect, wherein said strength/porosity relationship at a load of 20,000 psi is from 0.5 to 0.8.
97. A ceramic proppant comprising at least one ceramic and having a measured specific gravity that is within 10% of a specific gravity calculated from a measured bulk density of the ceramic proppant.
98. The ceramic proppant of any preceding or following embodiment/feature/aspect, wherein said measured specific gravity is within 5% of the specific gravity calculated from the measured bulk density.
99. The ceramic proppant of any preceding or following embodiment/feature/aspect, wherein said measured specific gravity is within 1% of the specific gravity calculated from the measured bulk density.
100. The ceramic proppant of any preceding or following embodiment/feature/aspect, wherein said measured specific gravity is within 0.1% of the specific gravity calculated from the measured bulk density.
101. The ceramic proppant of any preceding or following embodiment/feature/aspect, wherein said ceramic proppant has a maximum load of at least 18 N.
102. The ceramic proppant of any preceding or following embodiment/feature/aspect, wherein said ceramic proppant has a maximum load of from 20 N to 100 N.
103. The ceramic proppant of any preceding or following embodiment/feature/aspect, wherein said ceramic proppant has a maximum load of from 40 N to 80 N.
104. A plurality of sintered ceramic proppants comprising at least one ceramic, wherein said plurality of proppants have an average crush strength in psi as determined per single proppant and a coefficient of variance of the proppants for individual crush strength is 20% or less.
105. The plurality of sintered ceramic proppants of any preceding or following embodiment/feature/aspect, wherein said coefficient of variance is from 5% to 20%.
106. The plurality of sintered ceramic proppants of any preceding or following embodiment/feature/aspect, wherein said coefficient of variance is from 5% to 15%.
107. The plurality of sintered ceramic proppants of any preceding or following embodiment/feature/aspect, wherein said coefficient of variance is from 10% to 20%.
108. The plurality of sintered ceramic proppants of any preceding or following embodiment/feature/aspect, wherein said plurality is at least one kilogram of proppant.
109. A plurality of sintered ceramic proppants comprising at least one ceramic, wherein said plurality of proppants have a coefficient of variance for size (size CV) of 10% or less, and the same plurality of proppants have a coefficient of variance for the shape (shape CV) of 5% or less.
110. The plurality of sintered proppants of any preceding or following embodiment/feature/aspect, wherein the sintered proppants have a sphere shape.
111. The plurality of sintered ceramic proppants of any preceding or following embodiment/feature/aspect, wherein said plurality of proppants have said coefficient of variance for size (size CV) of 1% to 10%, and the same plurality of proppants have said coefficient of variance for the shape (shape CV) of 0.5 to 5%.
112. The plurality of sintered ceramic proppants of any preceding or following embodiment/feature/aspect, wherein said plurality of proppants have said coefficient of variance for size (size CV) of 1% to 6%, and the same plurality of proppants have said coefficient of variance for the shape (shape CV) of 0.5 to 3%.
113. The plurality of sintered ceramic proppants of any preceding or following embodiment/feature/aspect, wherein said plurality of proppants have said coefficient of variance for size (size CV) of 3% to 8%, and the same plurality of proppants have said coefficient of variance for the shape (shape CV) of 0.5 to 3%.

114. A sintered ceramic proppant comprising at least one ceramic, and a ceramic core that is synthetic and at least one ceramic shell, wherein said ceramic core, at a 20,000 psi crush test under API 60, has a 20,000 psi crush fines that average 5.5% or less.

115. The sintered ceramic proppant of any preceding or following embodiment/feature/aspect, wherein said 20,000 psi crush fines average 3% or less.

116. The sintered ceramic proppant of any preceding or following embodiment/feature/aspect, wherein said 20,000 psi crush fines average from 0.5% to 5%.

117. The sintered ceramic proppant of any preceding or following embodiment/feature/aspect, wherein the ceramic core has a sintered $d_{50}$ size of 500 microns or less.

118. The sintered ceramic proppant of any preceding or following embodiment/feature/aspect, wherein the ceramic core has a sintered $d_{50}$ size of from 100 microns to 500 microns.

119. The sintered ceramic proppant of any preceding or following embodiment/feature/aspect, wherein the ceramic core has a sintered $d_{50}$ size of from 300 microns to 475 microns.

120. The sintered ceramic proppant of any preceding or following embodiment/feature/aspect, wherein the ceramic core has a sintered $d_{50}$ size of 500 microns or less and a specific gravity of 3 sg or lower.

121. The sintered ceramic proppant of any preceding or following embodiment/feature/aspect, wherein the ceramic core has a sintered $d_{50}$ size of 500 microns or less and a specific gravity of from 2 sg to 2.9 sg.

122. A plurality of ceramic proppants having a crush resistance number based on the overall crush fine ratio, where $$\text{crush resistance Number}(CR) = \{[D \times Sd_{50}]/[CF \times P]\} \times 10^6$$

wherein CF represents the amount (by weight % in fraction) of the crushed fines from a 20,000 psi crush test and is an average and based on API RP-60, and weight % is based on the total amount of particles being subjected to the crush test, D represents the density of the proppants in g/cm$^3$, $Sd_{50}$ represents sintered $d_{50}$ size of the proppants in microns, and P is crush fine measurement pressure in g/cm$^2$, and wherein said crush resistance number is from 0.5 to 3.

123. The plurality of ceramic proppants of any preceding or following embodiment/feature/aspect, wherein said crush resistance number is from 0.75 to 2.5.

124. The plurality of ceramic proppants of any preceding or following embodiment/feature/aspect, wherein said crush resistance number is from 1 to 2.

125. A ceramic proppant comprising a ceramic synthetic core or template, wherein said ceramic proppant has a strength to porosity ratio, determined by measuring crush strength (psi) of the ceramic proppant and dividing by amount of porosity (% volume) (including any central void) that is present in the ceramic proppant, and said strength to porosity ratio is from $5 \times 10^4$ to $50 \times 10^4$.

126. The ceramic proppant of any preceding or following embodiment/feature/aspect, wherein said strength to porosity ratio is from $5 \times 10^4$ to $30 \times 10^4$.

127. The ceramic proppant of any preceding or following embodiment/feature/aspect, wherein said strength to porosity ratio is from $15 \times 10^4$ to $30 \times 10^4$.

128. The ceramic proppant of any preceding or following embodiment/feature/aspect, wherein said strength to porosity ratio is from $5 \times 10^4$ to $10 \times 10^4$.

129. A sintered ceramic proppant that is spherical and having a central void, and having regions A to B, B to C and C to D, wherein region A to B is closest to the central void and region C to D is furthest away from said central void, and region B to C is radially located between region A to B and C to D and said sintered ceramic proppant having porosity that is highest in the central location of the shell with regard to radius of sintered ceramic proppant with region A to B having from 0% to 5% (by volume of that region) of porosity, region B to C having porosity of from 5% to 30% by volume of that region, and region C to D having porosity that is ±10% of region A to B.

130. The sintered ceramic proppant of any preceding or following embodiment/feature/aspect, wherein region B to C has more porosity by volume than region A to B and/or region C to D.

131. The sintered ceramic proppant of any preceding or following embodiment/feature/aspect, wherein region B to C has at least 10% more porosity than other said regions.

132. The sintered ceramic proppant of any preceding or following embodiment/feature/aspect, wherein region A to B comprises from 10% to 40% by volume of the overall non-void region of the proppant, region B to C comprises from 20% to 50% by volume of the overall non-void regions of the proppant and region C to D comprises from 10% to 40% by volume of the overall non-void regions of the proppant.

133. The method of any preceding or following embodiment/feature/aspect, wherein said slurry has a viscosity of from about $10^2$ to about $10^5$ cP.

134. The method of any preceding or following embodiment/feature/aspect, wherein said sintering is performed under pressure at from about $0.1 \times 10^5$ to about $10 \times 10^5$ Pa.

135. The method of any preceding or following embodiment/feature/aspect, wherein said ceramic particulate material have a $d_{50}$ particle size of from 0.2 micron to about 50 microns.

136. The method of any preceding or following embodiment/feature/aspect, wherein said ceramic particulate material have a $d_{50}$ particle size of from 0.5 micron to about 5 microns.

137. The method of any preceding or following embodiment/feature/aspect, wherein said ceramic particulate material have a $d_{50}$ particle size of from 0.5 micron to about 2.5 microns.

138. A method of making a ceramic proppant comprising:
  a. forming a green body core from a first plurality of particles that comprise at least one type of first ceramic material;
  b. forming at least one green shell layer around said green body core to obtain a green body, wherein said green shell layer is formed from a second plurality of particles that comprise at least one type of second ceramic material, wherein said first ceramic material and said second ceramic material is the same or different; and
  c. sintering said green body to form a sintered body.

139. The method of any preceding or following embodiment/feature/aspect, wherein said forming of the green body core comprises spray drying a slurry containing said first plurality of particles into the shape of said green body core.
140. The method of any preceding or following embodiment/feature/aspect, wherein said forming of the at least one green shell layer comprises utilizing a fluid bed to apply said second plurality of particles to provide said green shell layer.
141. The method of any preceding or following embodiment/feature/aspect, wherein said second plurality of particles further comprises at least one pore former or microsphere or both.
142. The method of any preceding or following embodiment/feature/aspect, wherein said green body core is a solid core with no central void.
143. The method of any preceding or following embodiment/feature/aspect, wherein said green body core is a hollow core having a central void.
144. A method of making a ceramic proppant comprising:
   a. forming a green body core from a first plurality of particles that comprise at least one type of first ceramic material;
   b. sintering said green body core to form a sintered core;
   c. forming at least one green shell layer around said sintered core to obtain at least one green shell layer, wherein said green shell layer is formed from a second plurality of particles that comprise at least one type of second ceramic material, wherein said first ceramic material and said second ceramic material is the same or different;
   d. sintering said at least one green shell layer to form a sintered body having a core/shell.
145. The method of any preceding or following embodiment/feature/aspect, wherein said forming of the green body core comprises spray drying a slurry containing said first plurality of particles into the shape of said green body core.
146. The method of any preceding or following embodiment/feature/aspect, wherein said forming of the at least one green shell layer comprises utilizing a fluid bed to apply said second plurality of particles to provide said at least one green shell layer.
147. The method of any preceding or following embodiment/feature/aspect, wherein said second plurality of particles further comprises at least one pore former or microsphere or both.
148. The method of any preceding or following embodiment/feature/aspect, wherein said green body core is a solid core with no central void.
149. The method of any preceding or following embodiment/feature/aspect, wherein said green body core is a hollow core having a central void.
150. A method of a making ceramic proppant comprising:
   a. forming at the same time or about the same time, a green body core from a first plurality of particles that comprise at least one type of first ceramic material and forming at least one green shell layer around said green body core to obtain a green body, wherein said shell layer is formed from a second plurality of particles that comprise at least one type of second ceramic material, wherein said first ceramic material and said second ceramic material is the same or different; and
   b. sintering said green body to form a sintered body.
151. The method of any preceding or following embodiment/feature/aspect, wherein said forming of the green body core and green shell layer comprises forming by way of a co-axial nozzle.
152. The method of any preceding or following embodiment/feature/aspect, wherein said second plurality of particles further comprises at least one pore former or microsphere or both.
153. The method of any preceding or following embodiment/feature/aspect, wherein said green body core is a solid core with no central void.
154. The method of any preceding or following embodiment/feature/aspect, wherein said green body core is a hollow core having a central void.
155. The method of any preceding or following embodiment/feature/aspect, wherein said forming of the green body core and green shell layer comprises forming by co-axial extrusion or co-axial spray-drying.
156. A method of making a ceramic proppant comprising:
   a. providing a fugitive spherical core;
   b. forming at least one green shell layer around said fugitive spherical core to obtain a green body, wherein said green shell layer is formed from a plurality of particles that comprise at least one type of ceramic material; and
   c. sintering said green body to remove at least a portion of said fugitive spherical core and form a central void and a sintered shell body.
157. The method of any preceding or following embodiment/feature/aspect, wherein said fugitive spherical core comprises at least one polymer.
158. The method of any preceding or following embodiment/feature/aspect, wherein said fugitive spherical core is polymer core.
159. The method of any preceding or following embodiment/feature/aspect, wherein said fugitive spherical core comprises at least one silicon-containing polymer.
160. The method of any preceding or following embodiment/feature/aspect, further comprising forming said fugitive spherical core by extrusion or spraying drying.
161. The method of any preceding or following embodiment/feature/aspect, wherein said fugitive spherical core is a solid core.
162. The method of any preceding or following embodiment/feature/aspect, wherein said fugitive spherical core is a core with a central void.
163. The method of any preceding or following embodiment/feature/aspect, wherein said forming of the at least one green shell layer comprises utilizing a fluid bed to apply said plurality of particles to provide said green shell layer.
164. The method of any preceding or following embodiment/feature/aspect, wherein said plurality of particles further comprises at least one pore former or microsphere or both.
165. The method of any preceding or following embodiment/feature/aspect, wherein said sintering comprises sintering in an oxidizing atmosphere.
166. The method of any preceding or following embodiment/feature/aspect, wherein said fugitive spherical core is pyrolyzed during said sintering.
167. The method of any preceding or following embodiment/feature/aspect, wherein said fugitive spherical core is pyrolyzed during said sintering and at least a portion of said fugitive spherical core forms a pyrolyzed material that reacts with at least a portion of said green shell layer.

168. The method of any preceding or following embodiment/feature/aspect, wherein said fugitive spherical core is pyrolyzed during said sintering and at least a portion of said fugitive spherical core forms a pyrolyzed material that reacts with at least a portion of said green shell layer to form a mullite phase.

169. The method of any preceding or following embodiment/feature/aspect, wherein said fugitive spherical core is pyrolyzed during said sintering and at least a portion of said fugitive spherical core forms a pyrolyzed material that reacts with at least a portion of said green shell layer to form a mullite phase in a radial region closer to the central void and wherein a radial region further away from said central void contain no mullite phase.

170. A proppant comprising a porous core and a shell surrounding the core, the shell including a transition region and an outer shell surrounding the transition region, wherein an average transition region density is greater than an average outer shell density and the average shell density is greater than an average core density.

171. The proppant of any preceding or following embodiment/feature/aspect, wherein the average transition region density is at least 5% greater than the average outer shell density, and/or the average transition region density is at least 5% greater than the average core density.

172. The proppant of any preceding or following embodiment/feature/aspect, wherein the core is substantially hollow.

173. The proppant of any preceding or following embodiment/feature/aspect, wherein the core, the transition region, the outer shell, or any combination thereof comprises graphene.

174. A proppant comprising a porous core, a transition region surrounding the core, and an outer shell surrounding the transition region, wherein an average transition region porosity is less than an average outer shell porosity and the average outer shell porosity is less than an average core porosity.

175. The proppant of any preceding or following embodiment/feature/aspect, wherein the average transition region porosity is less (e.g., by 5% or more) than the average outer shell porosity, and/or the average transition region porosity is less (e.g., by 5% or more or 10% or more) compared to the average core porosity.

176. The proppant of any preceding or following embodiment/feature/aspect, wherein the core is substantially hollow and the average core porosity is about 100 vol % based on the total volume of the core.

177. A green body proppant comprising a core comprising a weight ratio of $SiO_2$ to $Al_2O_3$ of 2.3 or higher and a combined weight percentage of $Na_2O$ and $K_2O$ of 5.0 wt % or higher based on the total dry weight of the core.

178. The green body proppant of any preceding or following embodiment/feature/aspect, further comprising a shell surrounding the core.

179. The green body proppant of any preceding or following embodiment/feature/aspect, wherein both the core and shell are green bodies.

180. A green body proppant comprising a core comprising at least 5.0 wt % of components having a melting point of less than 1200° C. and less than 95 wt % of components having a melting point greater than 1200° C. based on the total dry weight of the core.

181. A green body proppant comprising a core comprising at least 5.0 wt % of components having a melting point of less than 1200° C., less than 7.0% wt % of components having a melting point greater than 1200° C. and less than 1500° C., and less than 88 wt % of components having a melting point greater than 1500° C. based on the total dry weight of the core.

182. A green body proppant comprising a core comprising at least 5.0 wt % of components having a melting point of less than 1200° C., less than 92 wt % of components having a melting point greater than 1200° C. and less than 2100° C., and less than 3.0 wt % of components having a melting point greater than 2100° C. based on the total dry weight of the core.

183. A green body proppant comprising a core, the core comprising one or more fluxing agents and one or more non-fluxing ceramic materials, wherein the melting points of the fluxing agents are less than the melting points than the non-fluxing ceramic materials.

184. The green body proppant of any preceding or following embodiment/feature/aspect, further comprising a shell surrounding the core configured to accept migration of the non-fluxing ceramic materials from the core during sintering.

185. The green body proppant of any preceding or following embodiment/feature/aspect, wherein the chemical fluxing agent comprises a metal salt, a metal oxide, or both.

186. The green body proppant of any preceding or following embodiment/feature/aspect, wherein the metal oxide comprises $Na_2O$, $K_2O$, or both.

187. The green body proppant of any preceding or following embodiment/feature/aspect, wherein the fluxing agent is supplied by nepheline syenite, beta-spoduminene, or both.

188. The green body proppant of any preceding or following embodiment/feature/aspect, wherein the non-fluxing ceramic material comprises $Al_2O_3$, $SiO_2$, or both.

189. The green body proppant of any preceding or following embodiment/feature/aspect, further comprising graphene.

190. A method of making a sintered ceramic proppant comprising:
   forming a substantially spherical green body core comprising one or more ceramic particulate materials;
   forming, at the same time or afterwards, a green body shell around the green body core, wherein the green body shell comprises at least one ceramic particulate material that results in a green core/shell body;
   sintering the green core/shell body, and, during sintering, diffusing (or migrating in general) at least a portion of the green body core into the green body shell to form a sintered ceramic proppant comprising a porous core, a transition region surrounding the core, and an outer shell surrounding the transition region, wherein an average transition region density is greater than an outer average shell density and the average outer shell density is greater than an average core density.

191. The method of any preceding or following embodiment/feature/aspect, wherein the sintering comprises heating the green/core shell body to at least 500° C.

192. The method of any preceding or following embodiment/feature/aspect, wherein the sintering comprises heating the green/core shell body no greater than 1500° C.

193. The method of any preceding or following embodiment/feature/aspect, wherein the sintering comprises heating the green/core shell body to at least 1200° C.
194. The method of any preceding or following embodiment/feature/aspect, wherein the sintering comprises heating the green/core shell body no greater than 2000° C.
195. The method of any preceding or following embodiment/feature/aspect, wherein the green body core has a weight ratio of $SiO_2$ to $Al_2O_3$ of 2.3 or higher and a combined weight percentage of $Na_2O$ and $K_2O$ of 5.0 or higher based on the total dry weight of the core.
196. The method of any preceding or following embodiment/feature/aspect, wherein the green body core comprises at least 5.0 wt % of components having a melting point of less than 1200° C. and less than 95 wt % of components having a melting point greater than 1200° C. based on the total dry weight of the core.
197. The method of any preceding or following embodiment/feature/aspect, wherein the green body core comprises at least 5.0 wt % of components having a melting point of less than 1200° C., less than 7.0% wt % of components having a melting point greater than 1200° C. and less than 1500° C., and less than 88 wt % of components having a melting point greater than 1500° C. based on the total dry weight of the core.
198. The method of any preceding or following embodiment/feature/aspect, wherein the green body core comprises at least 5.0 wt % of components having a melting point of less than 1200° C. less than 92 wt % of components having a melting point greater than 1200° C. and less than 2100° C., and less than 3.0 wt % of components having a melting point greater than 2100° C. based on the total dry weight of the core.
199. The method of any preceding or following embodiment/feature/aspect, wherein the green body core comprises one or more fluxing agents and one or more non-fluxing ceramic materials, wherein the melting points of the fluxing agents are less than the melting points than the non-fluxing ceramic materials.
200. The method of any preceding or following embodiment/feature/aspect, sintered ceramic proppant comprises a substantially hollow core.
201. The method of any preceding or following embodiment/feature/aspect, wherein the green body core, the green body shell, or both comprises graphene.
202. A green body proppant comprising
a green body core comprising glassy material; and
a green body shell surrounding the green body core and comprising coarse particles.
203. The green body proppant of any preceding or following embodiment/feature/aspect, further comprising a glassy phase formation agent in the green body core, the green body shell, or both.
204. The green body proppant of any preceding or following embodiment/feature/aspect, wherein the glassy phase formation agent comprises at least one silicate.
205. The green body proppant of any preceding or following embodiment/feature/aspect, wherein the green body shell has a porosity greater than the green body core.
206. The green body proppant of any preceding or following embodiment/feature/aspect, wherein the green body shell has an average glass transition temperature (Tg) greater than an average glass transition temperature of the green body core.
207. The green body proppant of any preceding or following embodiment/feature/aspect, wherein the green body shell has an average glass transition temperature (Tg) less than an average glass transition temperature (Tg) of the green body core.
208. The green body proppant of any preceding or following embodiment/feature/aspect, wherein the green body core, the green body shell, or both comprise graphene.
209. A proppant comprising a porous core, and a shell surrounding the porous core and comprising a transition region and an outer shell surrounding the transition region, wherein an average transition region density is greater than an average outer shell density, the average outer shell density is greater than an average core density, and the transition region has a glassy phase content of at least 5 vol % based on the total volume of the transition region.
210. The proppant of any preceding or following embodiment/feature/aspect, wherein the porous core, the transition region, the outer shell, or any combination thereof comprises graphene.
211. A method of making a sintered ceramic proppant comprising:
forming a substantially spherical green body core comprising one or more ceramic particulate materials including at least one glassy material;
forming, at the same time or afterwards, a green body shell around the green body core, wherein the green body shell comprises at least one ceramic particulate material that results in a green core/shell body;
sintering the green core/shell body, and, during sintering, diffusing (or migrating in general) at least a portion of the green body core into the green body shell to form a sintered ceramic proppant comprising a porous core, a transition region surrounding the core, and an outer shell surrounding the transition region, wherein an average transition region density is greater than an average outer shell density, the average outer shell density is greater than an average core density, and the transition region has a glassy phase content of at least 5 vol % based on the total volume of the transition region.
212. The method of any preceding or following embodiment/feature/aspect, wherein a glassy phase formation agent is present in the green body core, the green body shell, or both.
213. The method of any preceding or following embodiment/feature/aspect, wherein the green body shell has a porosity greater than the green body core.
214. The method of claim any preceding or following embodiment/feature/aspect, wherein the diffusing (or migration) comprises diffusing (or migrating in general) the glassy material from the green body core to the green body shell to form the transition region.
215. The method of any preceding or following embodiment/feature/aspect, wherein the sintering comprises heating at a temperature greater than an average glass transition temperature of the green body core and less than an average glass transition temperature of the green body shell.
216. The method of any preceding or following embodiment/feature/aspect, wherein the diffusing of the glass material occurs in accordance with the following formula:

$$\frac{Rf}{b} = \sqrt[3]{\frac{(1+\sigma c\phi c - \phi s)}{1-\phi s}}$$

wherein $\sigma_c$=fraction of core volume utilized, $\phi_c$=solid packing fraction for core, $\phi_s$=solid packing fraction for shell, b=core radius, and $R_f$=Infiltrated zone radius.

217. The method of any preceding or following embodiment/feature/aspect, wherein the diffusing of the glass material occurs in accordance with the following formula:

$$\Delta P = P_1 - P_2 = \gamma \, \text{Cos}(\theta)\left(\frac{1}{b} - \frac{1}{rh}\right)$$

wherein $P_1$=Pressure at shell capillary, $P_2$=Pressure at the core, $\Delta P$=pressure difference, $\gamma$=Surface tension of liquid glass, $r_h$=average pore radius of the shell, b=core radius, and $\theta$=wetting angle glass on shell material.

218. The method of claim of any preceding or following embodiment/feature/aspect, wherein the diffusing of the glass material occurs in accordance with the following formula:

$$\Delta P \cdot t = \frac{\eta}{Kw}\left[3\left(\frac{R}{b}\right)^2 - 2\left(\frac{R}{b}\right)^3 - 1\right]$$

wherein $$\Delta P = P_1 - P_2 = \gamma \, \text{Cos}(\theta)\left(\frac{1}{b} - \frac{1}{rh}\right),$$

$\eta$=liquid/glass viscosity, Kw=shell permeability, b=Core radius, R=infiltrated radius at time t, $\Delta P$=pressure difference, $\gamma$=Surface tension of liquid glass, $r_h$=average pore radius of the shell, b=core radius, $\theta$=wetting angle glass on shell material, and to=incubation time, time to form glass.

219. The method of any preceding or following embodiment/feature/aspect, wherein the porous core, the transition region, the outer shell, or any combination thereof comprises graphene.
220. A proppant formed using the method of any preceding or following embodiment/feature/aspect.
221. A green body proppant comprising a core and/or shell, wherein the green body proppant comprises a chemical gradient having a plurality of stages across the core, the shell, or both.
222. The green body proppant of any preceding or following embodiment/feature/aspect, wherein the gradient comprises a variation in ceramic material, glass material, or both with respect to an average melting point of the material at consecutive stages.
223. The green body proppant of any preceding or following embodiment/feature/aspect, wherein average melting point of consecutive stages increases in a direction outward from the core toward the shell.
224. The green body proppant of any preceding or following embodiment/feature/aspect, wherein average melting point of consecutive stages decreases in a direction outward from the core toward the shell.
225. The green body proppant of any preceding or following embodiment/feature/aspect, wherein an amount of disodium oxide, dipotassium oxide, or both varies along the chemical gradient.
226. The green body proppant of any preceding or following embodiment/feature/aspect, wherein the amount of disodium oxide, dipotassium oxide, or both decreases in a direction outward from the core toward the shell.
227. The green body proppant of any preceding or following embodiment/feature/aspect, wherein an amount of silicon dioxide, alumina, or both varies along the chemical gradient.
228. The green body proppant of any preceding or following embodiment/feature/aspect, wherein the amount of silicon dioxide, alumina, or both decreases in a direction outward from the core toward the shell.
229. The green body proppant of any preceding or following embodiment/feature/aspect, wherein the core, the shell, or both comprises graphene.
230. A sintered proppant formed from the green proppant of any preceding or following embodiment/feature/aspect.
231. A method of forming a sintered proppant comprising:
    forming a green body proppant comprising a core, a shell, or both;
    creating a chemical gradient in the green body proppant during the formation; and
    sintering the green body proppant to form a sintered proppant.
232. The method of any preceding or following embodiment/feature/aspect, wherein the core, the shell, or both comprises graphene.
233. A sintered proppant formed using the method of any preceding or following embodiment/feature/aspect.
234. A method of forming a sintered proppant comprising forming a green body proppant comprising a core, a shell, or both; and
    adjusting the coefficient of thermal expansion (CTE) to strengthen the compressive strength of the resulting sintered proppant sufficient to partially or completely cancel out tensile strength of an external load applied to the resulting proppant.
235. A green body proppant comprising a carbide in the form of rods, whiskers, platelets, or any combination thereof in an amount effective to strengthen a sintered proppant formed from the green body proppant, wherein the green body proppant comprises a core, a shell, or any combination thereof.
236. The green body proppant of any preceding or following embodiment/feature/aspect, wherein the carbide comprises silicon carbide.
237. The green body proppant of any preceding or following embodiment/feature/aspect, further comprising an oxide.
238. The green body proppant of any preceding or following embodiment/feature/aspect, further comprising potassium titanate.
239. The green body proppant of any preceding or following embodiment/feature/aspect, wherein the potassium titanate is in the form of whiskers.
240. The green body proppant of any preceding or following embodiment/feature/aspect, further comprising a tabular alumina, hydrotalcite, or any combination thereof.

241. The green body proppant of any preceding or following embodiment/feature/aspect, further comprising partially stabilized zirconia (PSZ).
242. The green body proppant of any preceding or following embodiment/feature/aspect, further comprising alumina.
243. A carbide-toughened ceramic composite proppant formed from the green body of any preceding or following embodiment/feature/aspect.
244. The carbide-toughened ceramic proppant of any preceding or following embodiment/feature/aspect comprising silicon carbide.
245. A green body proppant comprising alumina and silicon carbide, potassium titanate, hydrotalcite, partially stabilized zirconia, or any combination thereof.
246. The green body proppant of any preceding or following embodiment/feature/aspect, further comprising graphene.
247. A sintered proppant formed from the green body proppant of any preceding or following embodiment/feature/aspect.
248. A method of forming a silicon carbide-toughened ceramic composite proppant comprising
forming a green body comprising silicon carbide particles, the green body comprising a core, a shell, or both;
heating the green body under controlled heating conditions; and
sintering the heated green body at an elevated temperature to form a silicon carbide-toughened ceramic composite proppant.
249. A silicon carbide-toughened ceramic composite proppant formed by the method of any preceding or following embodiment/feature/aspect.
250. A method of forming a graphene-toughened ceramic proppant comprising
forming a green body comprising graphene, the green body comprising a core, a shell, or both;
heating the green body under controlled heating conditions; and
sintering the heated green body at an elevated temperature to form a graphene-toughened ceramic proppant.
251. A graphene-toughened ceramic proppant formed by the method of any preceding or following embodiment/feature/aspect.
252. A method of forming a conductive ceramic proppant comprising
forming a green body comprising graphene, the green body comprising a core, a shell, or both;
heating the green body under controlled heating conditions; and
sintering the heated green body at an elevated temperature to form a conductive ceramic proppant.
253. The method of any preceding or following embodiment/feature/aspect, wherein the conductive ceramic proppant is thermally conductive, electrically conductive, or both.
254. A conductive ceramic proppant formed by the method of any preceding or following embodiment/feature/aspect.
255. The conductive ceramic proppant of any preceding or following embodiment/feature/aspect, wherein the conductive ceramic proppant is thermally conductive, electrically conductive, or both.
256. A ceramic proppant comprising graphene.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A proppant comprising
a porous core, wherein the porous core has an average core density of about less than 2.0 g/cm$^3$; and
a shell surrounding the core, the shell including a transition region and an outer shell surrounding the transition region, wherein the shell surrounding the core has an average outer shell density of about 2.7 g/cm$^3$ to about 3.8 g/cm$^3$, wherein the transition region has an average transition region density of about 2.9 g/cm$^3$ to about 4.0 g/cm$^3$, wherein the transition region is formed by sintering a green body core at a temperature of about 500° C. to about 1500° C., wherein sintering a green body core causes the green body core to diffuse into the shell forming the transition region, wherein the transition region is about 2 wt. % to about 69 wt. % of the diffused green body core;
wherein an average transition region density is greater than an average outer shell density and the average shell density is greater than an average core density.

2. The proppant of claim 1, wherein the average transition region density is at least 5% greater than the average outer shell density, and/or the average transition region density is at least 5% greater than the average core density.

3. The proppant of claim 1, wherein the core is substantially hollow.

4. The proppant of claim 1, wherein the core, the transition region, the outer shell, or any combination thereof comprises graphene.

5. A proppant comprising a porous core, a transition region surrounding the core, and an outer shell surrounding the transition region, wherein the shell surrounding the core has an average outer shell density of about 2.7 g/cm$^3$ to about 3.8 g/cm$^3$, wherein the transition region has an average transition region density of about 2.9 g/cm$^3$ to about 4.0 g/cm$^3$, wherein the transition region is formed by sintering a green body core at a temperature of about 1200° C. to about 2000° C., wherein sintering a green body core causes the green body core to diffuse into the shell foiming the transition region, wherein the transition region is about 5 wt.

% to about 49 wt. % of the diffused green body core, wherein an average transition region porosity is less than an average outer shell porosity and the average outer shell porosity is less than an average core porosity.

6. The proppant of claim 5, wherein a) the average transition region porosity is less than the average outer shell porosity, or b) the average transition region porosity is less compared to the average core porosity, or both a) and b).

7. The proppant of claim 5, wherein the core is substantially hollow and the average core porosity is about greater than 40 vol. % based on the total volume of the core.

8. The proppant of claim 1, wherein the average core porosity is about greater than 40 vol. % based on the total core volume.

9. The proppant of claim 1, wherein the average shell porosity is about 5 vol. % to about 10 vol. % based on the total volume of the shell.

10. The proppant of claim 1, wherein the average transition region porosity is about 0 vol. % to about 5 vol. % based on the total volume of the transition region.

11. The proppant of claim 1, wherein the green body core comprises low melting components.

12. The proppant of claim 11, wherein the low melting components are present in an amount of about 2.85 wt. % to about 3.7 wt. % based on the total weight of the core composition.

13. The proppant of claim 1, wherein the proppant has a change in sphericity of about 0.5% to about 5%.

14. The proppant of claim 1, wherein the proppant comprises a glass-ceramic material.

15. The proppant of claim 14, wherein the glass-ceramic material comprises aluminum oxide and silicon oxide.

16. The proppant of claim 15, wherein the aluminum oxide and silicon oxide are present before sintering in a ratio of about 0.5 to about 2.3.

17. The proppant of claim 14, wherein the glass-ceramic material has a crystallinity of about 5 vol. % to about 100 vol. %.

18. The proppant of claim 5, wherein the average shell porosity is about 5 vol. % to about 10 vol. % based on the total volume of the shell.

19. The proppant of claim 5, wherein the average transition region porosity is about 0 vol. % to about 5 vol. % based on the total volume of the transition region.

20. The proppant of claim 5, wherein the proppant comprises a glass-ceramic material.

* * * * *